US00RE35414E

United States Patent [19]

Murakami et al.

[11] E Patent Number: Re. 35,414

[45] Reissued Date of Patent: Dec. 31, 1996

[54] PICTURE CODING AND DECODING APPARATUS USING VECTOR QUANTIZATION

[75] Inventors: Tokumichi Murakami; Kohtaro Asai; Koh Kamizawa; Masami Nishida, all of Kamakura; Eizo Yamazaki, Tokyo; Atsushi Itoh, Yokohama; Naoto Kinjoh, Kamakura, all of Japan

[73] Assignee: Mitsubishi Denki Kabushiki Kaisha, Tokyo, Japan

[21] Appl. No.: 818,277

[22] Filed: Jan. 8, 1992

Related U.S. Patent Documents

Reissue of:

[64] Patent No.: 5,010,401
Issued: Apr. 23, 1991
Appl. No.: 340,009
Filed: Aug. 11, 1988

[51] Int. Cl.[6] ..... H04N 7/12; H04N 7/18

[52] U.S. Cl. ..... 348/416; 348/409; 348/417; 348/419

[58] Field of Search ..... 358/135, 136, 358/140, 133, 105

[56] References Cited

U.S. PATENT DOCUMENTS

| | | | |
|---|---|---|---|
| 4,551,753 | 11/1985 | Nishizawa | 358/140 |
| 4,670,851 | 6/1987 | Murakami et al. | 358/136 |
| 4,809,067 | 2/1989 | Kikuchi et al. | 358/136 |
| 4,933,761 | 6/1990 | Murakami et al. | 358/136 |
| 4,933,762 | 6/1990 | Guichard et al. | 358/136 |

*Primary Examiner*—John K. Peng
*Attorney, Agent, or Firm*—Rothwell, Figg, Ernst & Kurz

[57] ABSTRACT

An interframe video data coding and decoding apparatus utilizes a differential amplitude suppression circuit in combination with a block encoder and a motion detector to non-linearly suppress amplitude values of interframe differential block data based on a motion detection threshold value determined by an encoding control circuit. The determined threshold value is based on the amount of encoded data being stored in a transmission buffer memory. The suppressed amplitude differential block data is added to corresponding blocks in a frame memory to update the contents of the frame memory during each frame of input video data. In another embodiment, vector quantization encoders are utilized to transmit a motion vector index with encoded frame differential data. In yet another embodiment, a time integral circuit integrates a continuous input video signal series by frame and writes the integrated frame signal into one of two frame memories, while interframe coding is performed on data stored in the other frame memory. Two transmission buffers are provided so that transmission can occur simultaneously with writing of the encoded interframe data into the buffer, by alternating switched connections of the two buffers.

12 Claims, 35 Drawing Sheets

PRIOR ART

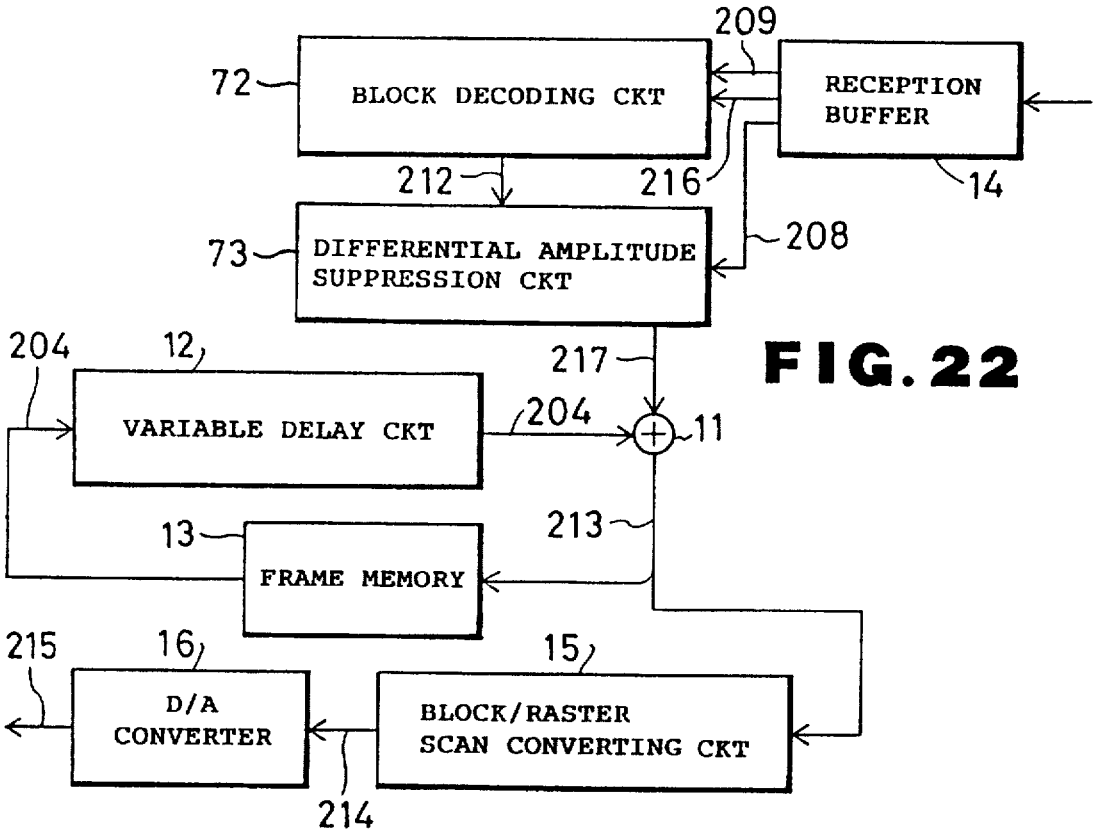
FIG. 22
FIG. 23
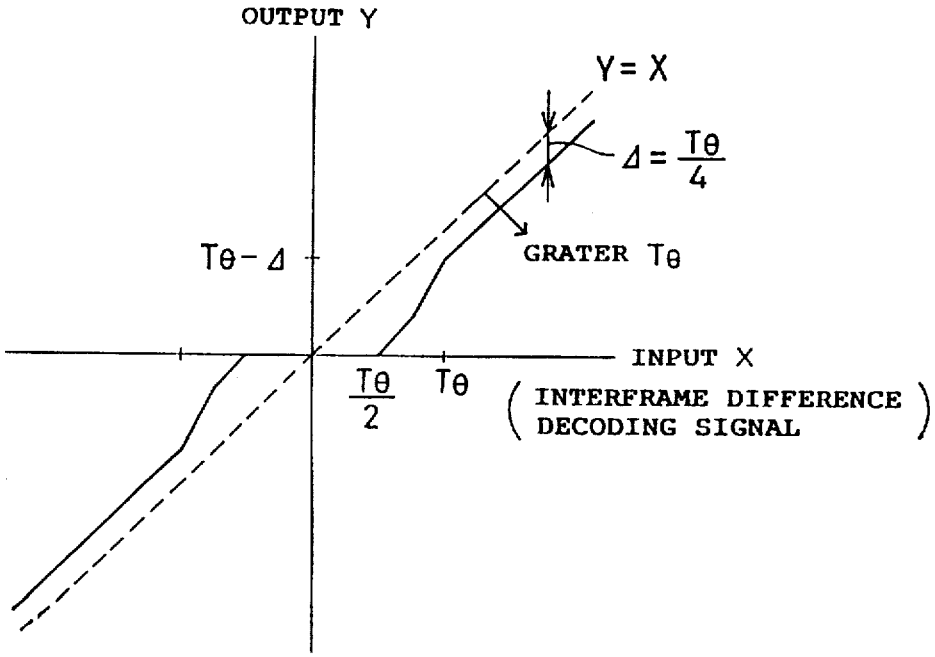

FRONT END FRAME MEMORY
WEIGHTING CKT
74
75
83
84
85
202
220
221
228

SELECTOR
SWITCH
BACK END FRAME MEMORY
BACK END FRAME MEMORY NO. 1
BACK END FRAME MEMORY NO. 2
BACK END FRAME MEMORY NO. 3
D/A CONVERTER
INTERFRAME DECODING CKT
FRAME MEMORY
RECEPTION BUFFER
10
13
14
16
86
87
88
89
90
91
215
227
229
230
231

○ ----- SELECTED

× ----- REJECTED

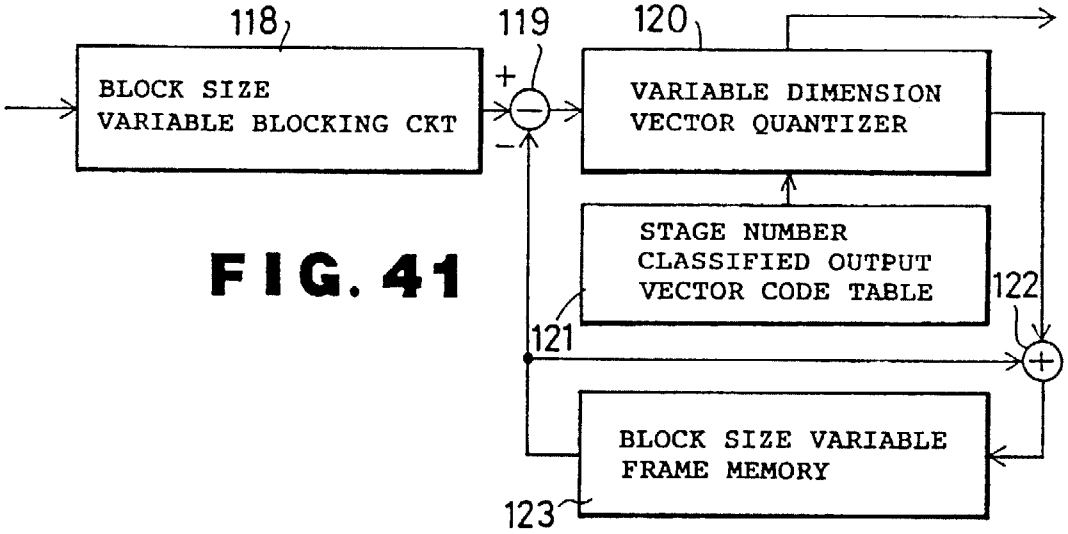
FIG. 41
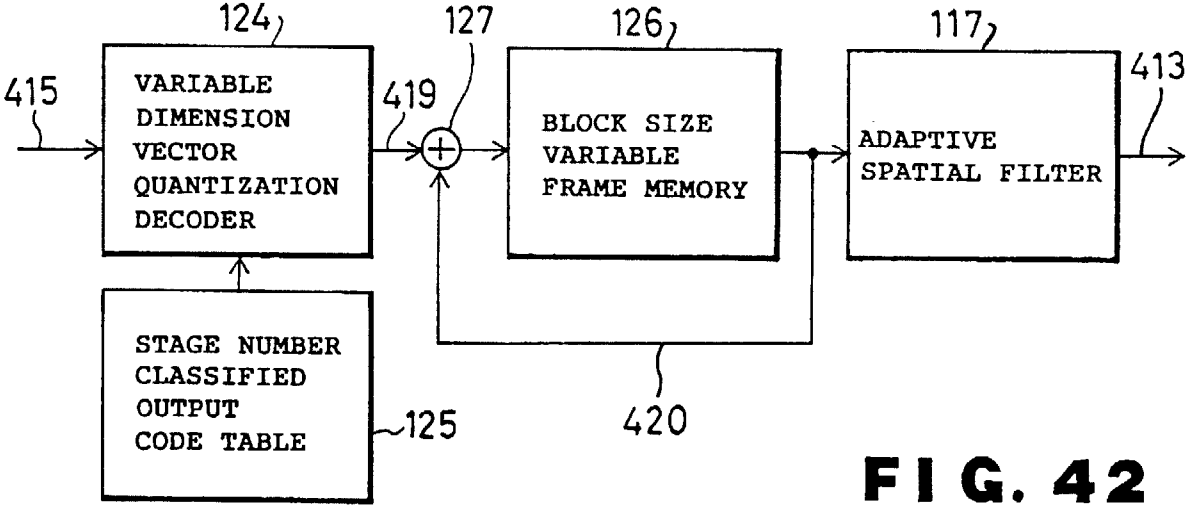
FIG. 42
FIG. 40
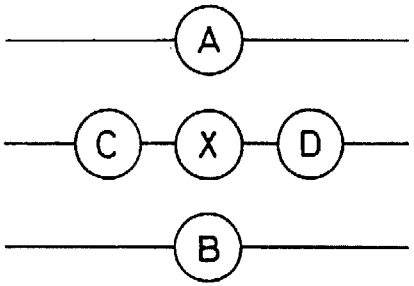

PICTURE CODING AND DECODING APPARATUS USING VECTOR QUANTIZATION

Matter enclosed in heavy brackets [ ] appears in the original patent but forms no part of this reissue specification; matter printed in italics indicates the additions made by reissue.

TECHNICAL FIELD

The present invention relates to an image encoding and decoding apparatus used in a video teleconference, a video telephone or the like.

BACKGROUND ART

FIG. 1 is a block diagram illustrating constitution of an encoding section in an interframe block encoding and decoding apparatus in the prior art where adaptive vector quantization is used as a method of block encoding. In FIG. 1, numeral 1 designates an A/D converter, numeral 2 designates a switch for performing a time lapse of input video signal series, numeral 3 designates a raster/block scan converting circuit where digital video signal series in raster form is blocked into blocks, each of m pixels by n lines (m, n: positive integers) to form input block data, numeral 4 designates a subtractor which obtains a differential signal between the input block data and block data within the frame memory at the same position on the frame as the input block data, i.e., frame-to-frame differential block data, numeral 5 designates a mean value separation normalizing circuit which calculates a mean value and an amplitude component of the interframe differential block data in units of block and obtains a normalized input vector through the normalizing processing, numeral 6 designates a motion estimation circuit which executes motion estimation in block units using the mean value, the amplitude component and a threshold value, and outputs the motion information, numeral 7 designates a vector quantization encoder which performs vector quantization of the normalized input vector and converts it into a normalized output vector index, numeral 8 designates a transmission data buffer which performs variable word length encoding on each of the motion information, the mean value, the amplitude component and the normalized output vector index, and stores the encoded data for a definite period to transmit to a transmission line at a definite speed, numeral 9 designates an encoding control circuit which controls the input time valve and the motion estimation threshold value in response to the amount of the information stored in the transmission data buffer, numeral 10 designates a vector quantization decoder which performs decoding to reproduce the interframe differential block data from the motion information, the mean value, the amplitude component and the normalized output vector index, numeral 11 designates an adder which reproduces the input block data, numeral 12 designates a variable delay circuit, and numeral 13 designates a frame memory.

Also FIG. 2 is a block diagram illustrating the constitution of a decoding section in the interframe block encoding and decoding apparatus in the prior art where adaptive vector quantization is used in similar manner to the encoding section. In FIG. 2, numeral 14 designates a reception data buffer which receives encoded data supplied from the transmission line, stores it for a definite period while performing variable length decoding, and outputs the stored data at a speed corresponding to the decoding operation, numeral 15 designates a block/raster scan converting circuit which converts the input block data being decoded and reproduced into a raster form, and numeral 16 designates a D/A converter.

Next, the encoding and decoding operation will be described using FIGS. 1 and 2. In the decoding section, an input moving picture signal 201 is an analog signal which is raster-scanned from the left to the right and from the upper side to the lower side of the frame. The analog signal is converted into digital signal series 202 by the A/D converter 1, and then blocked into blocks of m pixels by n lines each (m, n: positive integers) in the raster/block scan converting circuit 3, thereby input block data S 203 can be obtained. Block P 204 at the same block position within the frame memory 13 is subtracted from the block data S 203, and interframe differential block data $\epsilon$ 205 obtained in this manner is supplied to the mean value separation normalizing circuit 5. In the mean value separation normalizing circuit 5, the interframe differential block data is converted into a k-dimensional (k=m×n) vector, and then the following operation is executed, thereby an intrablock mean value $\mu$, an amplitude component $\sigma$ 206 and a normalized input vector x 207 can be obtained.

$$\mu = \frac{1}{k} \sum_{j=1}^{k} \epsilon_j (j = 1, 2, \ldots, k, k = m \times n)$$

$$\sigma = \left[ \frac{1}{k} \sum_{j=1}^{k} (\epsilon_j - \mu)^2 \right]^{1/2}$$

$$xj = (\epsilon j - \mu)/k$$

$$x = (x_1, x_2, \ldots, x_k, k = m \times n)$$

As approximate expressions of $\sigma$, $$\sigma = \frac{1}{k} \sum_{j=1}^{k} |\epsilon j - \mu| \text{ or}$$

$$\sigma = \underset{j}{\mathrm{MAX}} (\epsilon_j) - \underset{j}{\mathrm{MIN}} (\epsilon_j)$$

may be used.

The mean value $\mu$ and the amplitude component $\sigma$ 206 obtained in this manner are inputted to the motion estimation circuit 6, and in comparison with a motion detection threshold value $T\theta$ determined by an encoding control circuit as hereinafter described, the motion estimation in block units is executed in accordance with the following conditions. As a result of the motion estimation, motion information $\nu$ 209 is outputted from the motion estimation circuit 6.

$|\mu| < T\theta$ and or $\sigma < T\theta$: $\nu = 0$ (no movement)

$|\mu| > T\theta$ or $\sigma > T\theta$: $\nu = 1$ (movement existing)

Regarding a block of $\nu = 1$, i.e., movement existing, the following processing is performed. The normalized input vector x 207 obtained in the mean value separation normalizing circuit 5 is vector quantized by the vector quantization encoder 7, and converted into an index i 210 of a normalized output vector $y_i$ of which distortion with respect to x becomes minimum.

The mean value $\mu$, the amplitude component $\sigma$ 206 and the normalized output vector index i 210 in the case of the movement information $\nu$ 209 being $\nu = 1$, are converted into encoded data respectively using variable word length codes or the like in the transmission buffer 8 and stored for a definite period. The transmission data buffer 8 transmits the encoded data to the transmission line at a definite speed, and also calculates the amount of stored data 211 within the buffer and supplies it to the encoding control circuit 9. The encoding control circuit 9 monitors changes of the amount of stored data 211, and performs control of ON/OFF signal 232 of the input time lapse switch and the motion detection threshold value Tθ 208 in frame units. An example of the control method is shown in FIG. 3.

Respective data inputted to the transmission data buffer 8, i.e., the movement information ν 209, the mean value μ and the amplitude component σ 206, and the normalized output vector index i 210, are decoded through the following operation in the vector quantization decoder 10 and interframe differential decoded block data $\hat{\epsilon}$ 212 is reproduced.

at ν=0 then $\hat{\epsilon}=0=[0, 0, \ldots, 0]$ at ν=1 then $\hat{\epsilon}+hd\ j=\sigma\cdot y_{ij}+\mu$ (j=1, 2, . . . , k)

($y_i$: a normalized output vector corresponding to an index i)

$\hat{\epsilon}=[\epsilon_1, \epsilon_2, \ldots, \epsilon_k]$

The interframe differential decoded block data $\hat{\epsilon}$ 212 obtained and the block data P 204 within the frame memory delayed in a prescribed period by the variable delay circuit 12 are added, thereby decoded reproduction block data $\hat{S}$ 213 is restored, and the block data at the corresponding position within the frame memory is updated. The above-mentioned process is expressed in following formulas.

$$\epsilon=S-P$$

$$\hat{\epsilon}=\epsilon+q \text{ (q: errors produced in vector quantization encoding and decoding)}$$

$$\hat{S}=P+\hat{\epsilon}$$

$$P=\hat{S}\cdot Z^{-n/} \text{ ($Z^{-n/}$: n-frame delay, n: a positive integer)}$$

On the other hand, in the decoding section, the motion information ν 209, the mean value μ and the amplitude component σ 206, and the normalized output vector index i 210, received in the reception data buffer 14 and subjected to variable length decoding and speed conversion, are decoded by the vector quantization decoder 10 in similar manner to the above description, and interframe differential decoded block data $\hat{\epsilon}$ 212 is reproduced. The interframe differential decoded block data $\hat{\epsilon}$ 212 and the block data P 204 within the frame memory outputted through the variable delay circuit 12 are added, and decoded reproduction block data S 213 is restored in similar processing to the encoding section. That is, $$\hat{S}=P+\hat{\epsilon}=S+q$$

is executed. The decoded reproduction block data $\hat{S}$ 213 is converted by the block/raster scan converting circuit 15 into data 214 in raster form and subjected to D/A conversion by the D/A converter 16, thereby a reproduced output moving picture signal 215 can be obtained.

Since the interframe encoding and decoding apparatus in the prior art is constituted as above described, when the motion estimation threshold value is large, errors between the amplitude value of the interframe differential decoding block at the motion information v=1 and the amplitude value at v=0 becomes large, and in the reproduced picture, deterioration in block form due to the errors becomes conspicuous at adjoining portions between the block of v=1 and the block of v=0, and the subjective quality is deteriorated, thereby the motion estimation threshold value cannot be made so large and as a result the amount of encoded information of the large motion is increased and the number of input time lapses is increased. That is, there is a problem that the number of frames of the transmitted moving pictures is decreased and instantaneity to the motion is deteriorated.

In a constitution as shown in FIGS. 4 and 5, two transmission buffers and two reception buffers are provided as a double buffer structure, and while encoded information is written in one transmission buffer by a switch 17 and a selector 18, the other transmission buffer reads the information and transmits it, so that write and read are performed simultaneously, and also in the reception buffers while one buffer performs writing by a switch 19 and a selector 20, the other buffer performs reading, so that writing and reading are performed simultaneously.

In such constitution, a delay time from writing of some picture frame up to its decoded reproduction is defined by required time of about two cycles in encoding transmission cycle of one picture frame. Consequently, when the transmission speed is slow or the amount of information produced is large, a considerable time is required for reading the transmission buffer and the delay time may become large, and since the time lapse occurs frequently and the time interval between encoded picture frames becomes large, correlation between frames becomes small and efficiency of encoding between frames is deteriorated.

Further in an interframe encoding and decoding apparatus as shown in FIGS. 6 and 7, a spatial filter 21 is used so that granular noises produced by vector quantization errors are smoothed and reduced. In FIG. 6, numeral 21 designates a spatial filter where granular noises produced by vector quantization errors are smoothed and reduced, and numeral 22 designates a selector which selects signals not passing through the spatial filter for a block discriminated as a still region by the motion estimation circuit 6.

FIGS. 8 and 9 are block diagrams illustrating constitution of the motion estimation vector quantization encoder and decoder respectively. Numeral 5 designates a mean value separation normalizing circuit which separates a mean value and amplitude of an input vector, numeral 23 designates a distortion operation circuit which calculates the distance between two vectors, numeral 24 designates a minimum distortion detecting circuit which detects a minimum distortion from the output of the distortion operation circuit 23 and outputs a strobe, numeral 25 designates a code book ROM for an output vector, numeral 26 designates an address counter which gives an address of the code book ROM 25, and numeral 27 designates an index latch where an index corresponding to the address of the code book ROM 25 is latched by detecting the minimum distortion of the output of the minimum distortion detecting circuit 24.

In FIG. 9, numeral 28 designates an amplitude multiplier which performs amplitude reproduction of a normalized output vector, and numeral 29 designates a mean value adder which adds the mean value to the amplitude reproduced output vector.

In the apparatus in such constitution, an interframe differential reproduced vector decoded in accordance with reverse processing of encoding is added to either a previous frame vector stored in the frame memory 13 or another previous frame vector passing through the spatial filter 21, and then written in the frame memory 13. Which of the previous frame vectors to be added to the differentiated reproduced vector is selected by the selector 22. The motion detecting circuit 6 discriminates whether the interframe differential input vector is a valid block (movement existing) or an invalid block, and the result is transmitted as a valid/invalid discrimination code from the motion detecting circuit 6 to the selector 22. The selector 22 selects the previous frame vector passing through the spatial filter 21 if the interframe differential input vector is a valid block, and selects the previous frame vector in the memory 13 is it is an invalid block.

Since the selector 22 selects existence/non-existence of the spatial filter 21 by using the valid/invalid discrimination code, the granular noises caused by the vector quantization encoding can be smoothed and the spatial filter 21 can act only in regions of movement to perform effective convergence in the interframe loop.

Since the apparatus in the prior art is constituted as above described, the spatial filter always acts on the previous frame signal to take the interframe differences. Consequently, in a block including sharp edges, the signal is smoothed by the spatial filter and even in a completely still state the subtractor output does not become zero, and when the threshold value of the motion estimation is low the block may be discriminated as a valid block (movement existing). As a result, there is a problem that the still edge portion does not become still in the reproduced picture, so that the vector quantization is performed again.

Another interframe encoding and decoding apparatus in the prior art is constituted as shown in FIGS. 10 and 11. In FIGS. 10 and 11, numeral 31 designates a dynamic vector quantization encoder where input block data, supplied from the raster/block scan converting circuit, are subjected to vector quantization using a dynamic code book, numeral 32 designates a dynamic vector quantization decoder where a dynamic output vector index supplied from the dynamic vector quantization encoder 31 is decoded and the output vector is reproduced, numeral 21 designates an adaptive spatial filter where smoothing processing is applied to dynamic vector quantization reproduced video signal series obtained from the dynamic vector quantization decoder 32, numeral 22 designates a selector which selects either the dynamic vector quantization reproduced video signal series or video signal series obtained by applying the smoothing processing to the signal series according to the block discrimination information, and numeral 33 designates a variable length encoder which converts the dynamic output vector index and the adaptive vector quantization encoding output data into a suitable code word.

In FIG. 11, numeral 34 designates a variable word length decoder where code series supplied from the transmission line in synchronized speed with a transmission line clock is separated into a code word, and the code word is reversely converted into encoding data in sequence, and numeral 35 designates a decoding clock generating circuit.

FIGS. 12 and 13 are block diagrams illustrating the constitution of a dynamic vector quantization encoder and decoder respectively. Numeral 23 designates a distortion operation circuit which calculates a distance between two vectors on a multi-dimensional space, i.e., distortion, numeral 24 designates a minimum distortion detecting circuit which detects the minimum distortion among distortions based on a plurality of output vectors and outputs a strobe signal, numeral 25 designates a dynamic code book, numeral 36 designates an output vector set comprising a plurality of fixed vectors (e.g., mean value vectors), numeral 37 designates an output vector set comprising a plurality of vectors read from the frame memory, numeral 26 designates an address counter which gives an address of the dynamic code book, and numeral 27 designates an index latch which latches an index corresponding to the address of the dynamic code book on detecting the minimum distortion.

FIGS. 14 and 15 are block diagrams illustrating constitution of an adaptive vector quantization encoder and decoder respectively. Numeral 5 designates a mean value separation normalizing circuit which separates the input vector into three components, i.e., the mean value, amplitude and normalized vector, numeral 25 designates a general-purpose code book, numeral 38 designates a block discrimination circuit which performs threshold value processing for conditional replenishment, numeral 39 designates a block information encoding circuit where block discrimination indices are encoded together per small block ($n_1 \times n_2$, $n_1$, $n_2$: integers) based on two-dimensional arrangement for example, numeral 40 designates a previous value predictive differential PCM encoding circuit, numeral 41 designates a block information decoding circuit which decodes the block discrimination index, numeral 42 designates a previous value predictive differential PCM decoding circuit, numeral 43 designates a mean value adding circuit, and numeral 44 designates an amplitude multiplying circuit.

In the apparatus in such constitution, since the portion from the A/D converter to the transmission buffer memory in the encoding section and the portion from the reception buffer memory to the D/A converter in the decoding section must operate in real time synchronized with video clocks, parallel processing concurrent with speed-up is accompanied by increase of the apparatus scale, and since the information inputted to the encoding control circuit is only the stored amount of the transmission buffer memory, control of the block discrimination threshold value following the movement is difficult. When the capacity of the frame memory within the encoding loop is only one picture field there is a problem that the transmission delay amount is increased in the case that the amount of information produced is so large that the input data of one picture frame cannot be all encoded.

Also in the apparatus of the prior art, even if all regions of the inputted picture are not required nor is a high resolving power needed, i.e., the large number of pixels is not required, all pixels must be encoded and transmitted in forms based on prescribed design, and, thereby, there is a problem that the information amount becomes large and therefore the time lapse is liable to occur, and it cannot be easily determined at what frame speed the transmitting side transmits to the other receiving side.

In the case of one encoder and one decoder, blocks within the picture are subjected to the vector quantization sequentially, and when the last block is quantized the encoding is finished, thereby during this process indices by the number of blocks are outputted as encoded data, and in the case of decoding, the blocks are received one after another, then subjected to vector quantization decoding one after another, and when the index of the last block is decoded the decoding is finished.

Consequently, in the case of application to transmission or retrieval of still pictures, even if necessary information is desired to be obtained in selection, the whole contents cannot be determined before the decoding reproduction of one picture field as a whole is completed, and there is a problem that a considerably long time is required for transmission or reproduction of recording, so that the selection cannot be performed immediately.

A contour holding filter in the prior art is shown in FIG. 16.

FIG. 16 is a block diagram illustrating a constitution example of a contour holding filter in the prior art. Numeral 45 designates a one-line delay element, numeral 46 designates a one-sample delay element, numeral 47 designates a multiplier, numeral 11 designates an adder, numeral 4 designates a subtractor, numeral 216 designates an aimed pixel sample as an object of smoothing, numerals 217, 218 designate pixel samples neighboring respectively at right and left sides on two-dimensional arrangement of picture frame, numerals 219, 220 designate pixel samples neighboring respectively at upper and lower sides on two-dimensional arrangement of picture frame, numeral 48 designates an absolute value operation unit, numeral 49 designates a comparator, numeral 50 designates a selector, numeral 221 designates a horizontal direction differential absolute value signal, numeral 222 designates a vertical direction differential absolute value signal, numeral 223 designates a horizontal direction filter output applied by smoothing in the horizontal direction, numeral 224 designates a vertical direction filter output applied by smoothing in the vertical direction, numeral 225 designates a horizontal and vertical filter output applied by smoothing in the horizontal and vertical directions, numeral 226 designates a selector indicating signal to control the selector output signal, and numeral 227 designates an output pixel sample where the aimed pixel sample is smoothed.

The contour holding filter in the prior art is constituted as above described and edge detection is performed according to the variation amount of the pixel value by peripheral pixels of the aimed pixel as an object of smoothing, but the effect of the filter and the variation amount do not always correspond to each other, and therefore there is a problem that, the error decision may cause deterioration of the picture quality.

An apparatus using an information producing amount control circuit to smooth the information producing amount is shown in FIG. 17.

FIG. 17 is a block diagram illustrating the constitution of an encoding section of an interframe adaptive vector quantization encoding apparatus. Numeral 1 designates an A/D conversion and block dividing circuit, numeral 51 designates a block discrimination circuit which outputs block discrimination information to perform conditional replenishment according to the mean value, variance and threshold value, numeral 7 designates a vector quantization encoder which performs vector quantization of the normalized vector and outputs a vector index, and performs DPCM on the mean value and the variance, and numeral 9 designates an information producing amount control circuit as an encoding control circuit which controls the threshold value used for block discrimination corresponding to the storage information amount of the transmission buffer.

Since the information producing amount control circuit of the picture encoding apparatus in the prior art is constituted as above described, previous encoding conditions are unclear and the encoding control in response to the movement amount of the picture cannot be performed, thereby the information producing amount with high accuracy is difficult, and when the movement amount is small, the threshold value is decreased excessively and the information producing amount becomes large for the beginning of the movement and there is a problem that the ability for detecting the beginning of the movement is deteriorated due to an increase in number of the time lapses.

A tree search vector quantizer in the prior art is shown in FIG. 18. FIG. 18 is a block diagram illustrating constitution of an n-stage tree search vector quantization encoder where pipeline processing is employed. In FIG. 18, numeral 207 designates an input vector, numeral 52 designates a first stage of an encoder where each stage is pipelined, numeral 53 designates a second stage of the encoder, numeral 54 designates an n-th stage of the encoder, numeral 301 designates an encoded output of the first stage of the encoder, numeral 302 designates an encoded output of the second stage of the encoder, numeral 303 designates an encoded output of the (n−1)th stage of the encoder, numeral 304 designates an encoded output of the n-th stage of the encoder, i.e., an output vector index, numeral 55 designates a latch which latches the index and outputs it at a definite timing, and numeral 210 designates an encoder output signal.

FIG. 19 is a block diagram illustrating a constitution example of the n-th stage of the encoder. In FIG. 19, numeral 56 designates a register which latches the input vector 207 in each stage, numeral 57 designates a code table which stores a pair of output vectors in the n-th stage of an output vector set having tree structure produced previously so that the output vector corresponding to the node point of each stage may become minimum distortion based on the distribution of input vectors, numerals 305 and 306 designate output vectors read from the code table 57, numeral 58 designates a distortion operation circuit which calculates distortion between the input vector 207 and the output vectors 305, 306, numeral 59 designates a comparator which compares two distortions as outputs of the distortion operation circuits, numeral 307 designates a signal indicating the comparison result in the comparator 59, and numeral 60 designates an index register which adds "0" or "1" to the encoded output 303 at the (n−1)th stage in accordance with the comparison result and outputs the encoded output at the n-th stage. Each stage of the encoder has a similar constitution. Differences are in the contents of the output vector code table of each stage, and in that the previous stage encoded output is not inputted to the first stage and that the input vector is not transmitted from the input vector register of the n-th stage (last stage) to next stage (shown by broken line in FIG. 18).

FIG. 20 is a block diagram illustrating a constitution example of a vector quantization decoder. In FIG. 20, numeral 61 designates a register which latches the index signal 304 inputted to the decoder, numeral 62 designates a code table which stores real output vectors corresponding to the last end node point of a search tree (equivalent to the contents of the code table at the last stage of the encoder), numeral 63 designates a register which latches an output vector read from the code table 62 in accordance with the index signal 304, and numeral 212 designates an output vector.

Since the tree search vector quantizer in the prior art is constituted as above described, in the encoder, there is a problem that an output vector code table memory capacity of about twice the number of real output vectors is required. For example, when the number of output vectors is equal to N ($=2^n$), output vectors of ($2^{n+1}-2$) in number must be stored in the encoder and output vectors of $2^n$ in number must be stored in the decoder.

When a motion picture and a still picture are transmitted, constitution of a video encoding transmission apparatus in the prior art is shown in FIG. 53. In FIG. 53, numeral 826 designates a motion picture camera, numeral 827 designates a motion video signal being output from the motion picture camera 826, numeral 828 designates a motion picture encoding and decoding apparatus (hereinafter referred to as "codec") which encodes the motion video signal 827 and decodes motion picture encoded data 829 into motion video signal 832, numeral 829 designates motion picture encoding data, numeral 830 designates a transmission control section which connects a motion picture codec 828 or a still picture codec 836 to the opposite station, numeral 831 designates multiplexing data transmitted or received by the transmission control section 830, numeral 832 designates a motion video signal decoded by the motion picture codec 828, numeral 833 designates a monitor which displays a picture of the motion video signal, numeral 834 designates a still picture camera, numeral 835 designates a still video signal, numeral 836 designates a still picture codec which performs encoding and decoding of a still picture, numeral 837 designates still picture encoded data, numeral 838 designates a still picture video signal, and numeral 839 designates a monitor which displays the still picture represented by video signal 838.

FIG. 54 is a block diagram illustrating an example of a motion picture encoding section of a picture encoding transmission apparatus in the prior art. Numeral 801 designates an input signal obtained by digitizing the camera signal, numeral 802 designates a blocking circuit which blocks a signal scanned in the raster direction and outputs it, numeral 804 designates input signal series being blocked into units of encoding, numeral 805 designates a dynamic vector quantizer, numeral 806 designates a DVQ index, numeral 807 designates a DVQ output vector, numeral 825 designates a filter for eliminating noise from the vector signal, numeral 809 designates a DVQ output vector passing through the filter, numeral 810 designates a subtractor, numeral 811 designates an interframe differential vector, numeral 812 designates an adaptive vector quantizer, numeral 813 designates an adaptive vector quantization (hereinafter referred to as "AVQ") encoding information, numeral 814 designates an AVQ output vector, numeral 815 designates an adder, numeral 816 designates a locally decoded vector, numeral 817 designates a field memory for storing the number of pixels in one field of the motion picture, and numeral 818 designates a previous frame vector.

FIG. 55 is a block diagram illustrating an example of a decoding section of a picture encoding transmission apparatus in the prior art. Numeral 806 designates a DVQ index, numeral 820 designates a dynamic vector quantizer decoding section, numeral 825 designates a digital filter, numeral 809 designates a DVQ output vector passing through the filter, numeral 813 designates AVQ encoding information, numeral 819 designates an adaptive vector quantizer decoding section, numeral 814 designates an interframe differential vector locally decoded, numeral 815 designates an adder, numeral 816 designates a locally decoded vector, numeral 817 designates field memory for storing the number pixels of the motion picture, numeral 823 designates a deblocking circuit which performs scan conversion of signal series blocks into the raster configuration and numeral 824 designates a motion picture output signal series.

Next, the operation will be described. In FIG. 53, an image is converted into an electric signal by the motion picture camera 826 and a motion picture signal 827 can be obtained. The motion picture signal 827 is compressed and encoded in the motion picture codec 828 and transmitted as motion picture encoded data 829 to the transmission control section 830. The transmission control section 830 multiplexes the motion picture encoded data 829 together with other data to be transmitted and transmits the multiplexed data 831, and also receives multiplexed data transmitted, at the same time, from the opposite station and performs distribution. If the motion picture encoded data 829 is obtained from the received multiplexed data 831, it is transmitted to the motion picture codec 828 and the motion picture signal 832 from the opposite station is decoded and displayed on the motion picture monitor 833.

On the other hand, the still picture codec 836 performs encoding operations only for transmission of the a still picture to an opposite station. Codec 836 encodes the still picture signal 835 from the still picture camera 834, and the signal is transmitted as still picture encoded data 837 to the transmission control section 830. In general, in the still picture encoding, since the number of samples is greater than that of the motion picture and encoding utilizing correlation between continuous frames cannot be performed as in the case of the amount of motion picture, the still picture encoded data of one picture frame is considerably greater than the amount of motion picture encoded data of one picture frame. Consequently, if the still picture transmission is started, the transmission control section temporarily stops the transmission/reception of the motion picture encoded data so that the still picture transmission can be completed in shortest period.

In a block diagram of a motion picture codec encoding section of FIG. 54, the input signal series 801 is inputted from the camera and digitized, and then blocked into blocks of m by n pixels as quantized units in a blocking circuit 802 and becomes an input vector 804.

In the dynamic vector quantizer 805, the input vector 804 is compared with a dynamic code table comprising a previous frame signal 818 or the like read from the field memory 817, and quantized into the previous frame vector at displaced position about the position within the picture frame of the input vector 804, thereby the DVQ index 806 and the DVQ output vector 807 corresponding to the displacement amount can be obtained. The DVQ output vector 807 is smoothed in a digital filter 825 so as to prevent the quantization noise from piling up.

The DVQ output vector 809 smoothed in the filter enters a subtractor 810 and is subtracted from the input vector 804, thereby the interframe differential vector 811 can be obtained. The interframe differential vector 811 is subjected to adaptive processing such as movement detection, mean value separation normalizing or the like in an adaptive vector quantizer 812, thereby an AVQ output vector 814 and AVQ encoded information 813 such as an index are outputted. The AVQ output vector is added in an adder 815 to the DVQ output vector 809 smoothed in the filter, and becomes a locally decoded vector 816 and is written in corresponding position of a field memory 817.

Contents of the field memory 817 are quoted in the DVQ on encoding the next frame. The AVQ encoded information 813 and the DVQ index are subjected to variable word length encoding and transmitted as transmission data by the transmission control section, but in order to make the amount of transmission information constant, if the amount of the generated information is large, the frame as an object of encoding is thinned out and the time-lapse control is performed.

In a block diagram of a decoding section of FIG. 55, the DVQ index 806 and the AVQ encoded information 813 are decoded into moving video signal series 824. The DVQ index 806 enters a DVQ decoding section 820 and a digital filter 825, and the previous frame vector at the displaced position according to the DVQ index 806 is read from the corresponding position of the previous decoded picture within the field memory 817 and smoothed in the digital filter 825. On the other hand, the AVQ encoded information 813 is decoded by the AVQ decoding section 819 into an interframe differential locally decoded vector 814, and added in an adder 815 to the previous frame vector 809 smoothed in the filter, thereby a locally decoded vector 816 can be obtained. The locally decoded vector 816 is written in the corresponding position of the field memory 817 for decoding the next frame.

Operation of the motion picture codec has been described, and the motion picture codec decreases the number of pixels so as to encode a motion picture under a restricted amount of information. On the contrary, since the high resolving power is required for encoding the still picture or painting and calligraphic works, it is difficult to perform encoding of the motion picture and encoding of the still picture using the same number of pixels. Consequently, in order to transmit the motion picture and a still picture, the still picture codec independent of the motion picture codec must be utilized.

Since the picture encoding transmission apparatus in the prior art is constituted as above described, the motion picture codec and the still picture codec must be provided independently, thereby the cost becomes high. When one encoding section is used commonly for both codecs, for the motion picture, the number of pixels is too large and the amount of generated information becomes too large, to reproduce the movement smoothly via the ordinary lines, or for the still picture, the resolving power is not sufficient and the performance cannot be satisfied. This is also a problem.

DISCLOSURE OF INVENTION

In the present invention, a differential amplitude suppression circuit for suppressing an amplitude value of interframe differential decoding block data non-linearly in units of blocks in response to the motion detection threshold value is inserted in the front stage of each of a plurality of interframe adders of an encoding section and a decoding section, the non-linear characteristics together with the motion detection threshold value are controlled by an encoding control circuit based on the amount of transmission data buffer storage, and means for transmitting the motion detection threshold value is used.

According to the invention, when the movement is large, the encoding/decoding can be executed by a differential amplitude suppression circuit while the subjective quality is not much deteriorated and an increase in amount of the encoded information is suppressed, and the followable property to the movement of the reproduced motion pictures can be improved.

A picture frame buffer is installed between a preprocessing section and an encoding section in the encoder, a control circuit to perform a time integral of the picture frame using the buffer is installed, a circuit to control read/write to the buffer in units of picture frame in response to the amount of buffer storage to smooth the amount of transmission information is installed, and a buffer in units of picture frame is installed between the decoding section and the picture output section of the decoder.

According to this constitution, since a picture frame to be encoded is first written in the frame memory in course of the time integral, and then the amount of generated information is smoothed by small steps and the encoding transmission is performed, the delay time can be decreased and even if a time lapse occurs aliasing is not produced and a picture frame holding the correlation between frames can be encoded, thereby, there is an advantage of this invention that a picture of high quality can be encoded and transmitted efficiently.

Vector quantizers are connected in multiple stages, the vector quantizer at a rear stage quantizes residual of the vector quantizer at a front stage, and the encoding/decoding processing is performed in sequence from the front stage.

Since the encoding/decoding processing is performed stepwise in this constitution, an outline of the picture frame as a whole obtained by the vector quantization encoding/decoding apparatus, can be grasped at an early point of time in the picture encoding reproduction and the encoding can be performed so as to approach a more precise picture in course of time. This is another advantage of the present invention.

A contour holding filter as a spatial filter uses a differential signal between a sum of values of two pixels at both sides of the aimed pixel in the vertical direction, lateral direction or diagonal direction and a value of two times the aimed pixel value in order to discriminate the filter adaptation switch-over for smoothing or not smoothing the aimed pixel.

According to this constitution, a picture smoothing filter can be realized by a simple circuit where deterioration due to an erroneous decision of the adaptive control is decreased and only noises having no correlation in any directions are suppressed.

Further an information generating amount control circuit as an encoding control circuit is provided with an encoding control table having characteristics of a plurality of threshold values versus generated information amount is response to the movement amount and with a threshold control table having reverse characteristics thereof, detects the movement amount by inputting the threshold value and the generated information amount referring to the encoding control table, determines a new threshold value by inputting the movement amount and the target value of the generated information amount referring to the threshold value table, further, performs threshold value control to hold the threshold value high if a state of small movement amount continues for a definite period, and thereby there is one more advantage that the information generated amount can be smoothed and the followable property to the beginning of movement in the picture can be improved.

The vector quantizer is constituted by a tree search vector quantizer, and the tree search vector quantizer is provided with a mean value separation normalizing circuit which separates a mean value from an input vector. The mean value separated by the mean value separation normalizing circuit is made a new input vector, and at a step of producing the tree structure output vector set of the encoder, output vectors located in each stage are arranged in half right and left sides in spatial symmetry, i.e., in the inverse relation, and then only the half output vector set in the left or in the right is stored, and the polarities of the input vectors are inverted in the search processes, thereby the search can be performed using the output vector set having equivalently the twice number.

According to such tree search vector quantizer, the output vector code table capacity of the tree search vector quantizer can be reduced to about half in comparison to the prior art. That is, when the number of output vectors is made $N=2^n$, in the prior art, output vectors of $(2^{n+1}-1)$ in number must be stored in the encoder and output vectors of $2^n$ in number must be stored in the decoder. On the contrary, according to the invention, output vectors of $(2^n-1)$ in number only need to be stored in the encoder and output vectors of $(2^n-1)$ in number only need to be stored in the decoder, thereby achieving one more advantage of the invention in that the apparatus can be easily miniaturized and made cheap.

The picture encoding transmission apparatus according to the invention uses a common encoding section for encoding the motion picture and the still picture when the motion picture and the still picture are transmitted, and sets the resolving power of the still picture to twice the motion picture in the horizontal direction and in the vertical direction. The picture encoding transmission apparatus has a field memory within the interframe encoding/decoding loop by the number of pixels of a motion picture, and has also the frame memory by the pixel number of the still picture only at the outside of the decoding loop of the decoding section, thereby the picture encoding transmission apparatus can be obtained at low cost and with good picture quality and performance for both the motion picture and the still picture.

BRIEF DESCRIPTION OF DRAWINGS

FIG. 22 is a block diagram illustrating constitution of a decoding section of an interframe encoding/decoding apparatus as an embodiment of the invention;

FIG. 23 is an explanation diagram illustrating an example of input/output characteristics of a differential amplitude suppression circuit of an interframe incoding/decoding apparatus as an embodiment of the invention;

FIG. 40 is an explanation diagram of an adaptive spatial filter as a component of the embodiment;

FIGS. 41 and 42 are a block diagram of an encoding section and a block diagram of a decoding section as another constitution example of FIGS. 38 and 39;

BEST MODE FOR CARRYING OUT THE INVENTION

Figure 1:
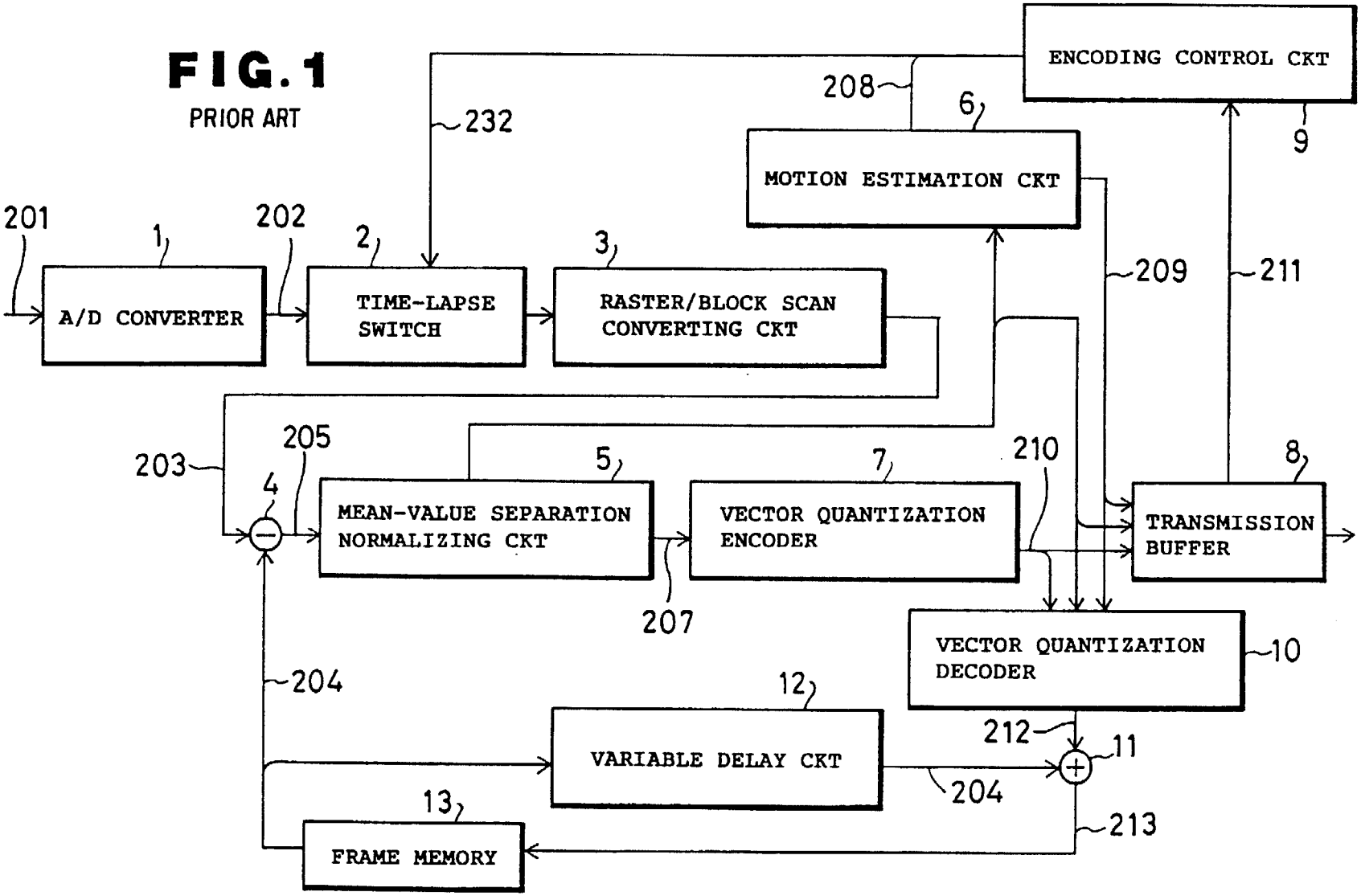
FIG. 1 PRIOR ART
FIG. 1 is a block diagram illustrating constitution of an encoding section of an interframe encoding/decoding apparatus in the prior art.
Figure 3:
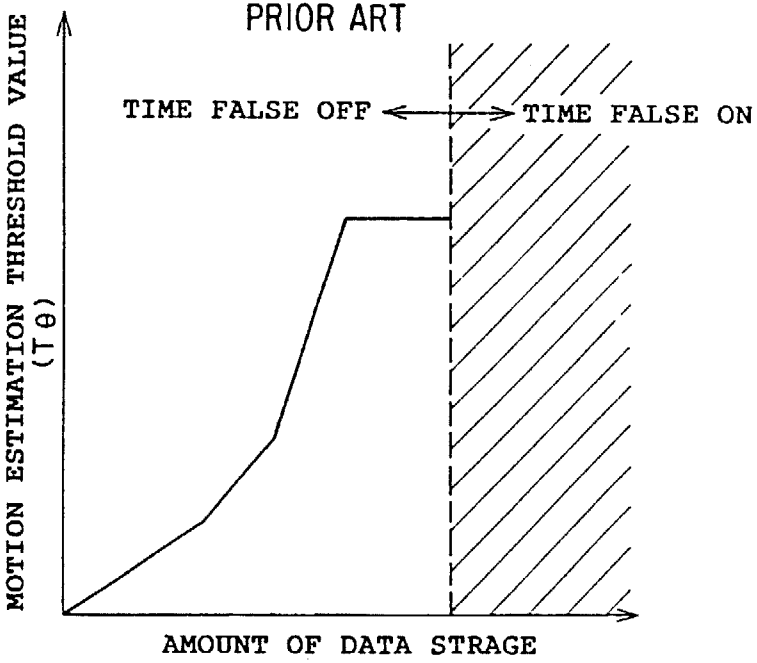
FIG. 3 PRIOR ART
FIG. 3 is an explanation diagram illustrating an example of encoding control method of an encoding section of an interframe encoding/decoding apparatus in the prior art.
Figure 2:
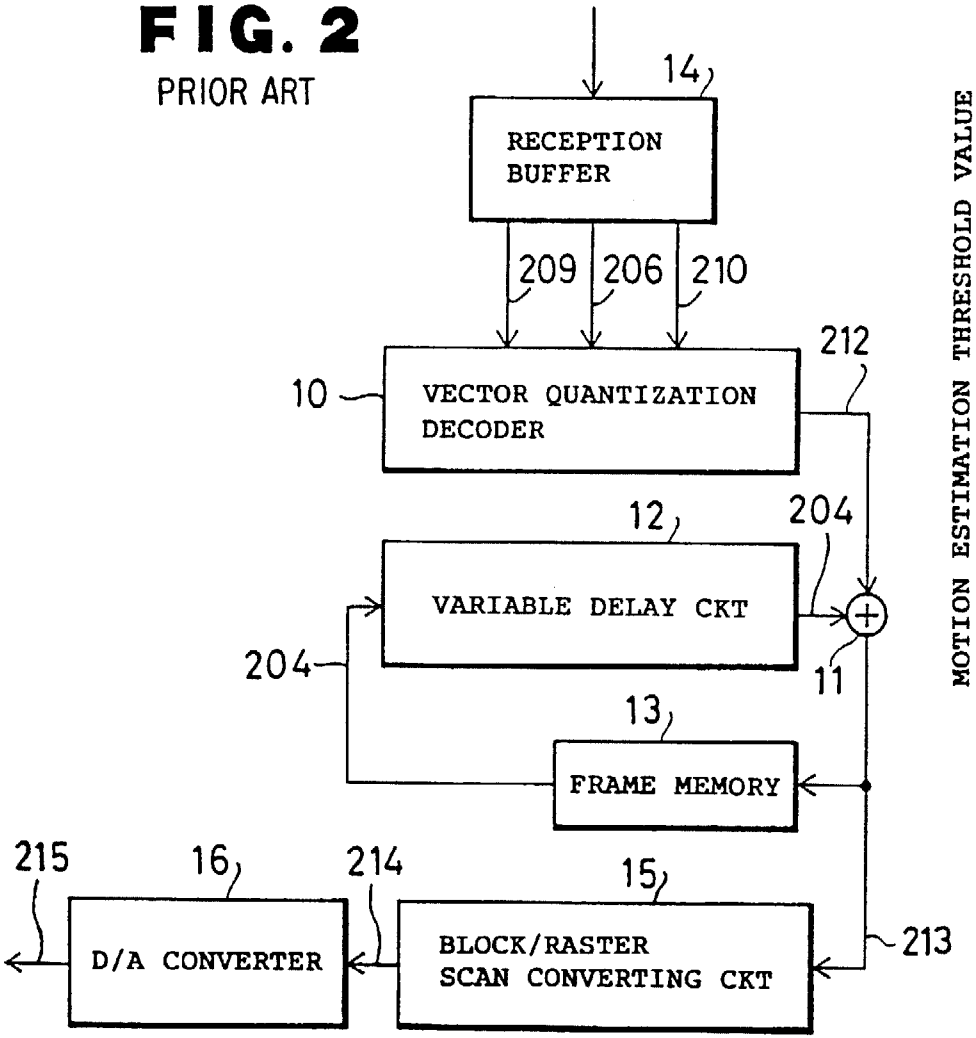
FIG. 2 PRIOR ART
FIG. 2 is a block diagram illustrating constitution of a decoding section of the interframe encoding/decoding apparatus.
Figure 4:
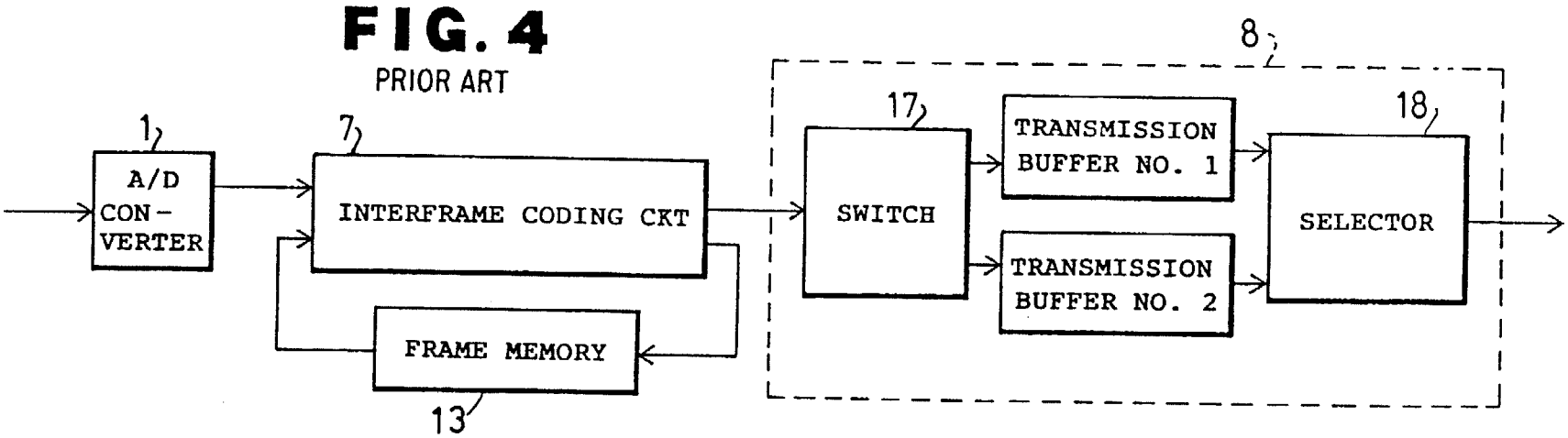
FIG. 4 PRIOR ART
FIGS. 4 and 5 are a block diagram illustrating constitution of an encoding section and a block diagram illustrating constitution of a decoding section in the prior art where a transmission buffer and a reception buffer are in double buffer constitution.
Figure 5:
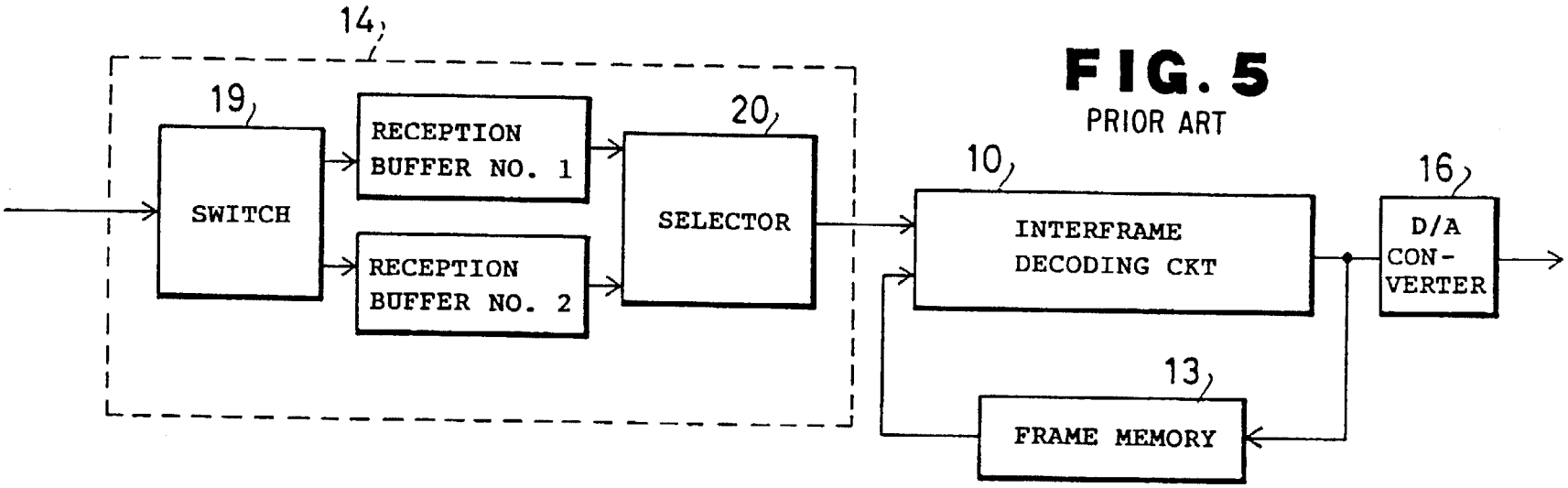
FIG. 5 PRIOR ART
Figure 6:
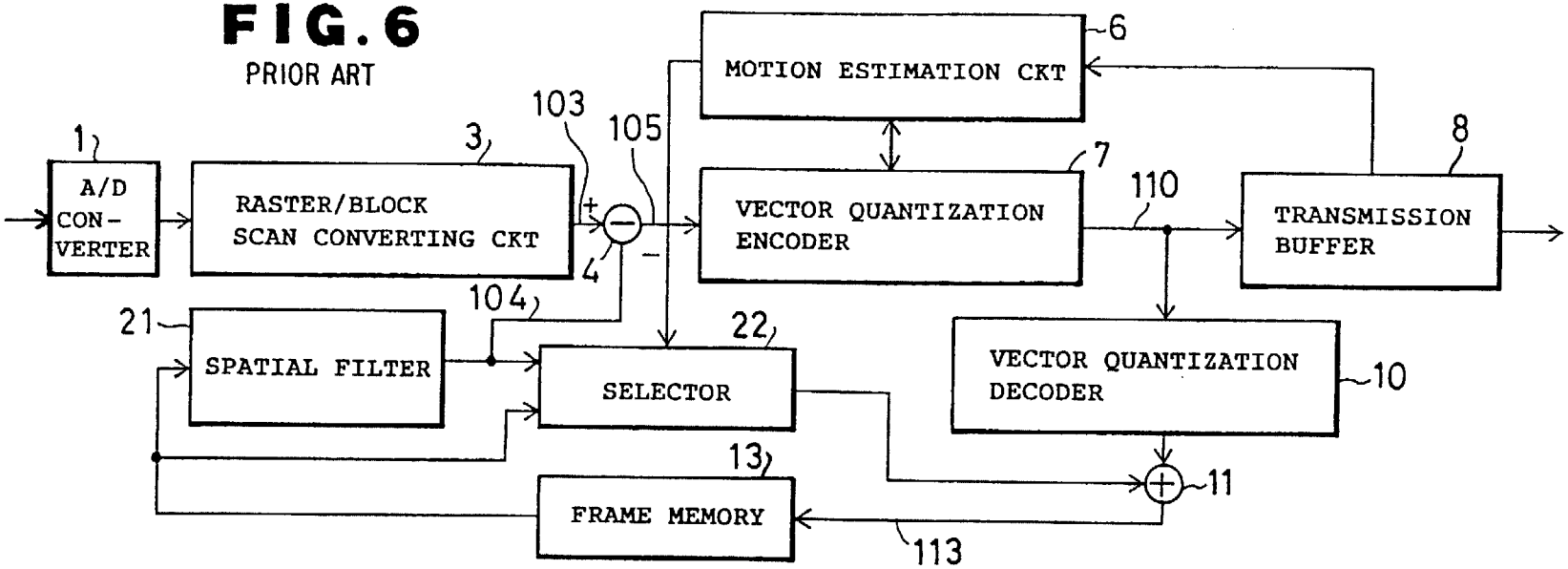
FIG. 6 PRIOR ART
FIGS. 6 and 7 are block diagrams illustrating constitution of an encoding section and a decoding section of an interframe encoding/decoding apparatus in the prior art using a spatial filter.
Figure 7:
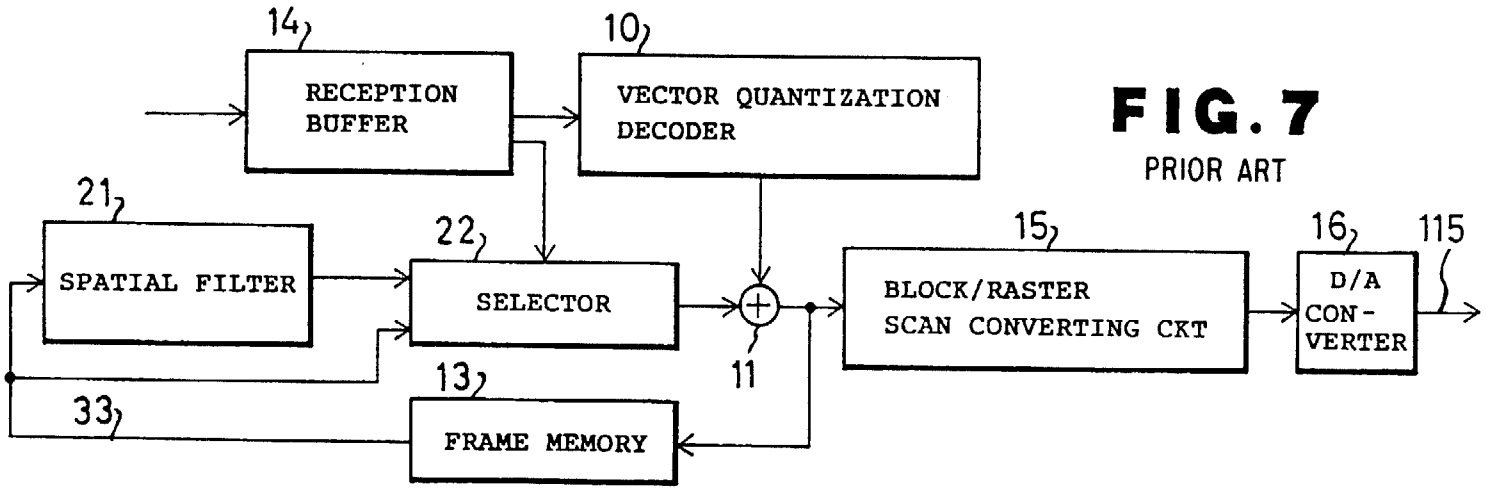
FIG. 7 PRIOR ART
Figure 8:
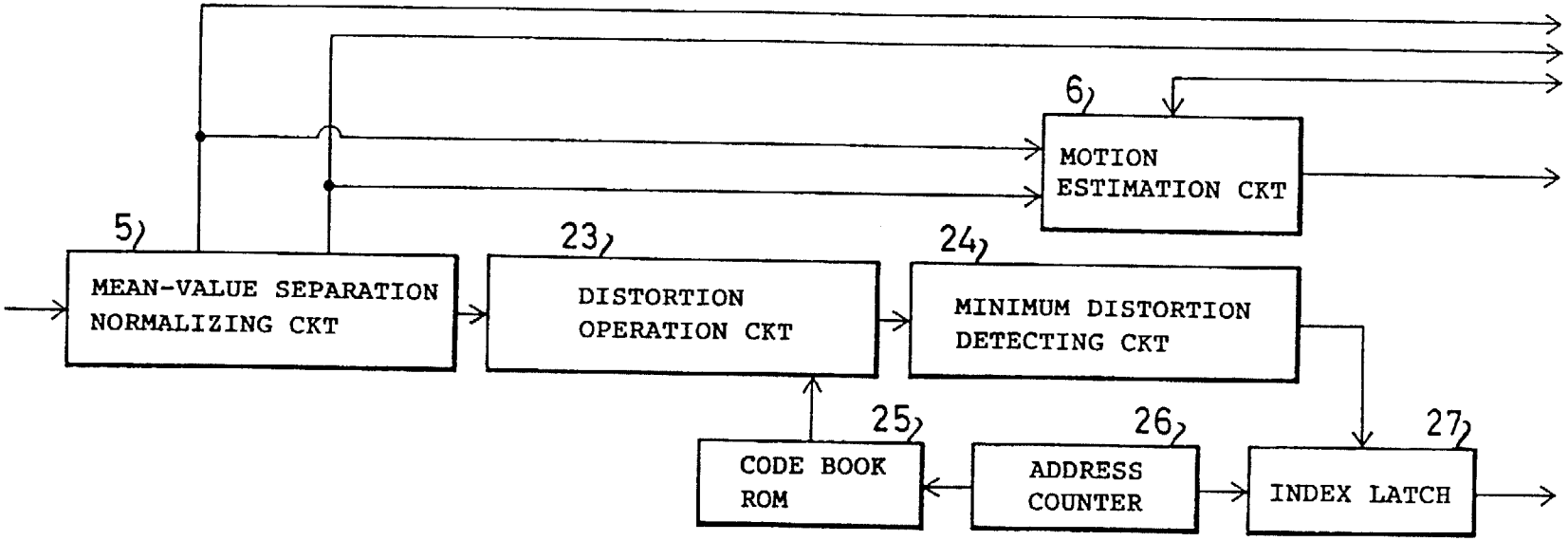
FIG. 8 PRIOR ART
FIGS. 8 and 9 are block diagrams of a vector quantization encoder and decoder.
Figure 9:
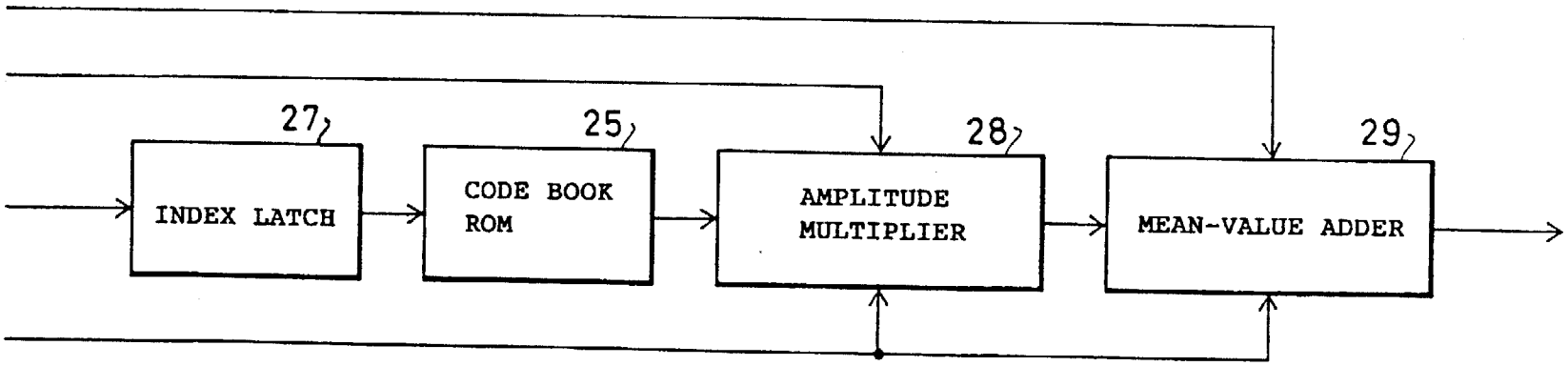
FIG. 9 PRIOR ART
Figure 10:
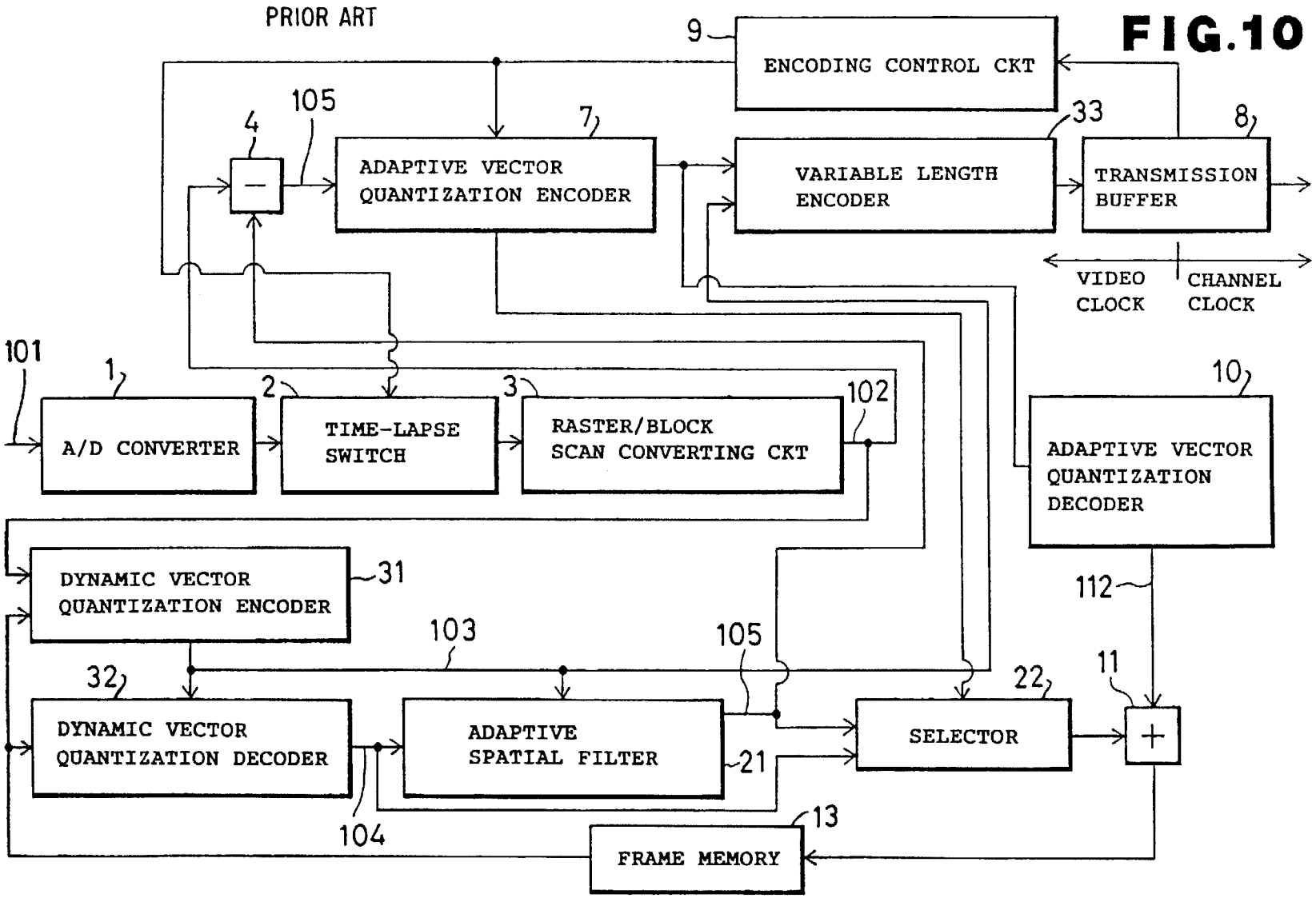
FIGS. 10 and 11 are block diagrams of an encoding section and a decoding section of an interframe encoding/decoding apparatus as another example in the prior art.
Figure 11:
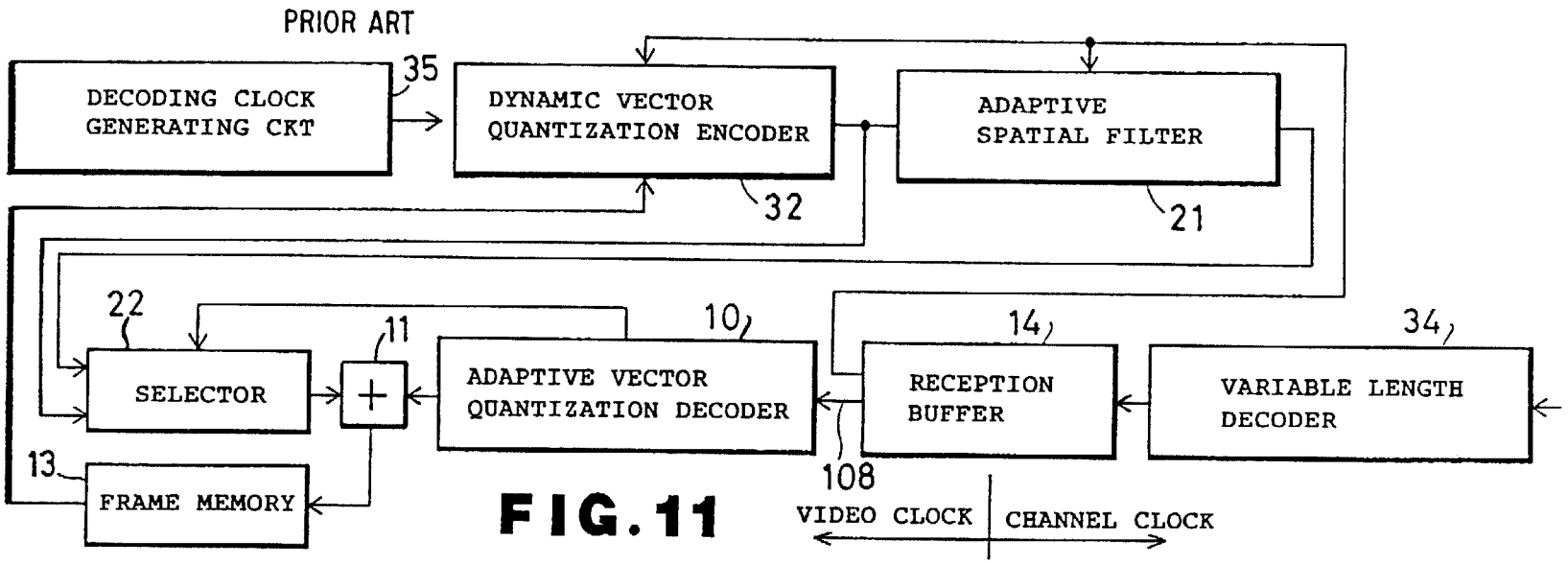
Figure 12:
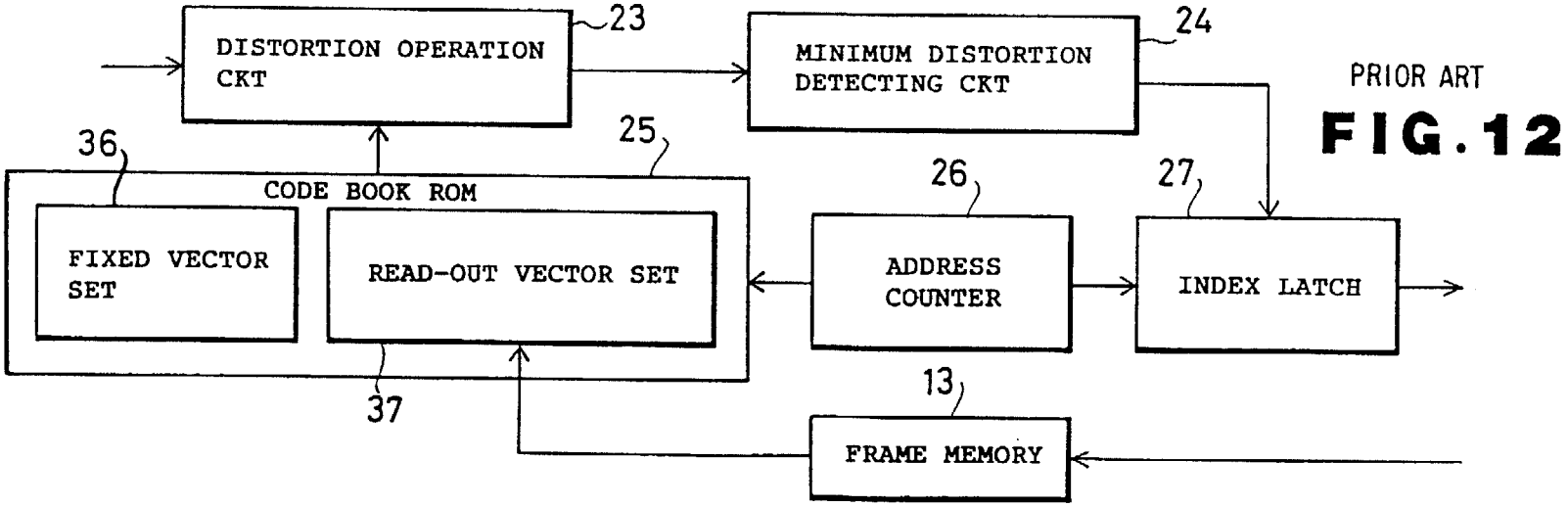
FIGS. 12 and 13 are block diagrams illustrating the constitution of a dynamic vector quantization encoder and decoder.
Figures 13, 14:
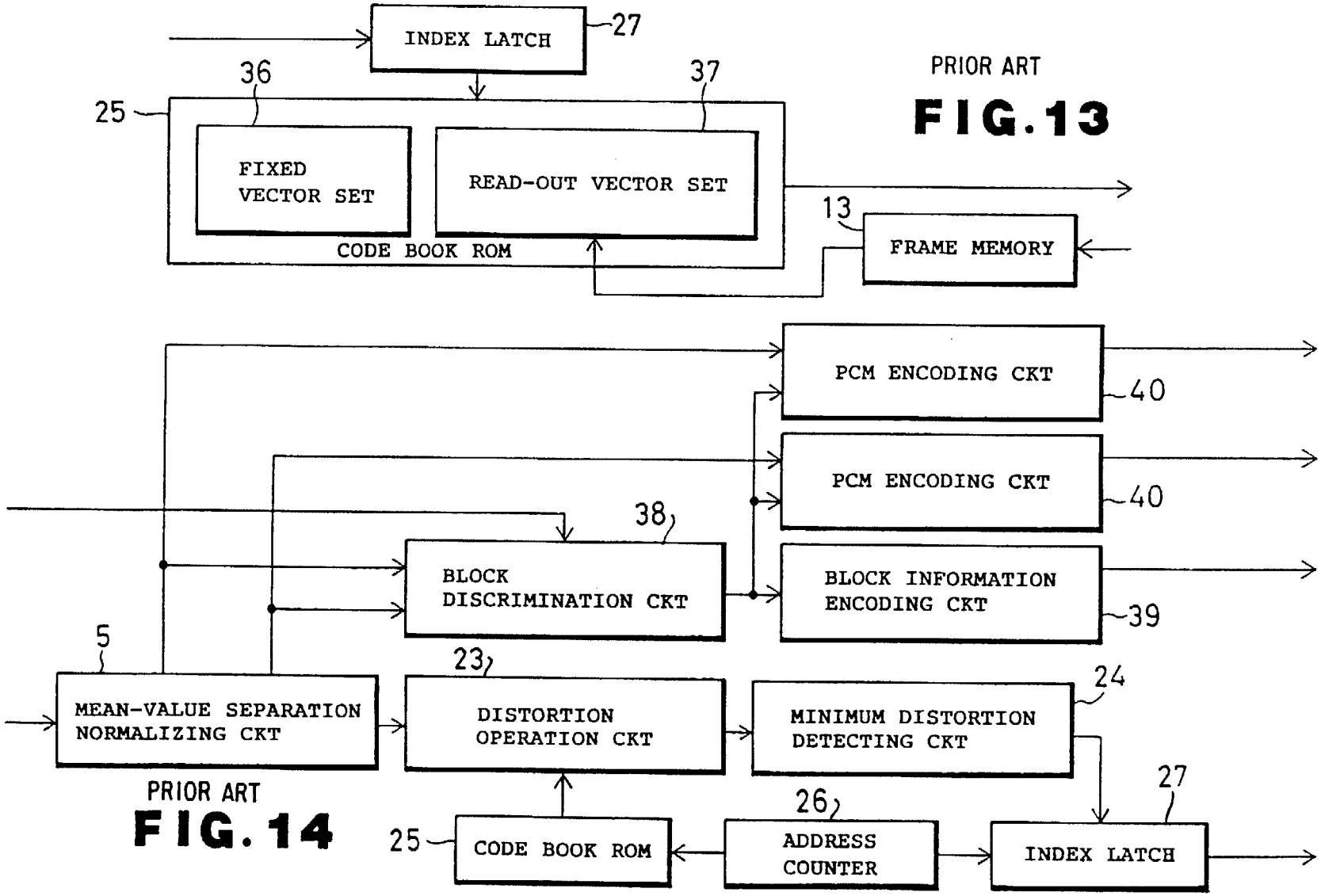
FIG. 13 PRIOR ART
FIGS. 14 and 15 are block diagrams illustrating the constitution of an adaptive vector quantization encoder and decoder.
Figure 15:
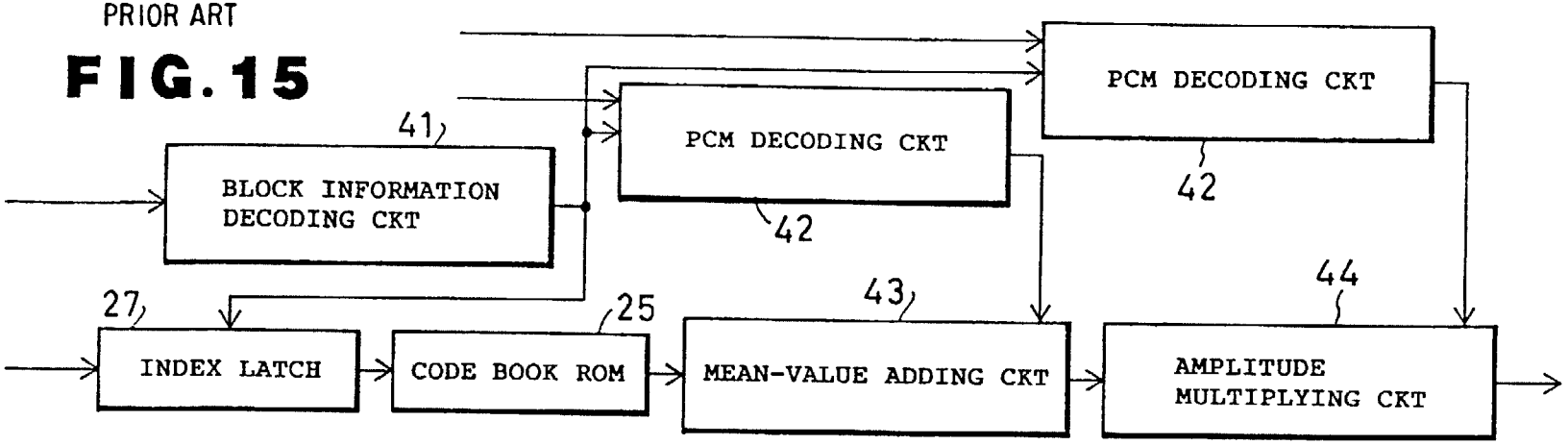
PRIOR ART FIG. 15
Figure 16:
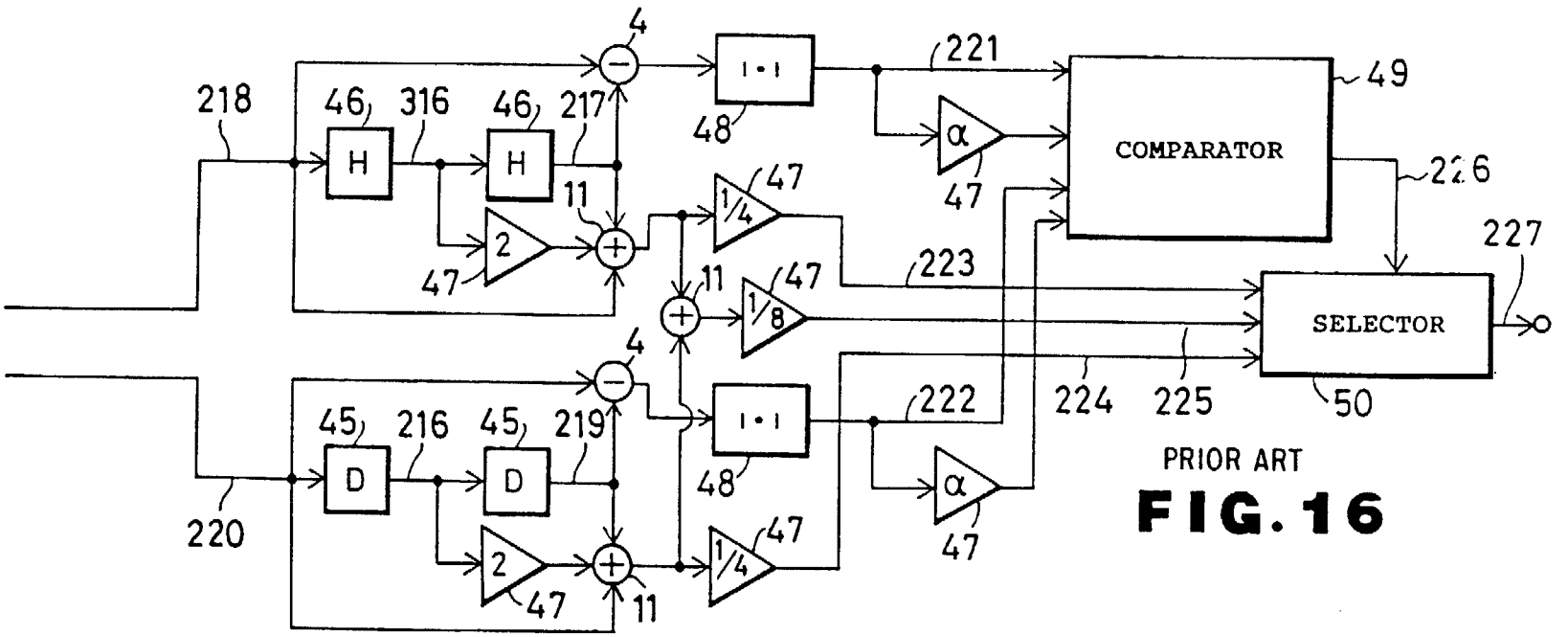
PRIOR ART FIG. 16
FIG. 16 is a block diagram illustrating constitution of an encoding section in the prior art using an information generating amount control circuit.
Figure 17:
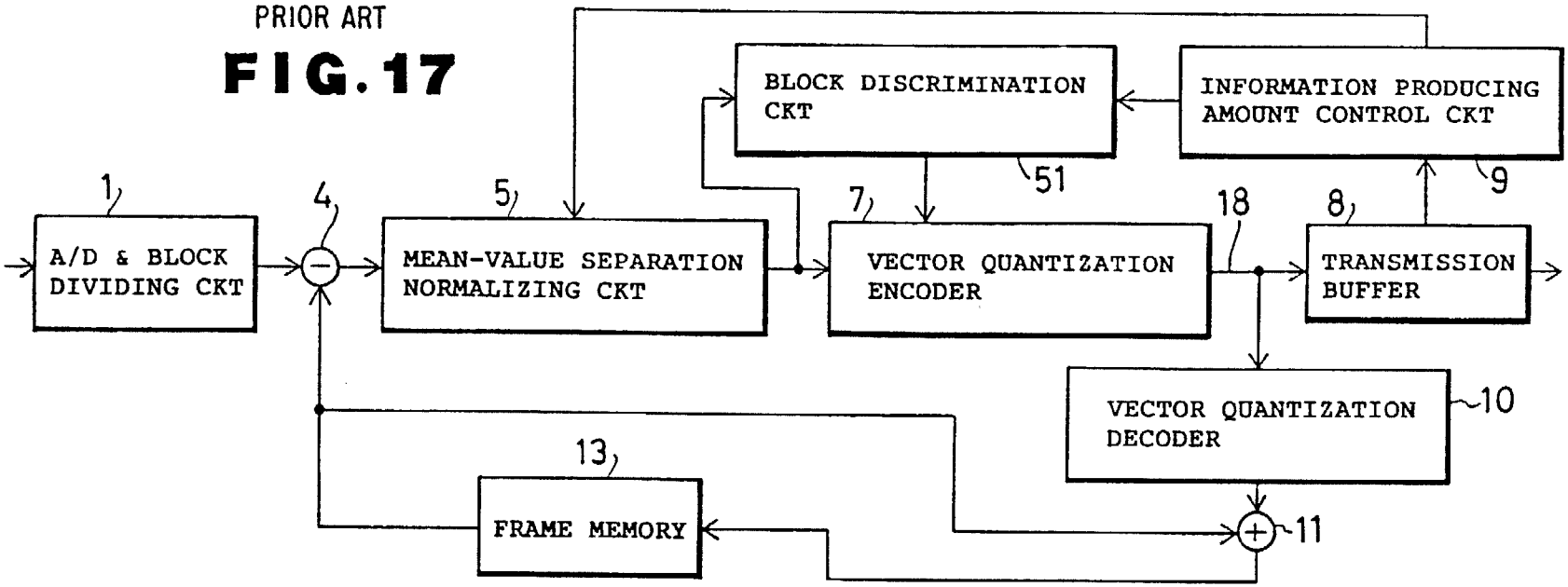
PRIOR ART FIG. 17
FIG. 17 is a block diagram illustrating constitution of a contour holding filter in the prior art.
Figure 18:
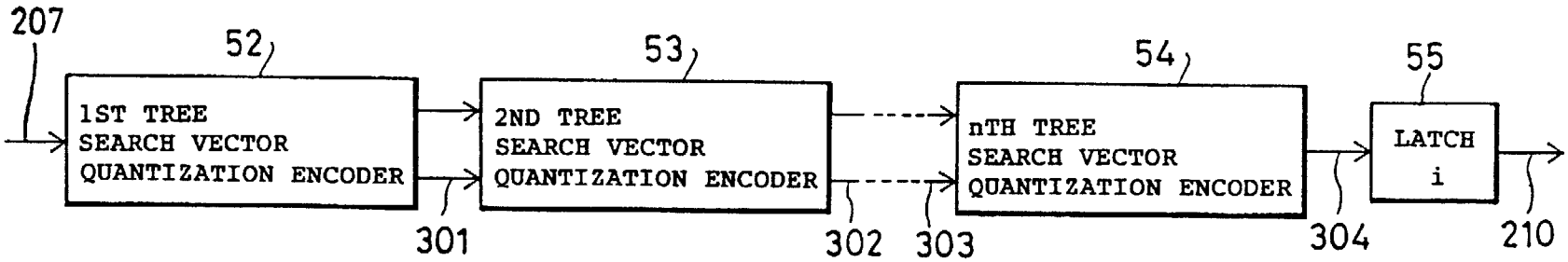
FIG. 18 PRIOR ART
FIG. 18 is a block diagram illustrating constitution of a tree search vector quantization encoder.
Figure 21:
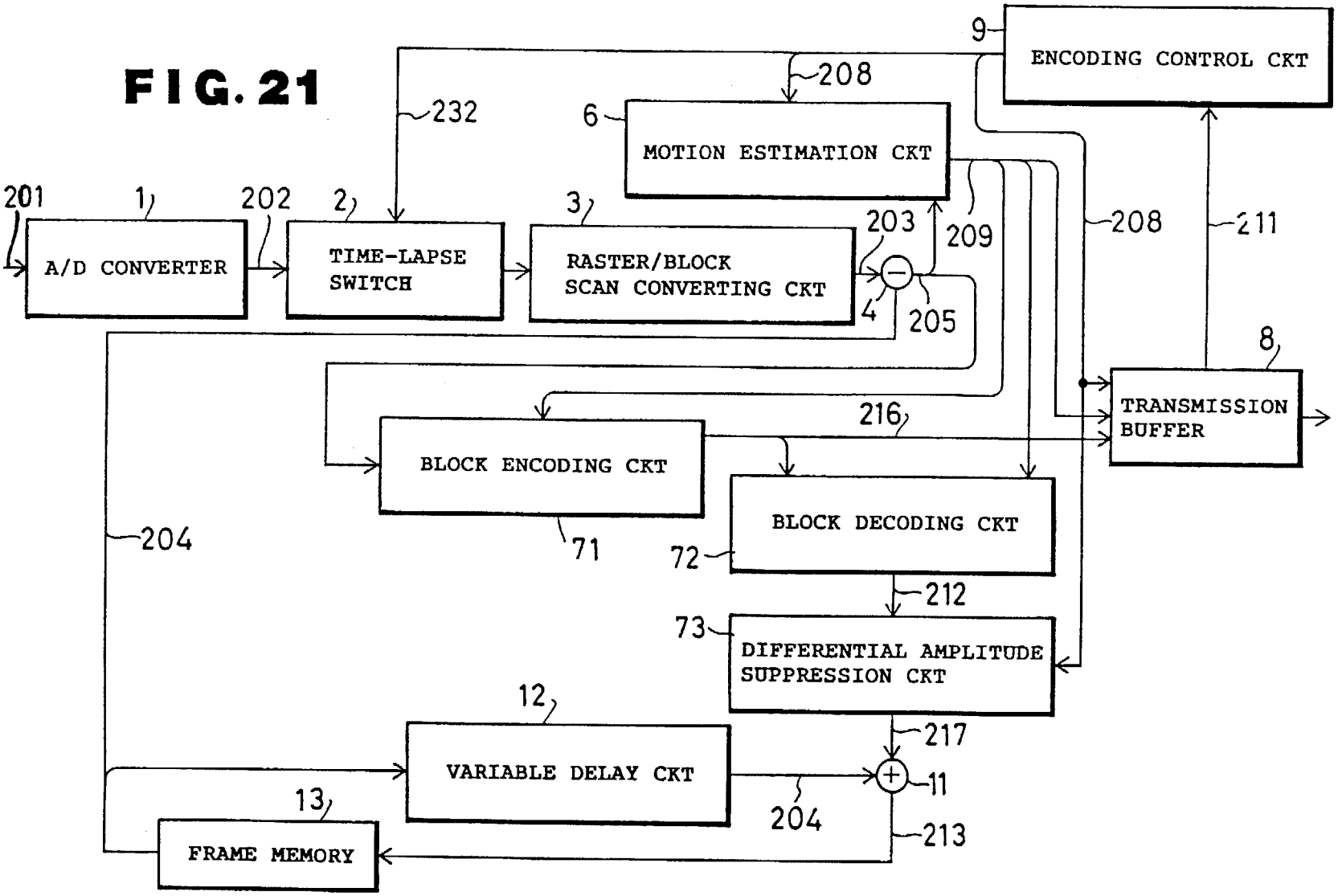
FIG. 21 is a block diagram illustrating constitution of an encoding section of an interframe encoding/decoding apparatus as an embodiment of the invention.

An embodiment of the invention will now be described referring to the accompanying drawings. In FIGS. 21 and 22, numeral 71 designates a block encoding circuit which encodes interframe differential block data in units of blocks, numeral 72 designates a block decoding circuit which reproduces interframe differential decoded block data from the encoded data in units of blocks and numeral 73 designates a differential amplitude suppression circuit which suppresses an amplitude value of the reproduced interframe differential decoding block data non-linearly. Other parts in this embodiment are the same as those in the prior art shown in FIGS. 1 and 2.

Operation will be described. Interframe differential block data $\epsilon_j$ 205 obtained in similar manner to the prior art is subjected to motion detection in units of blocks in a motion detecting circuit 6, thereby motion information 209 is outputted. The motion detection together with a motion detection threshold value Tθ 208 can be executed, for example, in the following operation.

$$\text{If } \sum_{j=1}^{k} |\epsilon_j| < T\theta \text{ then } v = 0 \text{ (no movement)}$$

$$\text{If } \sum_{j=1}^{k} |\epsilon_j| > T\theta \text{ then } v = 1 \text{ (movement existing)}$$

Encoding in units of block is performed on blocks of v=1 in the block encoding circuit 71, and blocks encoding data 216 together with the movement information 209 and the motion detection threshold value Tθ 208 are supplied to a transmission data buffer 8. The transmission data buffer 8 in similar manner to the prior art converts the motion information v 209 and the block encoding data 216 into encoded data such as a variable word length code, stores data for a definite period of time, and then transmits it to the transmission line at a definite speed, and also calculates the amount 211 of stored data within the buffer and supplies it to an encoding control circuit 9. The transmission data buffer 8 further transmits the motion detection threshold value 208 used in the motion detection in units of encoding frames. The encoding control circuit 9 supervises variation of the data storage amount 211, and performs control of ON/OFF signal 232 of an input time-lapse switch 2 and motion detection threshold value Tθ 208 in units of frames and supplies the motion detection threshold value Tθ 208 to the differential amplitude suppression circuit 73 as hereinafter described. The motion information v 209 and the block encoded data 216 are decoded in the block decoding circuit 72 and interframe differential decoded block data $\epsilon$ 212 is reproduced. Amplitude values of the interframe differential decoding block data $\hat{\epsilon}$ 212 are suppressed in the differential amplitude suppression circuit 73 non-linearly in units of blocks in response to the movement detection threshold value Tθ 208. That is, if the threshold value Tθ is small, the suppression width is made small, and if the threshold value Tθ is large, the suppression width is made large. An example of non-linear suppression characteristics is shown in FIG. 23. Interframe differential decoded block data $\hat{\epsilon}^*$ 217 suppressed by the differential amplitude suppression circuit 73 is added in an adder 11 to corresponding block data P 204 within the frame memory 13 delayed for a prescribed period of time by a variable delay circuit 12, thereby decoded reproduction block data $\hat{S}$ 213 is restored and the block data at the corresponding block position within the frame memory is updated.

In the decoding section as shown in FIG. 22, the movement information v 209 and the block encoded data 216, received in a reception data buffer 14 and subjected to variable length decoding and speed conversion, are decoded by the block decoding circuit 72 in similar manner to the encoding section, and interframe differential decoded block data $\hat{\epsilon}$ 212 is reproduced. The interframe differential decoded block data $\hat{\epsilon}$ 212 is subjected in the differential amplitude suppression circuit 73 to non-linear amplitude suppression processing shown in FIG. 23 by the movement detection threshold value Tθ 208 received through the transmission line in a similar manner to the encoding section, thereby the suppressed interframe differential decoded block data $\hat{\epsilon}^*$ 217 can be obtained. The suppressed interframe differential decoded block data $\hat{\epsilon}^*$ 217 and the block data P 204 within the frame memory outputted through the variable delay circuit are added, in adder 11, and decoded reproduction block data $\hat{S}$ 213 is restored in similar processing to the encoding section. The decoded reproduction block data $\hat{S}$ 213 is subjected to similar processing as the prior art through a block/raster scan converting circuit 15 and a D/A converter 16, thereby reproduction output moving picture signal 215 can be obtained.

The block encoding circuit and the block decoding circuit in the embodiment may be constituted using a vector quantization encoder and a vector quantization decoder in similar manner to the prior art.

In the motion detection circuit in the embodiment, the sum of the absolute value of amplitudes within the interframe differential block and the motion detection threshold value are compared, thereby the motion detection is performed, but the mean value, amplitude component and the motion detection threshold value within the block may be compared in similar manner to the prior art, thereby a similar effect to the embodiment can be obtained.

Figure 24:
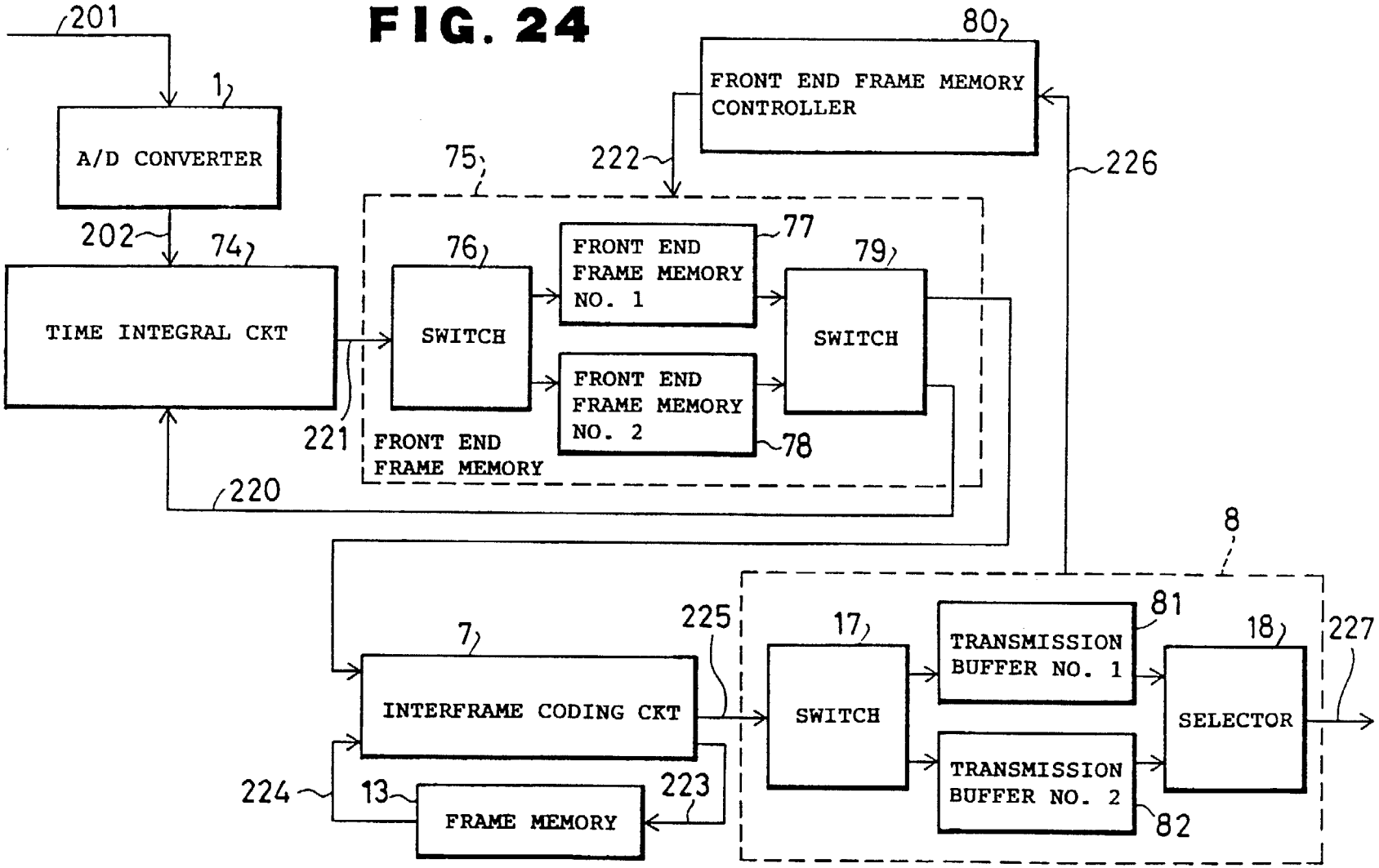
FIG. 24 is a block diagram illustrating constitution of an encoding section as another embodiment of the invention.
Figure 25:
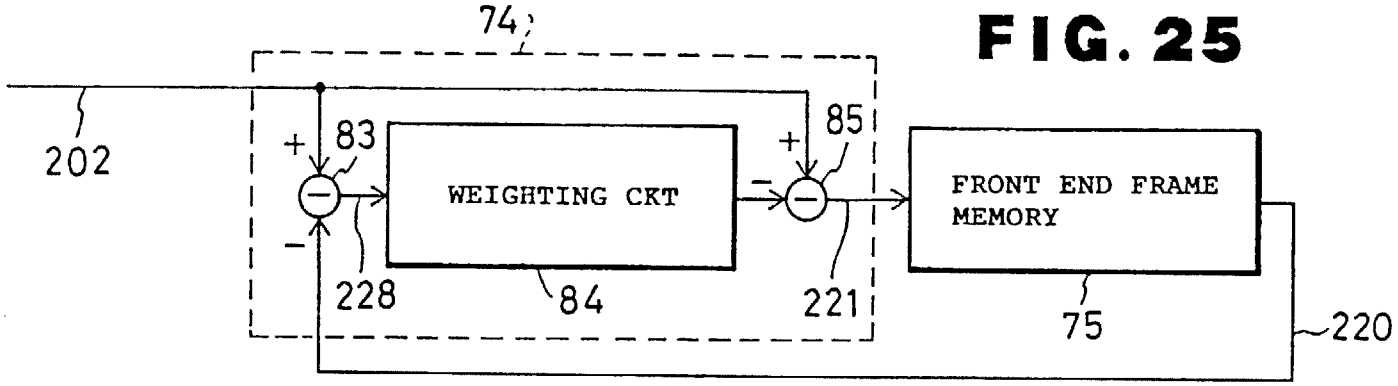
FIG. 25 is a block diagram illustrating constitution of a time integral circuit in FIG. 24.
Figure 26:
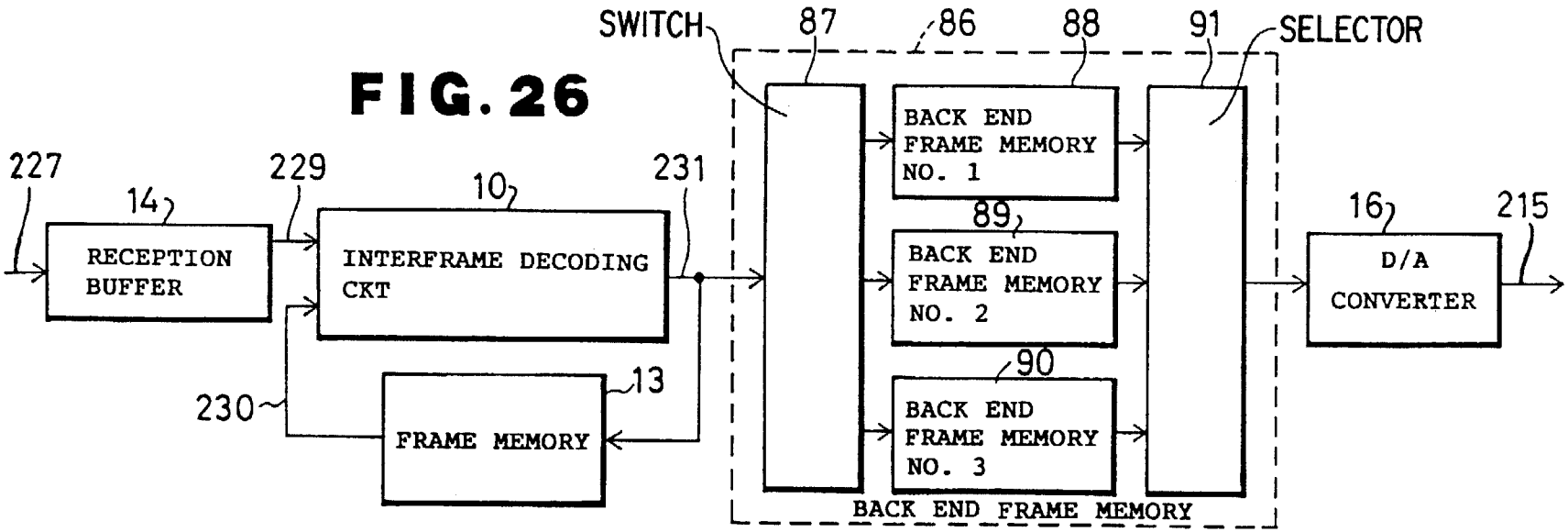
FIG. 26 is a block diagram of a decoding section as another embodiment of the invention.

FIG. 24 is a block diagram of an encoding section as another embodiment of the invention. Numeral 202 designates a digital video signal, numeral 74 designates a time integral circuit, numeral 75 designates a front end frame memory, numeral 220 designates a signal where content of buffer at the write side of the front end frame memory 75 in double buffer structure is read in sequence and made coincident with the digital video signal 202 in the pixel position on the picture frame, numeral 221 designates an input signal in time integral, numeral 76 designates a switch, numeral 77 designates a front end frame memory #1, numeral 78 designates a front end frame memory #2, numeral 79 designates a switch, numeral 80 designates a controller of the front end frame memory, numeral 222 designates a control signal of the front end frame memory, numeral 223 designates a locally decoded signal, numeral 224 designates a locally decoded value subjected to frame delay, numeral 225 designates encoded information, numeral 8 designates a transmission buffer, numeral 17 designates a switch, numeral 81 designates a transmission buffer #1, numeral 82 designates a transmission buffer #2, numeral 18 designates a selector, numeral 226 designates a signal indicating a storage amount or status of the transmission buffer in double buffer structure, and numeral 227 designates a transmission signal. FIG. 25 is a block diagram illustrating a constitution example of the time integral circuit in FIG. 24. In FIG. 25, numeral 83 designates a subtractor, numeral 228 designates an interframe differential signal, numeral 84 designates a weighting circuit, and numeral 85 designates a subtractor. FIG. 26 is a block diagram illustrating a constitution example of a decoding section. In FIG. 26, numeral 227 designates a transmission signal from the encoding section of FIG. 24, numeral 229 designates a reception encoded signal, numeral 230 designates a decoded signal subjected to frame delay, numeral 86 designates a back end frame memory, numeral 87 designates a switch, numeral 88 designates a back end frame memory #1, numeral 89 designates a back end frame memory #2, numeral 90 designates a back end frame memory #3, and numeral 91 designates a selector.

Next, operation will be described. The input video signal 201 is digitized by the A/D converter 1. The time integral circuit 74 uses the sequential signal which is contents of the buffer at write side of the front end frame memory 75 in double buffer structure, and writes a signal subjected to time integral corresponding to plural frames of the input signal 201 into the buffer at the front end write side. The time integral estimates differences between the input signal 202 and the signal 220, i.e., the interframe differences 228, and the value is converted by the weighting circuit 84, and further the differences to the input signal 202 is taken and the differential signal is subjected to the time integral in units of frame and written in the buffer. Assuming that an inputted signal at an n-th frame is made $S_n$, a signal representing the time integral of (n−1)th frame being written in the buffer is made $\tilde{S}_{n-1}$, and operation of the weighting circuit 84 is multiplication by k times, the time integral of $S_n$ is expressed as follows:

$$\begin{aligned}\tilde{S}_n &= S_n - k(S_n - \tilde{S}_{n-1}) \\ &= (1-k)S_n + k\tilde{S}_{n-1} \quad (0 \leqq k \leqq 1)\end{aligned}$$

The front end frame memory 75 operates the switch 76, the front end frame memory #1 77, the front end frame memory #2 78 and the switch 79, so that while picture frame data is subjected to the time integral and written into one buffer, the picture frame data is read from the other buffer and encoded for transmission. By changing over the switch 79, the picture frame signal to be encoded by coding circuit 7 and the frame memory read signal 220 required for the time integral at the write side are alternated between memory 77 and memory 78. Read of the picture frame signal to be encoded as an output of the front end frame memory 75 at the read side is performed intermittently by the control signal 222. This is performed so as to smooth the information generating amount by small steps as hereinafter described in detail. When one picture frame is read entirely, the double buffer is changed and content of the buffer at the side of the time integral until that time is read as a picture frame to be encoded. That is, the time integral is suspended by changing over the double buffers, in other words, by taking in the entire picture frame to be encoded. The number of picture frames subjected to the time integral continuously depends on how much time is required for the picture frame during the encoding transmission. The required time for the encoding corresponds to the information generating amount in the picture frame. If the information generating amount is large, it follows that the movement is large in the interframe encoding. That is, in a scene of large movements, the number of picture frames subjected to the time integral continuously is increased. That is, the dimmed picture in the time-domain is taken in. As the interval between the encoded picture frames becomes large, the time integral extends over a longer period, thereby the interframe correlation of the encoded picture frames is held and the interframe encoding efficiency is improved. At the same time, and effect of prevention of aliasing due to subsampling in the time-domain and an effect of reducing the noises are produced, as a result, the reproduced picture quality can be improved. As previously described, since the time integral is suspended by changing over the double buffers, when the time integral is started again, the output of the weighting circuit 84 must be made zero and the contents of the frame memory must be refreshed. The parameter k as previously described is made 0 immediately after changing over the double buffers, and subsequently the value is increased exponentially in accordance with the inputted picture frame sequence, thereby a valid result is also obtained.

Since the picture frame to be encoded by changing over the double buffers, is a picture frame subjected to the time integral and stored in the frame memory, the speed of the encoding processing can be selected arbitrarily. Consequently, if the processing time matched to a low transmission speed is set, a margin for multiplexing the circuits is produced and the apparatus in scale can be reduced.

The interframe encoding circuit 7 uses the interframe prediction signal 224 formed by delaying the signal 223 which is already encoded and locally decoded by one frame in the frame memory 13, and performs interframe encoding of the picture frame signal to be encoded. The encoded information 225 becomes a transmission signal 227 through the transmission buffer 8 and is transmitted to the transmission line.

The transmission buffer 8 transmits the signal 226 indicating the storage amount or the status of stored data to the controller 80 for the front end frame memory 75, and indirectly makes the encoding stop/restart so as to smooth the information generating amount. The transmission buffer 8 is in a double buffer structure. Assume now that picture frame data is read from the front end frame memory #1 77. The read data is encoded and written in the transmission buffer #1 81. If the storage amount of the buffer 81 exceeds a preset threshold value $Th_1$, the front end frame memory controller 80 stops reading from the front end memory #1 77. When the storage amount of the transmission buffer #2 82 is decreased to zero by reading, the double buffers of the transmission buffer 8 are changed over. Since the transmission buffer #2 82 becomes empty due to the changing over, reading from the front end frame memory #1 77 is started again and the encoded information 225 is written in the transmission buffer #2 82. The encoded information stored in the transmission buffer #1 81 is transmitted to the transmission line. In another case, before the storage amount of the transmission buffer #1 81 during writing reaches $Th_1$, the storage amount of the transmission buffer #2 82 during reading may become less than $Th_2$. Also in this case, reading from the front end frame memory #1 77 is first stopped, and the storage amount of the buffer 82 becomes 0 the double buffers of the transmission buffer 8 are changed over. Reading from the front end frame memory #1 77 is started again by the changing over. By repeating of these processes, the encoded information is transmitted without storing it in large quantities in the transmission buffer 8, thereby the delay time is decreased. The transmission buffer capacity may be smaller. The threshold value $Th_1$ regulates the information amount to be stored in one of the transmission buffers, and is determined from the delay time and the transmission speed. Since the threshold value $Th_2$ corresponds to a fragmentary information amount being insufficient to the transmission framing, it is determined by the transmission speed and format of the transmission framing.

In the decoding section of FIG. 26, decoding of the reception signal 229 is performed in the interframe decoding circuit 10 using the interframe prediction signal 230 formed by delaying the decoded signal 231 by one frame in the frame memory 13. The decoded signal 231 is written in the back end frame memory 86. The back end frame memory 86 is in triple buffer structure, and while one buffer performs reading in accordance with frame synchronization of the picture output system, another buffer is writing the decoded signal, and the third buffer is stopped. The third buffer 90 is necessary because the writing of the picture frame signal being received and decoded and the reading in accordance with the frame synchronization of the picture output system are completely asynchronous with each other, and neither of them is allowed to be suspended. The read signal from the back end frame memory 86 is converted into the decoded video signal 215 by the D/A converter 16.

In the control as above described, a time interval that some picture frame is read from the front end frame memory 75 and then decoded again, can be defined by the required time of about one cycle in the encoding transmission cycle of one picture frame. Consequently, as the transmission speed becomes lower, a reducing effect of the delay time is larger in comparison to the apparatus in the prior art.

Figure 27:
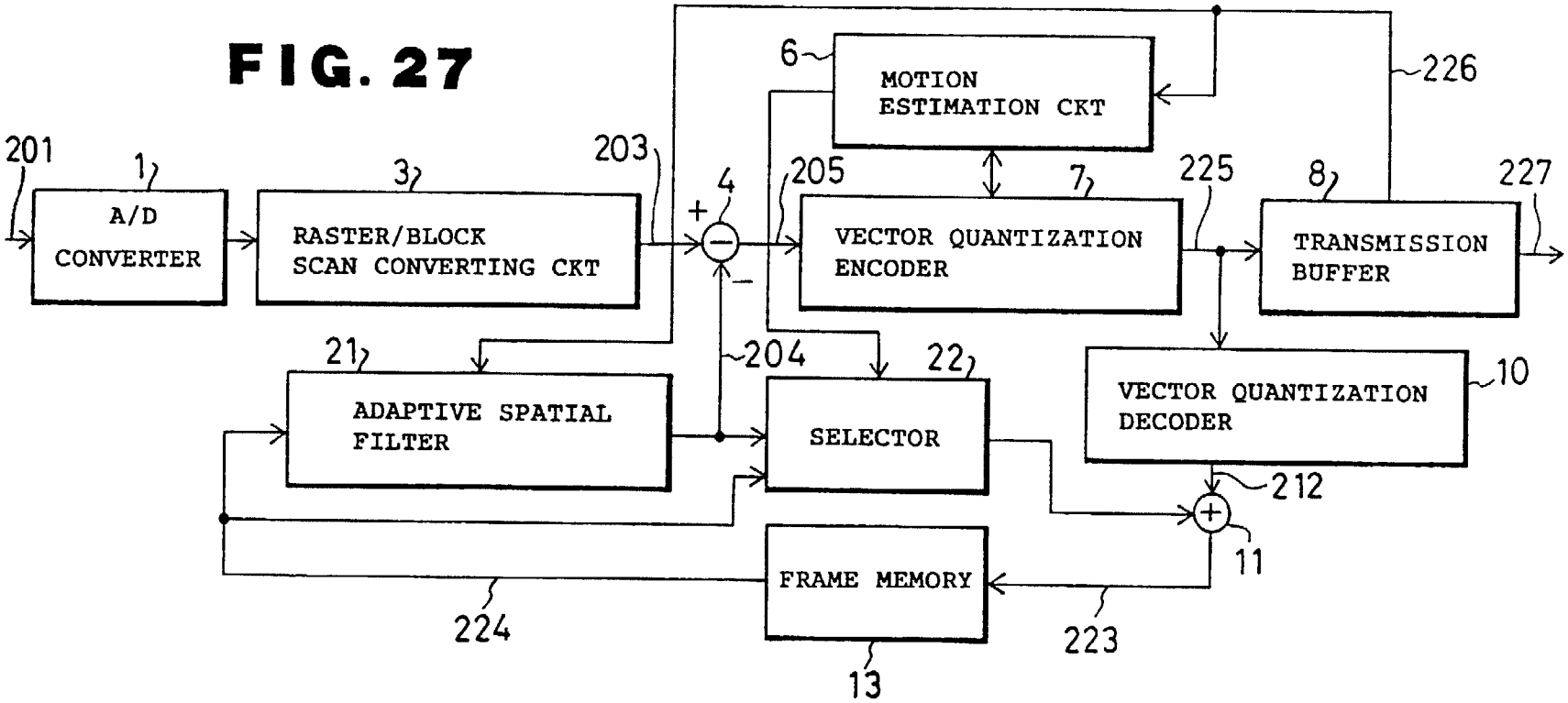
FIG. 27 is a block diagram of an encoding section as another embodiment of the invention.
Figure 28:
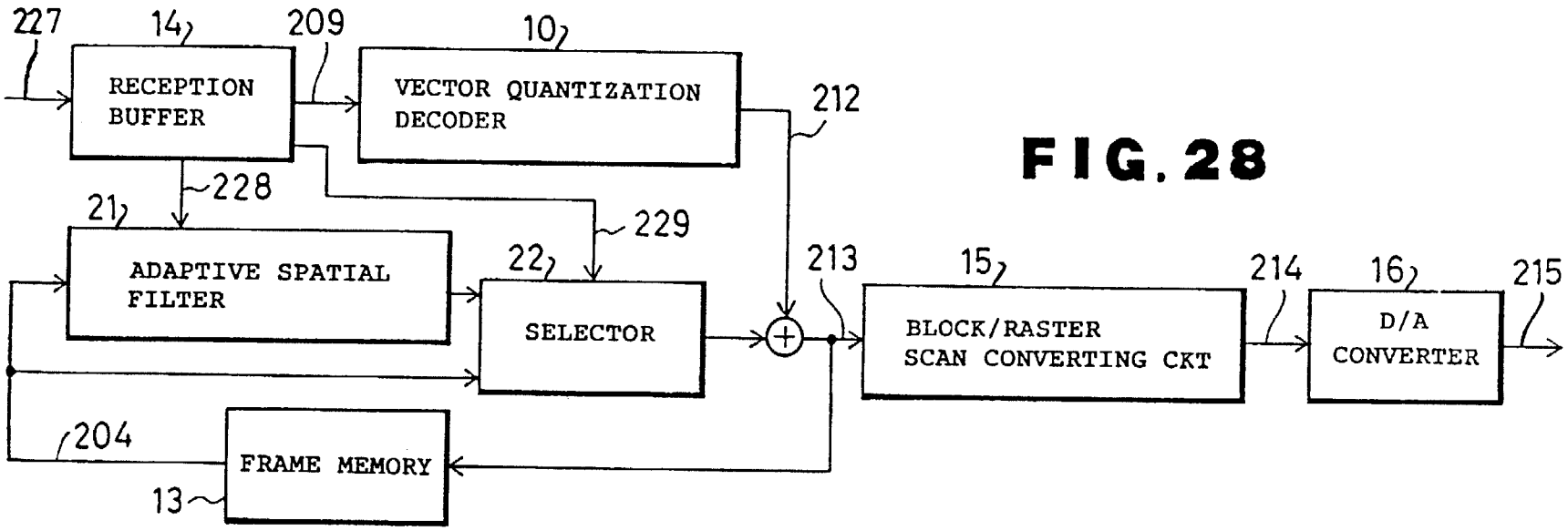
FIG. 28 is a block diagram of a decoding section as another embodiment of the invention.
Figure 29:
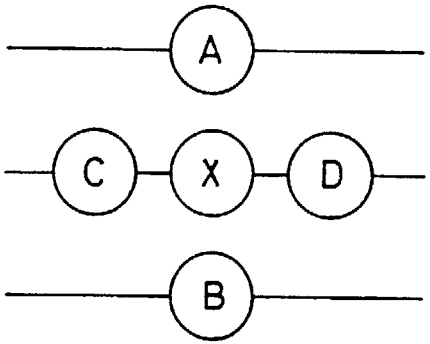
FIG. 29 is a pixel arrangement diagram for explaining an adaptive spatial filter.

FIG. 27 is a block diagram of an encoding section as another embodiment of the invention. Numeral 7 designates a vector quantization encoder, numeral 10 designates a vector quantization decoder, numeral 21 designates an adaptive spatial filter using an information amount of the transmission data buffer as a control parameter, and numeral 22 designates a selector changed over in accordance with valid/invalid block discrimination codes from a movement detecting circuit 6. FIG. 28 is a block diagram of a decoding section, and FIG. 29 is a pixel arrangement diagram for explaining the adaptive spatial filter.

Next, operation will be described.

Vector data 203 obtained by a raster/block scan converting circuit 3 is subtracted in a subtractor 4 by a previous frame vector 204 formed by applying the adaptive spatial filter 21 to previous frame vector 224 based on the same position block within a frame memory 13, thereby an interframe differential input vector 205 can be obtained. The adaptive spatial filter 21 is controlled in its smoothing characteristics by parameter 226 in response to the data amount within the transmission data buffer 8 per frame in a similar manner to threshold value control of the movement detecting circuit 6, and the parameter 226 is transmitted as a control signal to the reception side. An interframe differential input vector 205 is encoded by the vector quantization encoder 7, and the movement detecting circuit 6 performs movement detection by using a threshold value varying with parameter 226 in response to the data amount within the transmission buffer 8. As a result of the movement detection, the interframe differential input vector 205 discriminated as a valid block is encoded and the encoded data 225 is written in the transmission data buffer 8. On the other hand, the encoded data 225 is decoded in the vector quantization decoder 10 into an interframe differential reproduction vector 212, and then added to previous frame vector 204 passing through the adaptive spatial filter 21 selected by the selector 22 and written as a decoded signal 223 to the frame memory 13. If an invalid block is discriminated in the decision, the encoding data 225 is not written in the transmission buffer 8, but a zero vector is outputted from the vector quantization decoder 10 and the previous frame vector 224 not passing through the adaptive spatial filter 21 is selected in the selector 22. That is, the contents of the frame memory 13 is not updated in the case of an invalid block. In place of selection of existence/non-existence of the filter in accordance with decision of valid/invalid blocks in the selector 22, updating/non-updating may be changed, of course, in the write control of the frame memory.

Next, the decoding section will be described referring to FIG. 28. Reception data 227 from the transmission line is stored in a reception data buffer 14 and is read in at the decoding speed. The adaptive spatial filter 21 changes smoothing characteristics each frame in response to a filter control signal 228 transmitted from buffer 14. Also the adaptive spatial filter 21 controls the selector 22 once per block in response to the valid/invalid discrimination codes 229. The vector quantization decoder 10 or subsequent portions are formed a common loop with the encoding section, and the contents of the frame memory 13 of the encoding section is coincident with that of the decoding section. The decoded signal 213 written in the frame memory 13 is converted by a block/raster converting circuit 15 into a raster form, and then outputted as an analog video signal 215 from the D/A converter 16.

An example of adaptive spatial filter characteristics can be expressed in the following formula with respect to a pixel arrangement shown in FIG. 29. Assuming that X' is a filter output in pixel position of X, $$X' = \alpha X + \frac{(1-\alpha)}{4}(A+B+C+D)$$

$\alpha$: a control parameter ($0 < \alpha \leqq 1$)

$\alpha$ becomes a maximum value 1 if the transmission buffer data amount is small, and a small value if the buffer data amount is large.

That is, when the movement within the picture frame is small and the encoded information amount is small, the motion detection threshold value is lowered and smoothing of the adaptive spatial filter 21 becomes weak and the previous frame vector 204 passing through the adaptive spatial filter 21 gets close to the previous frame vector 224. Consequently, regarding still regions of the inputted picture, the interframe difference input vector 205 becomes very small and decision of invalid block is made in the valid/invalid block discrimination. If moving regions exist, the motion detection threshold value is low and therefore the decision of valid block is made and encoding is performed. Since smoothing of the adaptive spatial filter is weak, an eliminating effect to the vector quantization noises on the encoded block is small. However, if the movement is small, the power of the interframe differential signal is small and the vector quantization noises generated are small, thereby no problem occurs.

On the other hand, if the movement within the block is large and the encoded information amount is great, smoothing of the adaptive spatial filter 21 becomes strong and the previous frame vector is a smoothed output of the frame memory. In the still regions, since portions of a strong edge are smoothed, the edge portions appear in the interframe differential input vector. However, since the movement detection threshold value is raised, the edge in the still region is not made valid and the encoding is not performed. A portion of large movement is made valid in the movement detecting section and encoded, but since the smoothing characteristics of the adaptive spatial filter 21 become strong, the vector quantization noise is removed.

Figure 30:
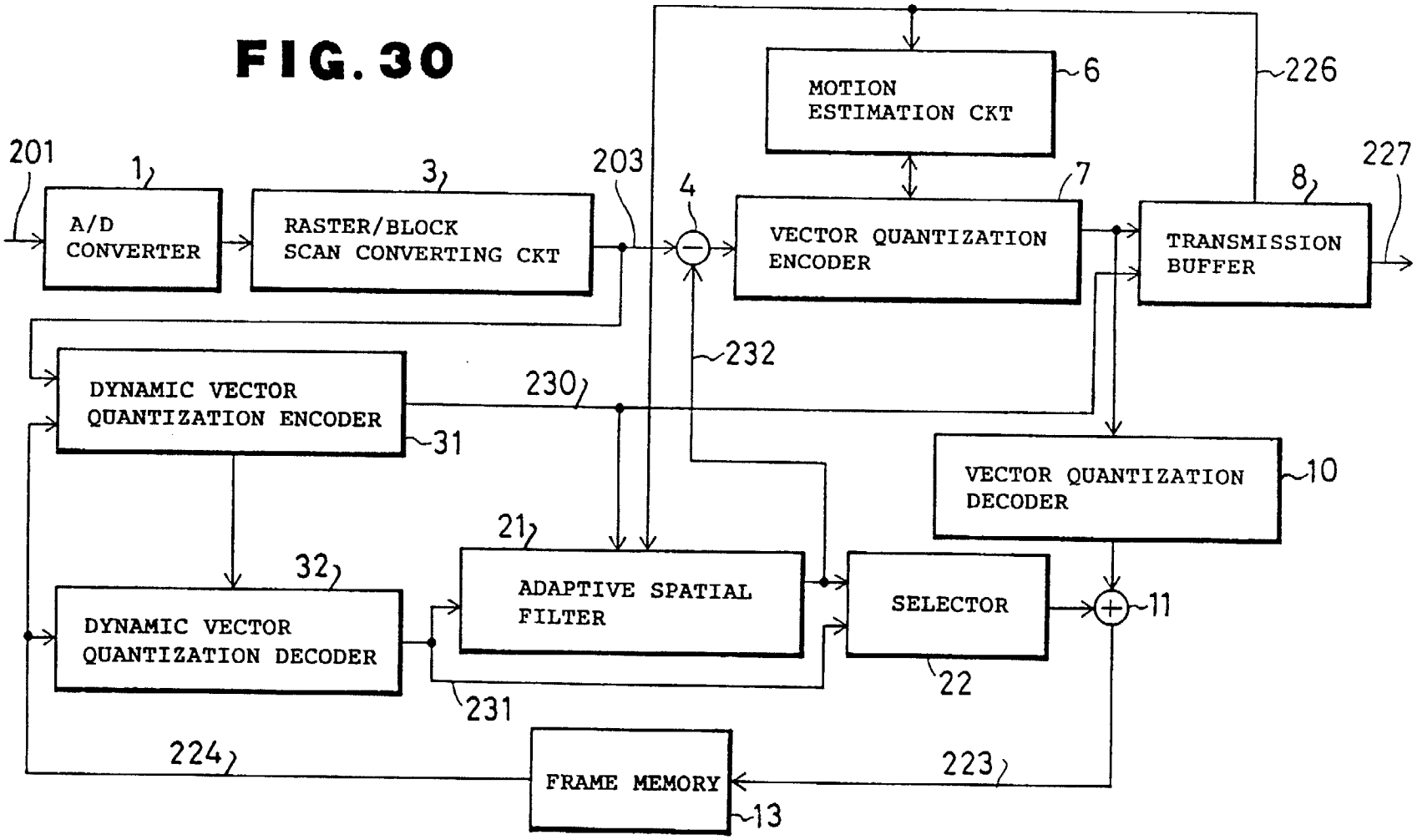
FIG. 30 is a block diagram of an encoding section as another embodiment of the invention.

An example where the embodiment is applied to a dynamic multi-stage vector quantization apparatus will be described referring to FIG. 30. An input video signal 201 in the form of raster is subjected to A/D conversion by the A/D converter 1, then subjected to blocking and vector conversion in the raster/block scan converting circuit 3, and thereby an input vector 203 is formed. A dynamic vector quantization encoder 31 compares the input vector 203 with a previous frame vector 224, and outputs a dynamic output vector index 230. A dynamic vector quantization decoder 32 outputs a dynamic vector quantization signal 231. In the subtractor 4, a signal 232 obtained by applying the adaptive spatial filter 21 in accordance with the embodiment to the dynamic vector quantization signal 231, is subtracted from the input vector 203, and the residual signal is vector quantized in the next stage. The residual signal is subjected to motion detection, vector quantization encoding and decoding, and then, in the case of a valid block, the dynamic vector quantization signal 232 passing through the spatial filter 21 selected by the selector 22, is added thereto. In this case of an invalid block, a zero vector from the vector quantization decoder 10 and the dynamic vector quantization signal 231 selected by the selector 22, are added. A decoded signal 223 decoded in this manner is written in the frame memory 13.

As a control signal of the adaptive spatial filter 21 in the dynamic multi-stage vector quantization encoding apparatus, not only a parameter 226 by capacity of the transmission data buffer 8 but also the dynamic output vector index 230 may be used effectively. Relation between the dynamic output vector index 230 and the smoothing characteristics of the adaptive spatial filter 21 is specified as follows. In the case of the index as output vector where content of the frame memory at a position displaced from the position of the input block by a prescribed pixel amount is outputted as an output vector, as the displacement amount is larger, smoothing of the filter is strengthened, if the displacement is 0, smoothing of the filter is not done, and strong smoothing is performed to an index using a fixed vector as an output vector, that is the spatial filter smoothing characteristics suited for state of the dynamic output vector index being selected are previously set. When the dynamic output vector index selects the frame memory output of displacement 0, the possibility of being the block of the still region is high, and in this case, if the spacial filter is not applied, it can be made the invalid block. In the case of an index where the frame memory output at the position of small displacement is outputted as an output vector, since the power of the residual signal between the input signal and dynamic vector quantization (hereinafter referred to as "DVQ") signal frequently has small power, even if it is quantized the quantization noise is small, and also since it can be made invalid depending on the movement detection threshold value, the spatial filter preferably performs the weak smoothing. In the case where the frame memory output at the position of relatively large displacement to the input block is outputted as an output vector, smoothing is more strengthened in the spatial filter characteristics, and the residue of the DVQ signal with the quantization noise smoothed is encoded, thereby storage of the quantization noise can be prevented.

Figure 31:
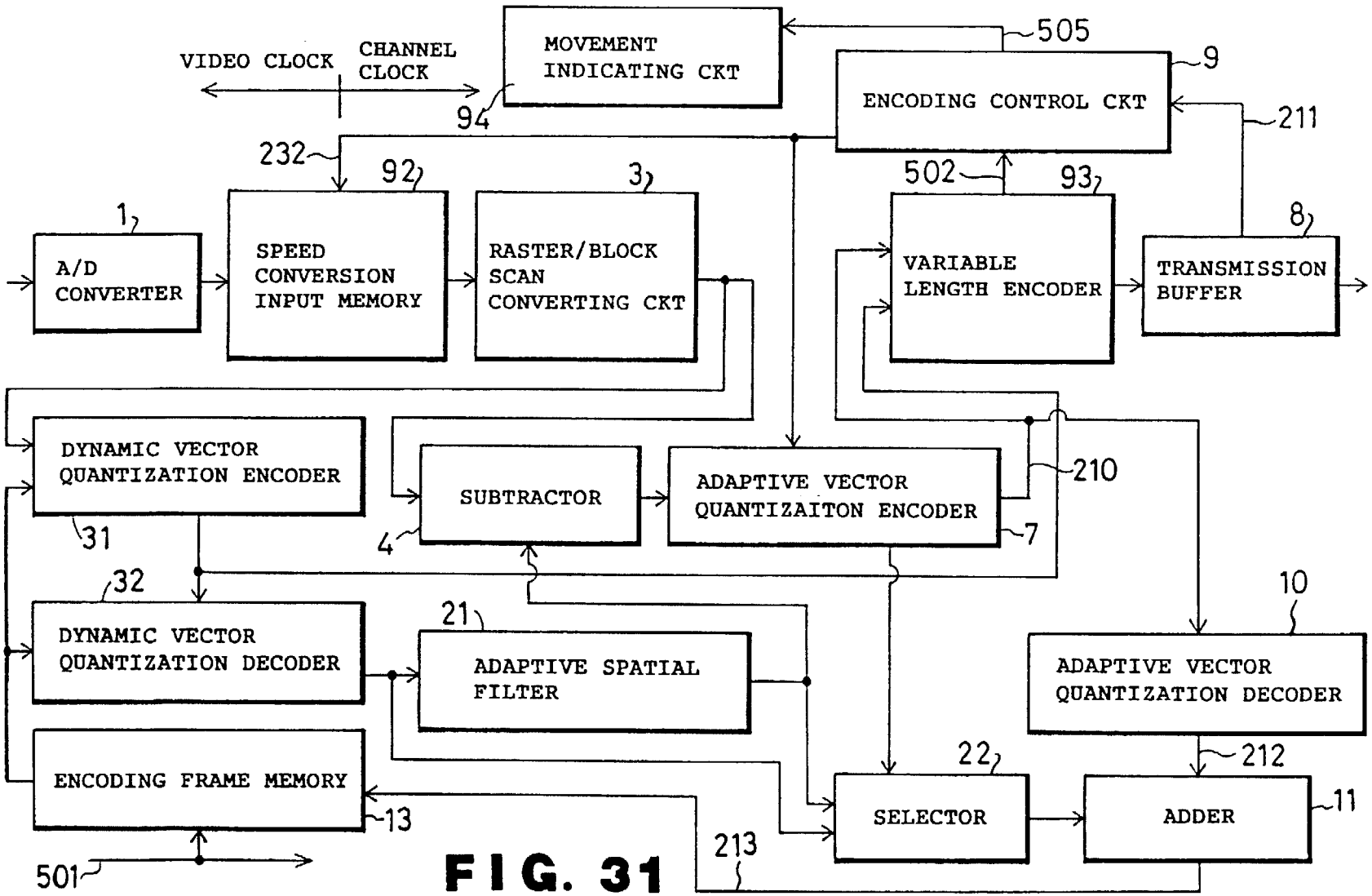
FIG. 31 is a block diagram of an encoding section as another embodiment of the invention.

FIG. 31 is a block diagram of an encoding section as another embodiment of the invention. Numeral 92 designates a speed conversion input memory which writes an input picture data at a speed synchronized with an input video clock, stores the picture data of at least one frame, and reads the input picture data at an encoding speed synchronized with a multiplied clock of the transmission line clock, numeral 93 designates a variable length encoder which converts the dynamic output vector index and adaptive vector quantization encoding data into suitable code words in units of input blocks, outputs the code words in sequence in format divided in units of input blocks, and counts the number of valid blocks generated in the adaptive vector quantization encoder within one picture frame, numeral 9 designates an encoding control circuit which estimates the movement amount by using the number of valid blocks obtained at the last encoding time and the last encoding time but one and the block discrimination threshold value in the case of encoding one input picture frame (or field) as units, determines a new threshold value from the movement amount, and performs write/read control of the speed conversion input memory, and numeral 94 designates a movement indicating circuit which has a function to visually confirm the estimated movement amount.

Figure 32:
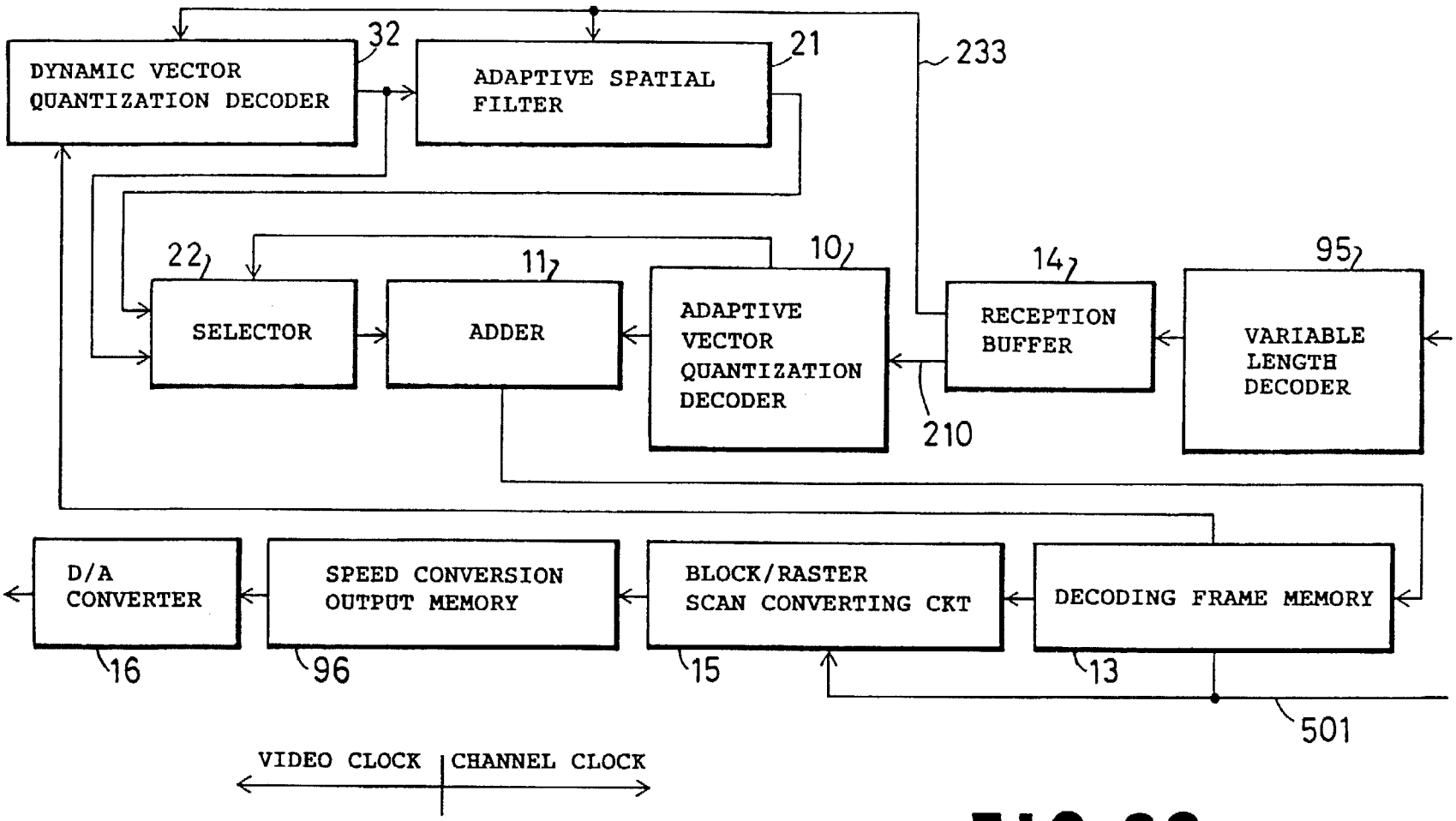
FIG. 32 is a block diagram of a decoding section as another embodiment of the invention.

FIG. 32 is a block diagram of a decoding section. In FIG. 32, numeral 95 designates a variable length decoder which decodes code series of the received data into a dynamic output vector index and adaptive vector quantization decoding data in sequence in format divided in units of input block, and numeral 96 designates a speed conversion output memory which writes decoded reproduction picture data at the decoding speed, stores the picture data of at least one frame, and reads the decoded reproduction picture data at speed synchronized with the output picture clock.

Next, operation will be described.

An analog signal in the form of raster is converted by the A/D converter 1 into digital signal series, and then the speed conversion input memory 92 takes digital signal series of a prescribed field or frame while being thinned out. The memory writes the digital signal series, i.e., input picture data at speed synchronized with the input picture clock, stores it by the prescribed number, for example, by one picture frame, then reads it in synchronism with the encoding speed being a multiple of the transmission line clock determined by a transmission rate, and thereby speed conversion of the input image data is performed. The memory has a function of reading and at the same time writing the input picture data of the next new picture frame. The input picture data from the speed conversion is subjected to encoding processing in similar manner to the prior art at the encoding speed. In this case, if a resolution changing signal 501 selected by a manual switch or the like indicates the resolution of one picture field, contents of one picture field in the encoding frame memory 13, is updated at each of frame periods in similar manner to the prior art. However, if the resolution changing signal indicates the resolution for one picture frame, regarding first field, interfield encoding is performed by using the encoding frame memory, and then subsequently in the second field, a reproduced picture locally decoded in the encoding processing is read in sequence from the top address of the encoding frame memory and the interfield encoding is performed, that is, write/read of the encoding frame memory is controlled in units of field. According to this control, even if the input picture data in number corresponds to one video frame, encoding can be performed with half a capacity of the frame memory corresponding to one video field. That is, regarding input picture data of one video frame, processing between frames is performed at the resolution of one video field, and processing between fields is performed at the resolution of one video frame. The resolution changing signal 501 is transmitted through the transmission line.

Figure 33:
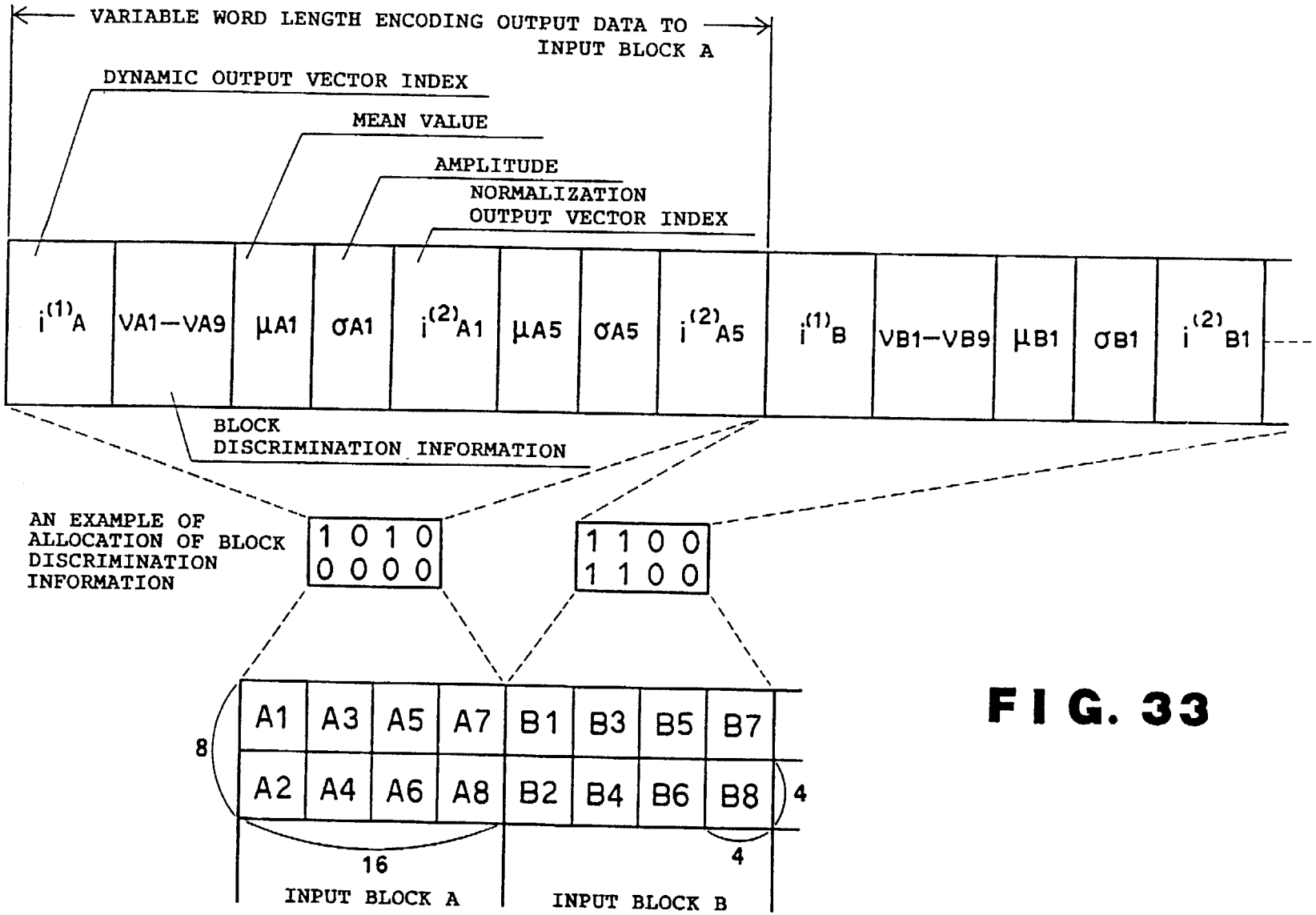
FIG. 33 is an explanation diagram illustrating an example of encoding in the encoding section in FIG. 32.

The input vector blocked in the raster/block scan converting circuit 3 is encoded through the dynamic vector quantization encoder 31, the dynamic vector quantization decoder 32, the adaptive spatial filter 21, the subtractor 4 and the captive vector quantization encoder 7. The encoded data comprises a dynamic output vector index i (1) outputted per input block (e.g., 16×8 samples), block discrimination information v outputted per smaller block (i.g., 4×4 samples) by further dividing the input block, and a mean value $\mu$, an amplitude $\sigma$, a normalized output vector index i (2) outputted only regarding the valid block. In the variable word length encoding circuit 93, each of the encoded data is converted into suitable code words, and outputted in sequence in format divided per input block. The format is shown in FIG. 33 in an example of the case that the input block size is 16×8 samples and the small block size is 4×4 samples. The block discrimination information within the input block may be encoded, for example, as pattern information of "0", "1" by assembling eight pieces. Further, the number of the valid blocks 502 with the block discrimination information being "1" is counted during the encoding period of one video frame (or field), and supplies to the encoding control circuit 9. The transmission data buffer 8 converts the code words supplied from the variable length encoding circuit 93 into serial code series, and writes the code series in sequence at speed synchronized with the encoding speed and immediately reads the written code series in sequence at speed synchronized with the transmission line clock determined by the transmission rate, thereby the speed conversion between the encoding speed and the transmission rate is performed. Further, a residual code amount after reading during the encoding period of one video frame (or field), i.e., storage amount 211 is calculated, and the storage amount is supplied to the encoding control circuit 9 at timing synchronized with an input video frame pulse. The encoding control circuit 9 stores the number of the valid blocks supplied from the variable word length encoding circuit 13 and the block discrimination threshold value at that time regarding the past two video frames (or fields), i.e., regarding the last encoding time and next to last encoding time, estimates the movement amount noting variation of the number of the two valid blocks and the two block discrimination threshold values corresponding to these numbers, determines a new block discrimination threshold value to be used in encoding the next video frame (or field) based on the movement amount, and supplies it to the adaptive vector quantization encoder 7. Also based on the storage amount supplied from the transmission data buffer 8, if the storage amount is greater than the prescribed amount, a speed conversion input memory control signal 232 is supplied to the speed conversion input memory 92, so that time false of the input picture is performed by inhibiting reading for a definite period. The movement amount indicating circuit 94 is that having a D/A conversion function to indicate on an indicator using LED element or the like, so that users can visually confirm the movement amount 505 supplied from the encoding control circuit 9.

On the other hand, adaptive vector quantization encoding data 210 is decoded in the adaptive vector quantization decoder 10, and a reproduced residual signal vector 212 is obtained. The reproduced residual signal vector 212 and output signal series are added in the adder 11, thereby a reproduced vector 213 is decoded and reproduced, and written in the encoding frame memory 13.

In FIG. 32, encoded data supplied from the transmission line is inverse transform and decoded from the code words in units of input block at a speed synchronized with the transmission line clock in the variable length decoder 95. The encoded data is written in the reception data buffer 14 at a speed synchronized with the transmission line clock, and immediately read in units of input block at the decoding speed synchronized with a multiple of the transmission line clock. The dynamic output vector index 233 is supplied to the dynamic vector quantization decoder 32 and the adaptive spatial filter 21, adaptive vector quantization encoded data 210 such as block discrimination information, mean value, amplitude, normalized output vector index or the like is supplied to the adaptive vector quantization decoder 10. A reproduced vector 213 is decoded and reproduced in synchronism with the decoding speed in similar decoding operation to that of the prior art, and written in the decoding frame memory 13. The reproduced vector 213 stored in the decoding frame memory 13 is converted reversely into digital signal series of the form of raster through the block/raster scan converting circuit 15, and the reproduced picture data of one video frame is written in the speed conversion output memory 96 in synchronism with the decoding speed. In this case, if the resolution changing signal 501 indicates one video field, the next field is interpolated. The speed conversion output memory 96 stores the reproduced picture data by a prescribed number, for example, by one video frame, and then reads it at speed synchronized with the video clock being asynchronous with the encoding section and outputs it through the D/A converter 16.

In the embodiment, although the number of the valid blocks generated at the encoding time of the last video frame and the encoding time of before the last video frame are used in order to estimate the movement amount in the encoding control circuit 9, the total code amount of the dynamic output vector indices or the transmission data buffer storage amount may be used in place of the number of the valid blocks.

Figures 34, 35:
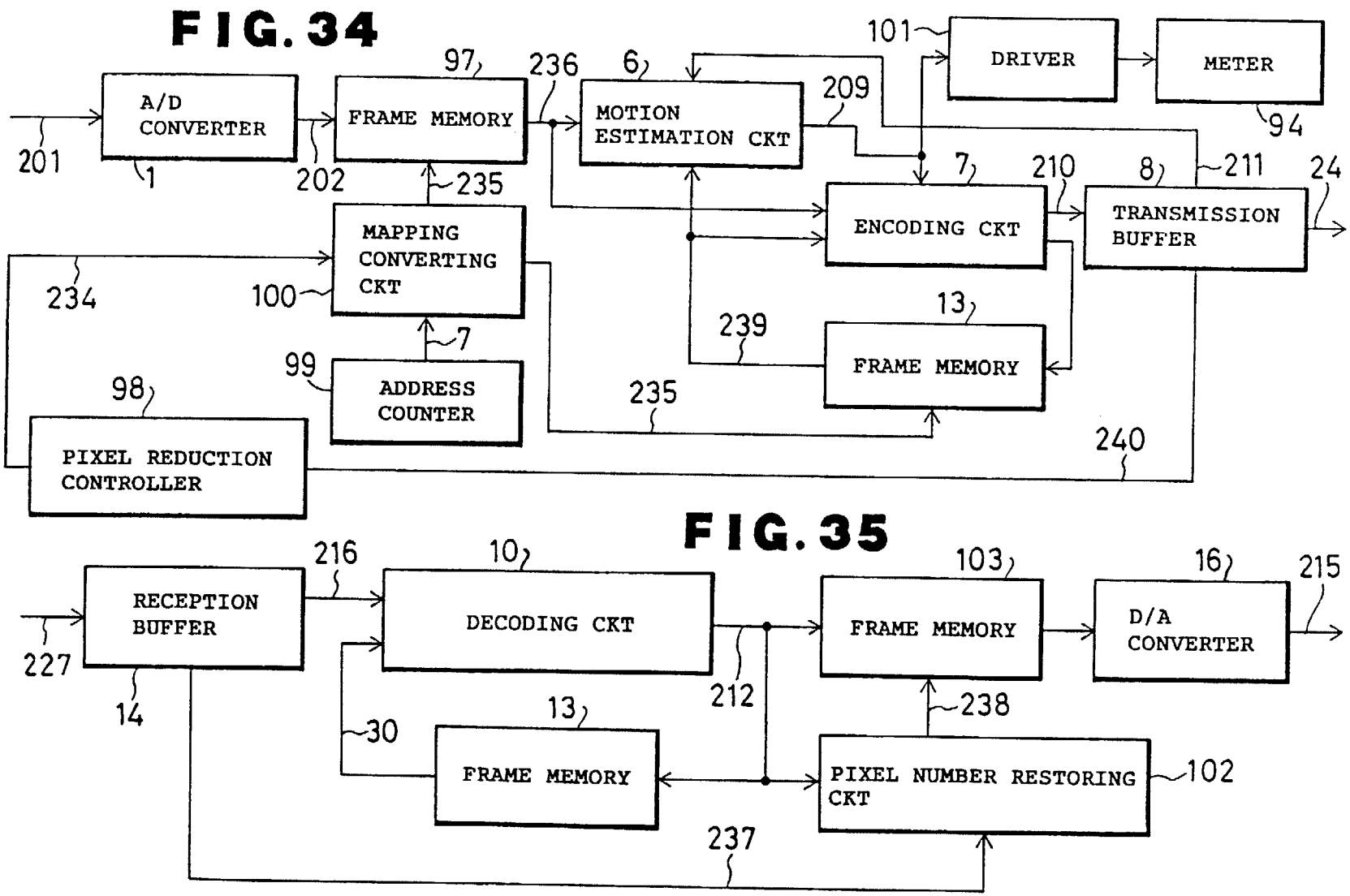
FIGS. 34 and 35 are block diagrams of an encoding section and a decoding section as another embodiment of the invention.

FIGS. 34 and 35 are block diagrams illustrating another embodiment of the invention. Numeral 97 designates a frame memory which can store digital signal converted by the A/D converter 1 at least by one picture frame, numeral 98 designates a pixel reduction controller, numeral 99 designates an address counter of the frame memory 97, numeral 100 designates a mapping converting circuit which maps the counter output finally to the read address of the frame memory 97, numeral 234 designates a control signal for the controller 98 to control the mapping conversion, numeral 235 designates a frame memory address signal, numeral 236 designates a digital video signal read by controlling the addresses, numeral 6 designates a motion detecting circuit, numeral 209 designates a signal indicating the movement detection result, numeral 101 designates a driver, numeral 94 designates a meter, numeral 102 designates a circuit which replenishes pixels reduced at the encoding time, numeral 237 designates a signal which provides information of what pixel reduction was performed at the encoding time to the circuit 102, numeral 238 designates dummy data or interpolation data to be inserted for the reduced pixels, and numeral 103 designates a frame memory which can store data of the whole picture screen by the decoded signal 212 and the replenished data 238.

Next, operation will be described. An input video signal 201 is sampled and quantized by the A/D converter 1, and becomes a digital video signal 202. The frame memory 97 stores the video signal 202. The user gives commands how the pixels are reduced or not reduced to the pixel reduction controller 98 in response to the working modes.

Figure 36:
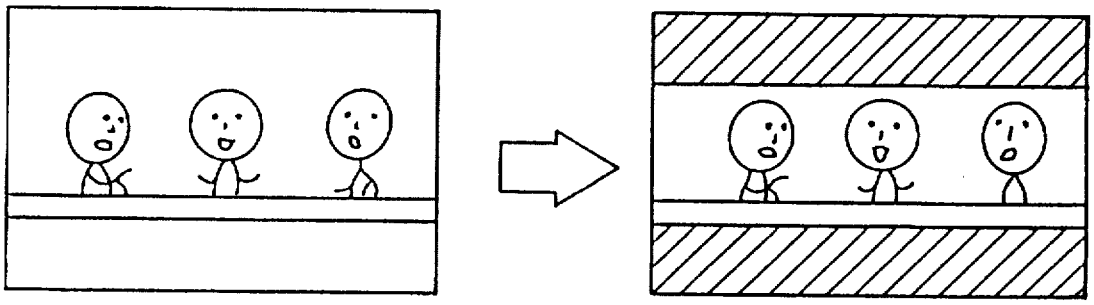
FIGS. 36 and 37(a) and 37(b) are operation explanation diagrams of a pixel number reducing circuit.

For example, in the case as shown in FIG. 36, upper and lower portions of the picture screen are unnecessary substantially. Since most of these portions are made "invalid" by the movement detecting circuit 6, only a small number of bits is assigned thereto, but the total amount is too great to be ignored because of the large area thereof.

Figure 37:
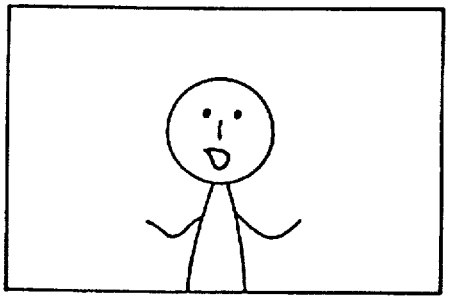
Figure 37:
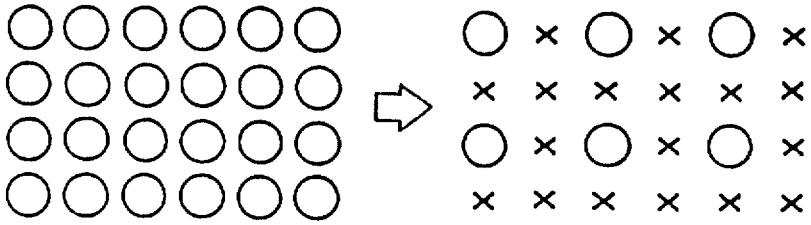

Consequently, after pixels at the upper and lower portions are cut away, remaining pixels are supplied as the encoding input signal 236. Then the pixel number is reduced by the cutting away. Also in the case as shown in FIG. 37(a), the resolution of the picture is not much necessary. Consequently, even if subsampling is performed as shown in FIG. 37(b), deterioration of the picture quality does not become significant. Then the number of the pixels is reduced by the subsample. Of course, processing without reducing the number of the pixels is also possible.

These processings are performed by the read control of the frame memory 97. The read address is generated by the counter 99. The mapping converting circuit 100 performs mapping conversion of the output of the counter 99 in accordance with the control signal 234 from the controller 98 thereby outputs the final read address 235. According to the mapping of the address, contents of the frame memory 97 can be read in the assigned format. In the movement detecting circuit 6, the signal at the position of the last picture frame corresponding to the same position as that of the signal 236 with the number of the pixels reduced as above described and already encoded and decoded, is read from the frame memory 13, and the movement detection (valid/invalid decision) is performed. The decision result signal 209 outputted from the movement detecting circuit 6 is sent to the driver 101. The driver 101 integrates the decision result signal 209 and calculates the movement amount, and drives the meter 94 according to the movement amount. In the encoding circuit 7, the signal 236 of the newest frame is subjected to interframe encoding by the decision result signal 209 and the encoding/decoding signal 239 at the time of the last frame read from the frame memory 13. The encoded information is locally decoded, stored in the frame memory 13, and used to encode the next frame. The transmission buffer 8 transmits the encoded information to the transmission line. The information 240 regarding the pixel number reduction from the pixel reduction controller 98 may be transmitted, for example, by adding it to the front of the frame. The transmission buffer 8 outputs the control signal to smooth the information generating amount in response to the storage amount, and controls the detection sensitivity in the movement detecting circuit 6. In the decoding section, the transmission signal 227 is taken in the reception buffer 14, and the reception encoding signal 216 is decoded in the decoding circuit 10. The decoded signal 212 is stored in the frame memory 13 and used to decode the next frame or subsequent frames. In the pixel number replenishing circuit 102, for the decoded signal 212 in the pixel reduced state, the dummy data is inserted in the cut-away portions and interpolation is performed to the subsampled picture. That is, the decoded signal and the inserted data or the interpolation data 238 are written in the frame memory 103 thus the data corresponding to the whole picture screen can be stored. Since the output signal of the frame memory 103 includes all pixels, the reproduction video signal 215 can be obtained by the D/A converter 16.

Figure 38:
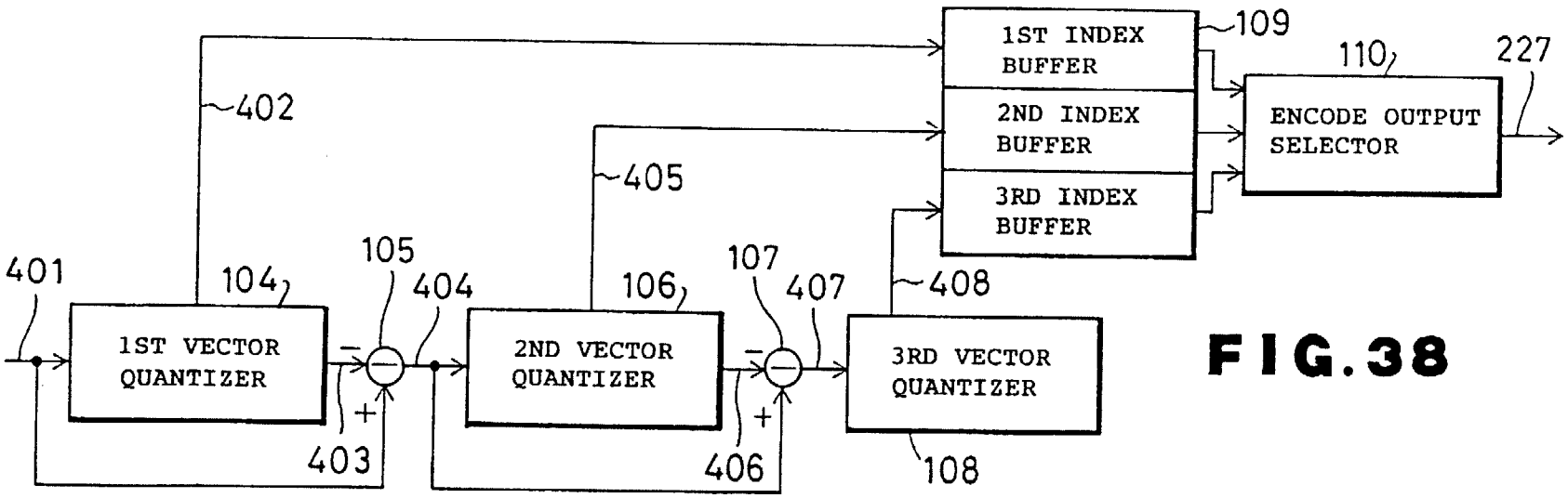
FIG. 38 is a block diagram of an encoding section as another embodiment of the invention.
Figure 39:
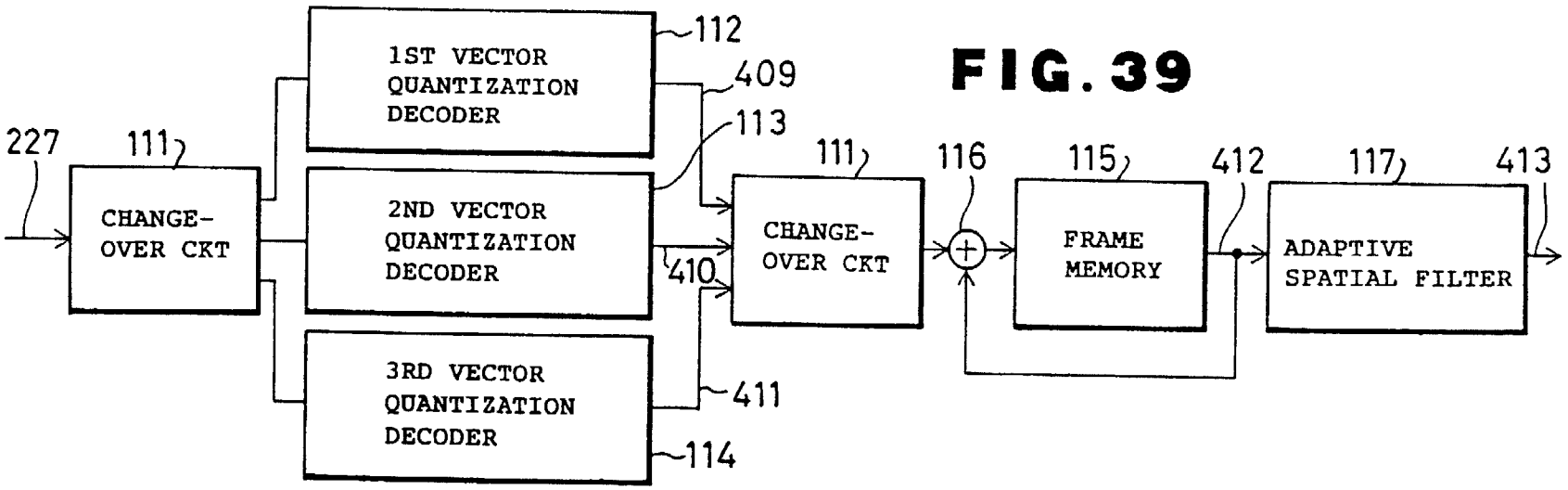
FIG. 39 is a block diagram of a decoding section in the embodiment.

FIGS. 38 and 39 show another embodiment of the invention where vector quantizers are connected multiple stages and encoded and decoded stepwise, thereby outline of the picture screen as a whole can be grasped at the early step of the picture-decoding-reproduction.

FIG. 38 is a block diagram illustrating constitution of an encoding section. In FIG. 38, numeral 401 designates input signal series with the picture signal blocked, numeral 104 designates a first stage vector quantizer which encodes the input signal series, numeral 402 designates an index as an encoded output of the first stage vector quantizer 104, numeral 403 designates a first stage output vector locally decoded, and numeral 404 designates a quantization error signal of the first stage vector quantizer 104. The quantization error signal 404 is obtained from the subtractor 105 to which the input signal series 401 and the first stage output vector are inputted.

Numeral 106 designates a second stage vector quantizer which quantizes the quantization error signal 404, numeral 405 designates an index as an encoded output of the second state vector quantizer 106, numeral 406 designates second stage output vector, and numeral 407 designates a quantization error signal of the second stage vector quantizer 106. The quantization error signal 407 is obtained from a subtractor 107 to which the quantization error signal 404 and the second stage output vector 406 are inputted. Numeral 108 designates a third stage vector quantizer, and numeral 408 designates an index as an encoded output of the third stage vector quantizer 108. Combination of the vector quantizers and subtractors in n pieces constitutes a multi-stage vector quantizer of stacked type.

Numeral 109 designates an index buffer which stores indices 402, 405, 408 of the quantizers 104, 106, 108 of respective stages, numeral 110 designates an encoded output selector, and numeral 227 designates encoded data as an encoded output from the encoding section.

FIG. 39 is a block diagram illustrating constitution of a decoding section of the vector quantization encoding apparatus. In FIG. 39, numeral 227 designates encoded data to be decoded, and numeral 111 designates a change-over circuit which changes over quantization decoders 112, 113, 114, in response to the stage number of the quantizer when the encoded data is quantized in the encoding section. The change-over circuits 111 are installed at the input side and output side of the vector quantization decoders 112, 113, 114. Numeral 112 designates a first stage vector quantization decoder, numeral 409 designates a first stage output vector, numeral 113 designates a second stage vector quantization decoder, numeral 410 designates a second stage output vector, numeral 114 designates a third stage vector quantization decoder, numeral 411 designates a third stage output vector, numeral 115 designates a decoded picture frame memory, numeral 412 designates a decoded picture signal, numeral 116 designates an adder which adds the output of the change-over circuit 116 and the decoded picture signal 412 of the decoded picture frame memory 115, and supplies the result to the decoded picture frame memory 115, numeral 117 designates an adaptive spatial filter where smoothing characteristics vary in response to the decoding state number, and numeral 413 designates a decoded picture signal output passing through the adaptive spatial filter 117.

Next, operation will be described. The encoding section in FIG. 38 will be first described. The encoding section is connected in multistage using three stages of the vector quantizers, and input signal series 1 being blocked of image signals is used as an input vector and quantization is performed in the first stage quantizer 104. In the embodiment, vector in the first stage is of 64 (8×8) dimensions. The index 3 based on the first stage quantization result is stored in the index buffer 109.

In the first stage vector quantizer 104,, an output vector 40 based on the quantization result is outputted, and the difference between this output and the input signal series 401 of the first stage becomes the quantization error signal 404 of the first stage. The quantization error signal 404 of the first stage is quantized in the second stage vector quantizer 106, and the second stage index 405 and the second stage output vector 406 are outputted. The second stage index 405 is stored in the index buffer 109.

Also the differential signal 407 between the second stage output vector 406 and the second stage input signal 404 series becomes an input signal of the third stage vector quantizer 108. Dimensions of the vector in the second stage vector quantizer 106 are decreased from the first stage and made 16 (4×4). The third stage vector quantizer 108 also outputs the output index 408 as similar manner to the first stage and second stage vector quantizers 104, 106. Dimensions of the vector in the third stage vector quantizer 108 are made 4 (2×2).

Outputs of the index buffer 109 are selected by the encoded output selector 110. The first stage index 402 is first outputted, the second stage index 405 is subsequently outputted and the third stage index 408 is finally outputted respectively as the encoded data 227.

Next, operation of the decoding section to decode the encoded data obtained in this manner will be described referring to FIG. 39. If the decoding section receives the encoded data 227, the change-over circuit 111 selects the first stage vector quantization decoder 112 and the first stage index is decoded, thereby the first stage output vector 409 is obtained, passes through the change-over circuit 111 and the adder 116, and is stored in the frame memory 115.

The first stage output vector 409 is added to the output 412 of the frame memory 115 with the adder 116 before the frame memory 115. However, since the decoding of the first stage, the frame memory at the corresponding position is empty, contents of the frame memory 115 becomes a picture formed by the output vector 409 in the first stage.

The quantization distortion of the decoded picture signal 412 outputted from the frame memory is removed by the adaptive spatial filter 117 of which the smoothing characteristics is changeable according to the stage number performing the decoding, and is outputted to the display as the decoded video signal 413.

After inputting the index of the first stage vector quantization decoder 112 as the encoded data 227, and when the index of the second stage is inputted, the change-over circuit 111 selects the second stage quantization decoder 113 and the index of the second stage is decoded. The output vector 410 in the second stage is added by the adder 116 to the decoded picture signal 412 of the first stage already written in the frame memory 115, thereby the picture with less quantization error is recorded.

Since the quantization distortion becomes smaller after decoding in the second stage vector quantization decoder, the smoothing characteristics of the adaptive spatial filter 117 is made weaker than that of the first stage. The decoder picture signal output obtained, is made better in picture quality.

When the vector quantization decoding in the second stage is finished and the index of the third stage is inputted, the change-over circuit 111 selects the third stage vector quantization decoder 114. The output vector of the third stage is added to the encoded result up to the second stage already written in the frame memory 115, and the added result is written in the frame memory 115. The smoothing characteristics of the adaptive spatial filter 117 is weakened further in comparison to the second stage, thereby the encoded picture signal 415 now is outputted to the display.

An example of multi-stage connection of three sorts of vector quantizers of 64 dimensions, 16 dimensions and 4 dimensions has been described. And, constitution with other dimensional numbers and other number of stages can be realized.

FIG. 40 is an explanation diagram illustrating an example of the adaptive spatial filter 117 used in the decoding section. Filter characteristics of the adaptive spatial filter 117, as an example, can be expressed in the following formula with respect to pixel arrangement shown in FIG. 40. Assuming that a filter output of a pixel position X is made X', $$X' = \alpha X + \frac{(1-\alpha)}{4}(A + B + C + D)$$

$\alpha$: control parameter $(0 < \alpha \leqq 1)$

In the above-mentioned embodiment, when the quantization distortion of the decoded output is large as in the first stage vector quantization decoding, the control parameter $\alpha$ is set to a small value in order to strengthen the smoothing characteristics, and when the quantization distortion of the decoded output is small and the resolving power should be secured as in the third stage quantization decoding, $\alpha$ is set to a value close to 1 in order to weaken the smoothing characteristics. Also in the second stage vector quantization decoding as an intermediate stage, $\alpha$ is preferably set to the intermediate value. Since the adaptive spatial filter 117 is controlled as above described, the quantization distortion of the picture displayed on the midway of decoding can be reduced and the processes of reproduction displayed progressively offers more natural image.

In the embodiment, although the vector quantizers are prepared as many as the quantization stages, one quantizer can be used repeatedly, thereby similar effect to that in the multi-stage connection can be obtained.

FIG. 41 is a block diagram illustrating constitution of an encoding section of a vector quantization encoding apparatus of picture signals according to the invention where an encoding loop is formed by using a vector quantizer which can change over the dimensional number thereof adaptively.

In FIG. 41, numeral 118 designates a block size variable blocking circuit which performs blocking of the input signal series 1 matching with dimensions of the vector quantizer, numeral 414 designates a residual signal vector where the quantization result up to the last stage is subtracted from the input signal vector by a subtractor 119, numeral 120 designates a variable dimension vector quantizer, numeral 121 designates a stage number classified output vector code table, numeral 415 designates an index, numeral 416 designates an output vector based on quantization, numeral 417 designates a picture vector of the quantization result up to the stage number of performing the quantization, which picture vector is outputted from an adder 122 which adds the quantization result up to the last stage and the output vector, numeral 123 designates a block-size-variable frame memory, and numeral 418 designates a picture vector of the quantization result up to the last stage.

FIG. 42 is a block diagram illustrating constitution of a decoding section to which the index signal 415 is inputted. In FIG. 42, numeral 124 designates a variable dimension vector quantization decoder, numeral 125 designates a stage number classified output vector code table, numeral 419 designates an output vector, numeral 126 designates a block size variable frame memory, numeral 420 designates a picture vector of the quantization result up to the last stage, and numeral 127 designates an adder which adds the output vector and the picture vector.

Next, operation will be described. The encoding section in FIG. 41 will be first described. An input picture signal from the input signal series 401 is inputted into the block-size-variable-blocking-circuit 118, and is blocked per 8×8 pixels at first and converted into a vector of 64 dimensions.

As for the blocked vector, the vector 418, the quantization result up to the last stage is subtracted in the subtractor 119. However, since contents of the frame memory 123 in the corresponding position is zero at first, the output itself of the blocking circuit 118 becomes the input vector 414 of the variable dimension vector quantizer 120.

The variable dimension vector quantizer 120 acts as a first stage quantizer, and executes the vector quantization of 64 dimensions while quoting the code table for the first stage of the stage number classified output vector code table 121. The first stage quantization index 415 and the first stage output vector 416 are outputted as outputs of the variable dimension vector quantizer 120. The output vector is added to the output 418 of the frame memory 123 (zero in first stage quantization) by the adder 122, and then written as the first stage quantization result 417 per 8×8 pixels in the block size variable frame memory 123.

If encoding of the input picture signals by one frame is finished as the first stage quantization, subsequently the second stage quantization processing is started. The blocking circuit 118 blocks the 4×4 pixels and outputs the vector of 16 dimensions, and the residual of subtracting the first stage quantization result vector 418 in the subtractor 119 becomes the input vector 414 of the variable dimension vector quantizer 120.

The variable dimension vector quantizer 120 quotes the code table for the second stage from the stage number classified output vector code table 121, and executes the vector quantization of 16 dimensions of the second stage and outputs the index 415 and the output vector 416 of the second stage. The output vector 416 is added to the vector 418 of the quantization result of the last stage by the adder 122, and the picture of the quantization result up to the second stage is written in the block size variable frame memory 123. In similar manner, if the second stage quantization is finished throughout the whole picture frame, the third stage quantization is performed in the same loop.

In the third stage quantization, the block size of the blocking circuit 118 is the 2×2 pixels and the vector of 4 dimensions is produced, and the variable dimension vector quantizer 120 quotes the code table for the third stage and the index 415 of the third stage quantization is outputted. Thus indices from the first stage quantization to the third stage quantization are outputted in sequence to be transmitted or recorded.

Next, operation of the decoding section to decode the encoded data obtained in the encoding section of FIG. 41 will be described referring to FIG. 42. The inputted index 415 is first decoded into the vector of 64 dimensions by the variable dimension vector quantization decoder 124 acting as the first stage decoder while quoting the code table for the first stage from the stage number classified output vector code table 125.

The output vector 419 of the variable dimension vector quantization decoder 124 is added to the frame memory output 420 of the frame memory 126 by the adder 127. However, since contents of the frame memory 126 is zero in the case of the first stage decoding, the output vector 419 itself is written in the frame memory 126 in similar manner to the encoding section of FIG. 41. The output of the frame memory 126 is smoothed by the adaptive spatial filter 117 with the smoothing characteristics being variable, and outputted as the decoded picture signal output 413.

Subsequently, the decoding in the second stage and the third stage is also performed in similar manner to the encoding. Thus the decoding of indices is performed in sequence of the first stage → the second stage → the third stage, thereby the rough quantization becomes the fine quantization stepwise and the picture quality is improved.

Figure 43:
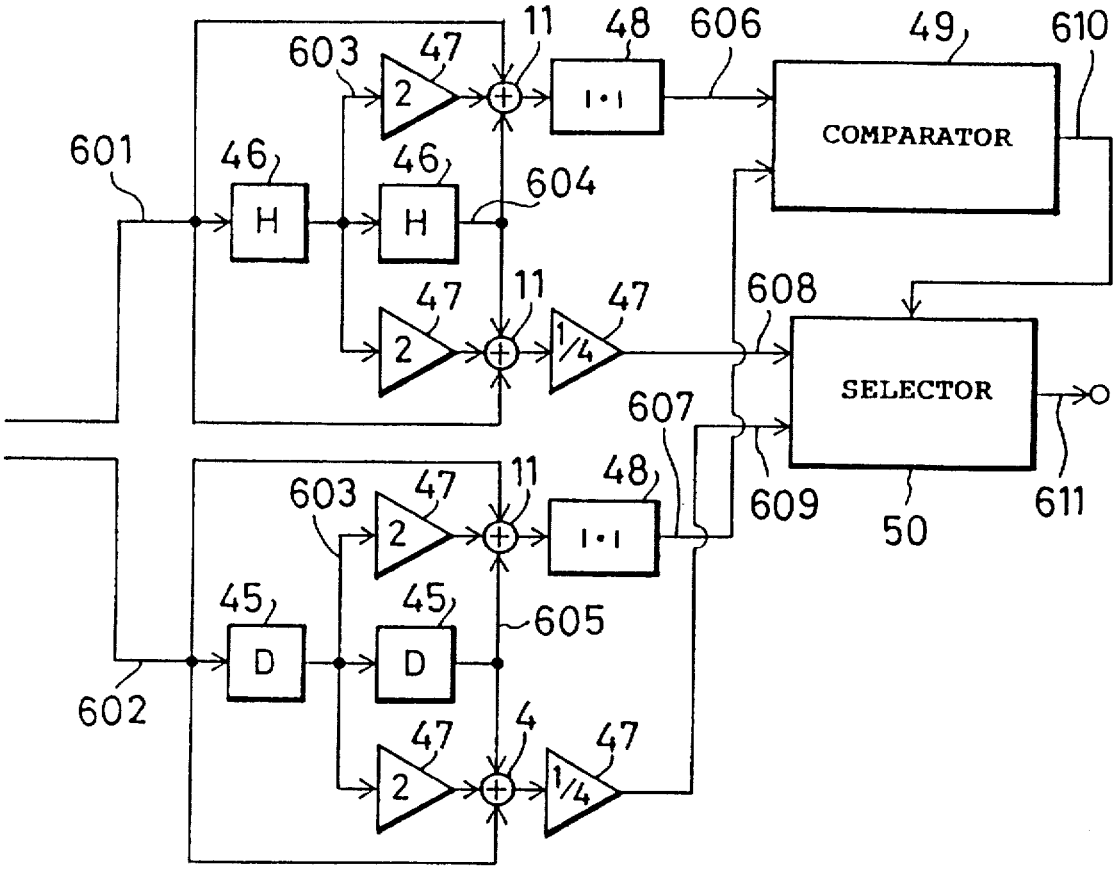
FIG. 43 is a block diagram of a contour holding filter as a spatial filter used in the invention.

FIG. 43 shows an embodiment of a spatial filter of the invention. In FIG. 43, numeral 45 designates a one-line delay element of a video signal, numeral 46 designates a one-sample delay element, numeral 47 designates a multiplier, numeral 11 designates an adder, numeral 48 designates an absolute value operation unit, numeral 49 designates a comparator, numeral 50 designates a selector, numeral 601 designates a pixel sample adjacent to the right of the aimed pixel as an object of smoothing, numeral 602 designates a pixel sample adjacent to the lower side of the aimed pixel, numeral 603 designates an aimed pixel sample, numeral 604 designates a pixel sample adjacent to the left of the aimed pixel, numeral 605 designates a pixel sample adjacent to the upper side of the aimed pixel, numeral 606 designates a horizontal direction high-frequency component signal, numeral 607 designates a vertical direction high-frequency component signal, numeral 608 designates a horizontal direction filter output signal, numeral 609 designates a vertical direction filter output signal, numeral 610 designates a selector indication signal, and numeral 611 designates a smoothed picture filter output signal.

Figure 44:
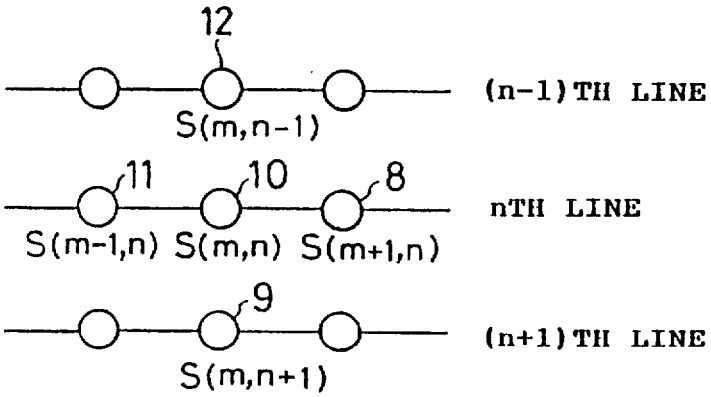
FIG. 44 is a video signal arrangement diagram for explaining operation of the filter.

Next, operation will be described using FIGS. 43 and 44. Each of the pixel samples designated by numerals 601~605 in FIG. 43 is positioned on the two-dimensional arrangement in relation as shown in FIG. 44. Assume that m represents a horizontal direction pixel number, n represents a vertical direction pixel number, and an aimed pixel sample is made S (m, n). From four pixel samples S (m31 1, n), S (m30 1, n), S (m, n−1), S (m, n+1) adjacent in the horizontal and vertical directions, the high-frequency components of both horizontal and vertical directions attenuated by the filter, can be calculated on the aimed pixel sample S (m, n). When the absolute value of this signal has the horizontal component Ah and the vertical component Av, both components are defined by following formulas.

$$Ah=|S(m-1, n)-2\cdot S(m, n)+S(m+1, n)|$$

$$Av=|S(m, n-1)-2\cdot S(m, n)+S(m, n+1)|$$

On the other hand, the aimed pixel sample S (m, n) is performed with the horizontal direction filter constituted by using the horizontal direction adjacent samples among the above-mentioned adjacent samples, and the horizontal direction smoothed signal Ph is obtained.

$$Ph=\{S(m-1, n)+2\cdot S(m, n)+S(m+1, n)\}/4$$

Also the vertical direction smoothed signal Pv is obtained with the vertical direction filter constituted by using the vertical direction adjacent samples.

$$Pv=\{S(m, n-1)=2\cdot S(m, n)+S(m, n+1)\}/4$$

The two smoothing signals Ph, Pv obtained by the above-mentioned operation are inputted to the selector 7, and outputted as the smoothed filter output signal F 611 by control of the comparator 49. The comparator 49 estimates smaller one of values of the signals Ah 606 and Av 607 in the absolute values of the high frequency components attenuated by the filter, and changes over the output of the selector 50 as follows.

if Ah<Av then F=Ph (horizontal direction smoothed signal outputted)

if Av≦Ah then F=Pv (vertical direction smoothed signal outputted)

That is, the smoothing is performed in the direction of the smaller one of the horizontal and vertical high-frequency components, thereby only noises having no correlation between pixels can be suppressed.

In the embodiment, the smoothing circuits for two directions, the horizontal and vertical directions, are provided, and the high frequency component extraction is also performed in the two directions. Further, by adding diagonal directions, the smoothing circuits is provided in four directions and the high-frequency component extraction is performed thereby further good picture quality can be surely obtained.

Figure 45:
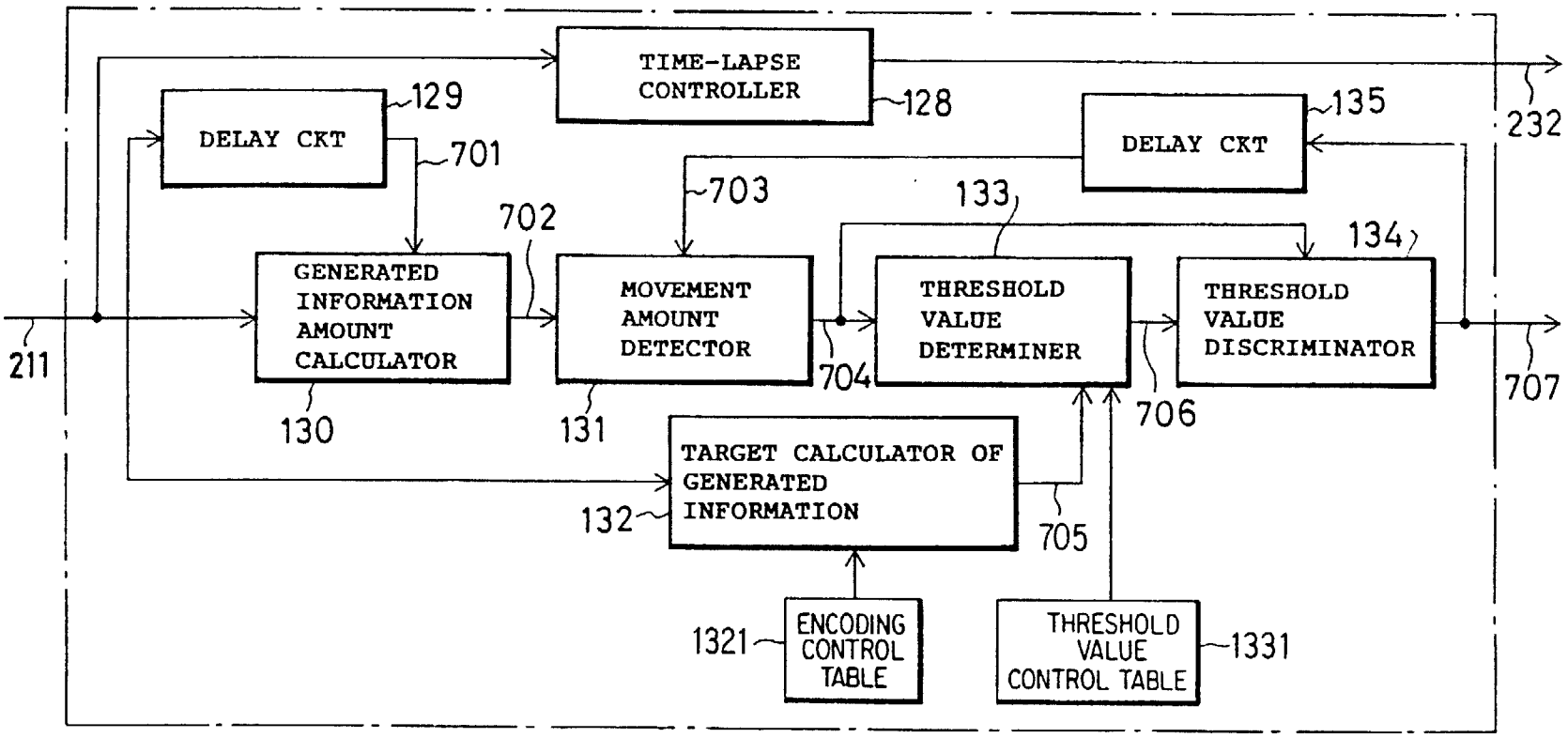
FIG. 45 is a block diagram of an encoding control circuit as an embodiment of the invention.

FIG. 45 shows another embodiment of the invention where an encoding control table having a plurality of characteristics of threshold value versus generated information amount in response to the amount of movement, and a threshold value control table having reverse characteristics thereof are provided. In FIG. 45, numeral 128 designates a time-lapse controller which performs the time-lapse control if the amount of the information storage of the transmission buffer exceeds some value, numeral 129 designates a delay circuit which outputs the information storage before one period, numeral 130 designates a generated-information-amount-calculator which calculates the amount of generated information, numeral 131 designates a movement-amount-detector which detects the movement amount of the encoded frame at the last time based on the generated information amount and the encoded control threshold value at that time, numeral 132 designates a target calculator of generated information which calculates the target of generated information amount value to realize the target of storage information amount, numeral 133 designates a threshold value determiner which determines the threshold value to realize the target value of storage information amount in the movement amount, numeral 134 designates a threshold value discriminator which outputs a high threshold value previously set when the state of the small movement continues n times (n: positive integer) or more, and outputs the output of the threshold value determiner in other cases, and numeral 135 designates a delay circuit which outputs the threshold value of the output of the threshold value discriminator at next encoding time.

Operation will now be described. If the storage information amount of the transmission buffer becomes a definite value or more, the time-lapse control is performed by the time-lapse control circuit 128.

Numeral 211 designates the storage information amount up to the last encoding which is held for one encoding period by the delay circuit 129, and the storage information amount 701 up to the last encoding but one is outputted. The generated-information-amount calculator 130 calculates the generated information amount 702 and outputs it. According to the generated information amount and the threshold value 703 used in the last encoding, the movement amount detector 131 detects the movement amount 704 and outputs it referring to an encoding control table as hereinafter described. The target calculator of generated information 132 calculates the target value of generated information 705 for the next encoding and outputs it based on the storage information amount and the target value of the storage information. The threshold value determiner 133 outputs the threshold value 706 to realize the generated information amount target value 705 in the movement amount 704 referring to a threshold value control table 1331 as hereinafter described.

If the small value of the movement amount 704 continues for prescribed n times (n: positive integer) or more from the last encoding up to that time, the threshold value discriminator 134 selects a high threshold value previously set, and in other cases the threshold value discriminator 134 selects the threshold value 706 determined by the threshold value determiner 133 and outputs the threshold value 707 to be used in next encoding. The delay circuit 135 holds the threshold value 707 and outputs it at next encoding time.

Figure 46:
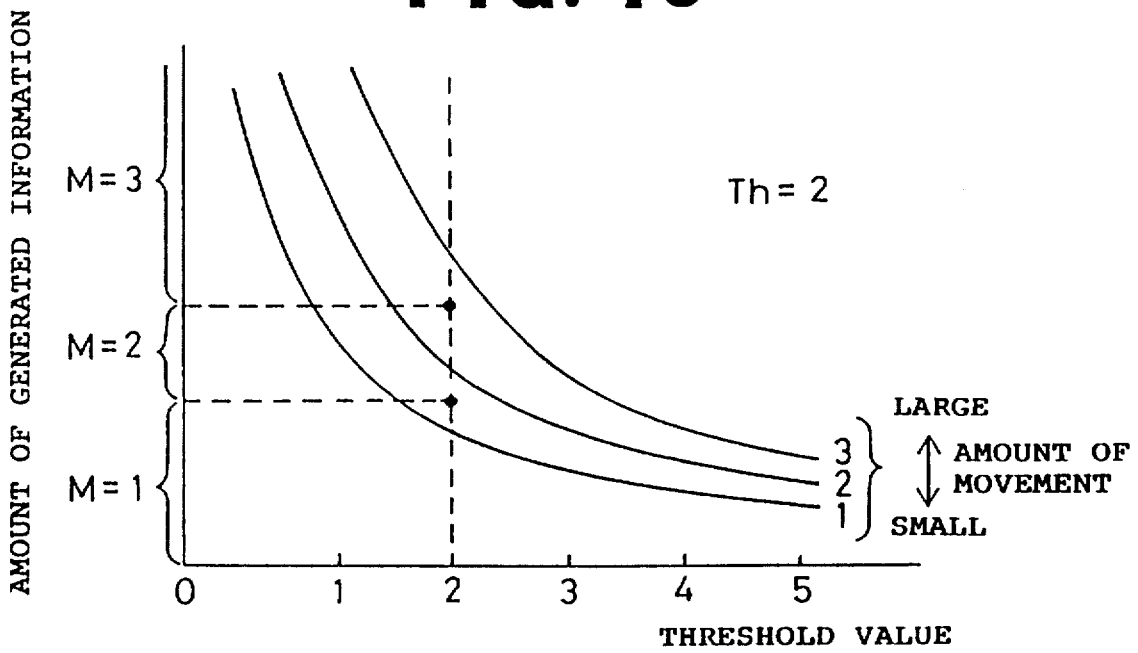
FIG. 46 is an explanation diagram illustrating an example of preparation method of an encoding control table.

The encoding control table 1321 will be described referring to FIG. 46.

For example, if the threshold value Th is 2, the generated information amount is divided as shown in the figure and the movement amount M is outputted. In similar manner, a sectionalized table of amount of the generated information corresponding to each threshold value is given, thereby the movement amount is detected using the threshold value and the generated information amount as inputs.

Figure 47:
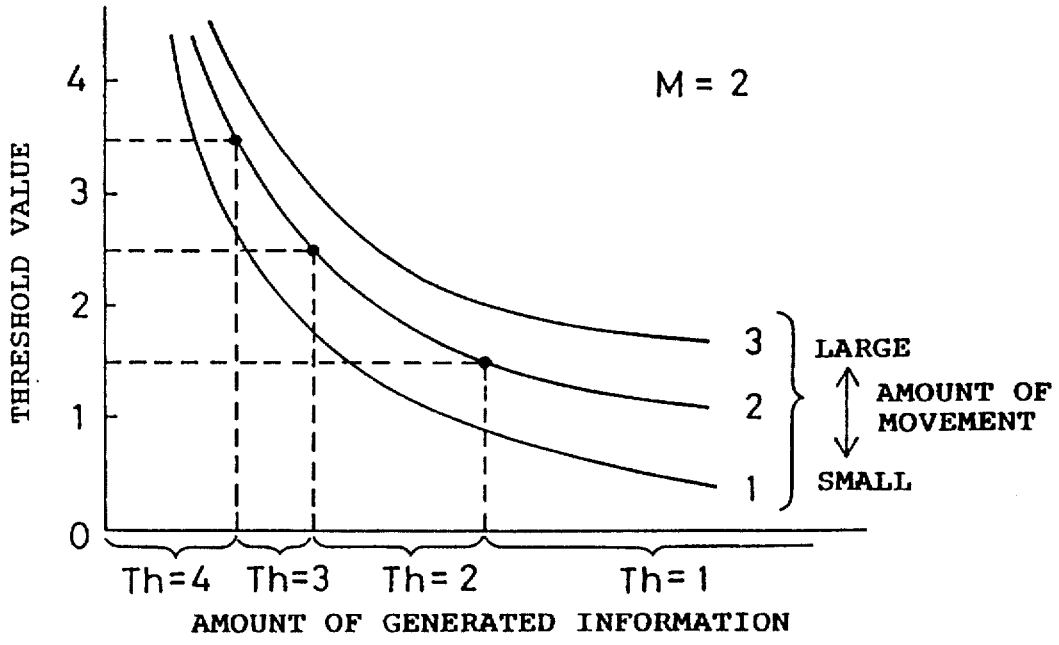
FIG. 47 is an explanation diagram illustrating an example of preparation of a threshold value control table.

The threshold value control table 1331 will be described referring to FIG. 47.

For example, if the movement amount M is 2, amount of the generated information is divided as shown in the figure and the threshold value Th is outputted. In similar manner, a sectionalized table of amount of the generated information corresponding to each movement amount is given, thereby the threshold value is determined by using the movement amount and target value of the generated information amount as inputs.

In the embodiment, the threshold value control method according to the storage information amount of the transmission buffer is shown. However, the threshold value control method using the total number of valid blocks or the ratio of the valid blocks to the total number of all blocks or all blocks can be performed, thereby similar effects to the embodiment can be obtained.

In the embodiment, although the interframe adaptive vector quantization apparatus has been described, the moving picture encoding apparatus by other methods can be used thereby similar effects to the embodiment can be obtained.

Figure 48:
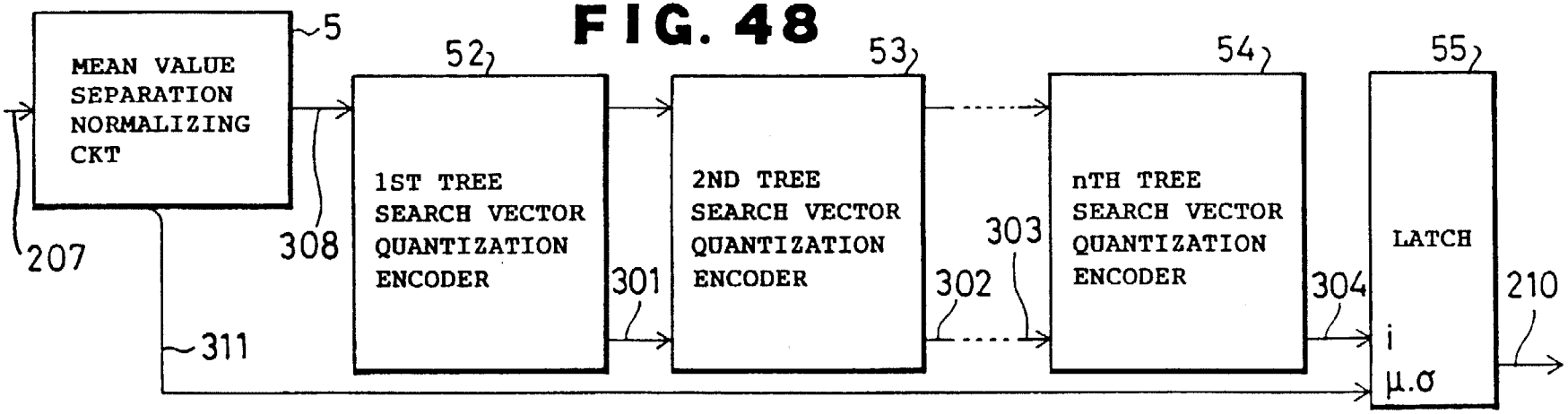
FIG. 48 is a block diagram of an encoder of a tree search vector quantizer as an embodiment of the invention.

FIG. 48 shows a vector quantizer of the invention in detail. FIG. 48 is a block diagram illustrating constitution of n-stage tree search vector quantization encoder in which pipeline processing is introduced. In FIG. 48, numeral 52 designates a first stage of the encoder where each stage is pipelined, numeral 53 designates a second stage of the encoder, numeral 54 designates an n-th stage of the encoder, numeral 55 designates a latch which inputs the index and outputs it at the definite timing, numeral 5 designates a mean value separation normalization circuit which separates the input vector into three components, i.e., a mean value, an amplitude and a normalization input vector.

Figure 49:
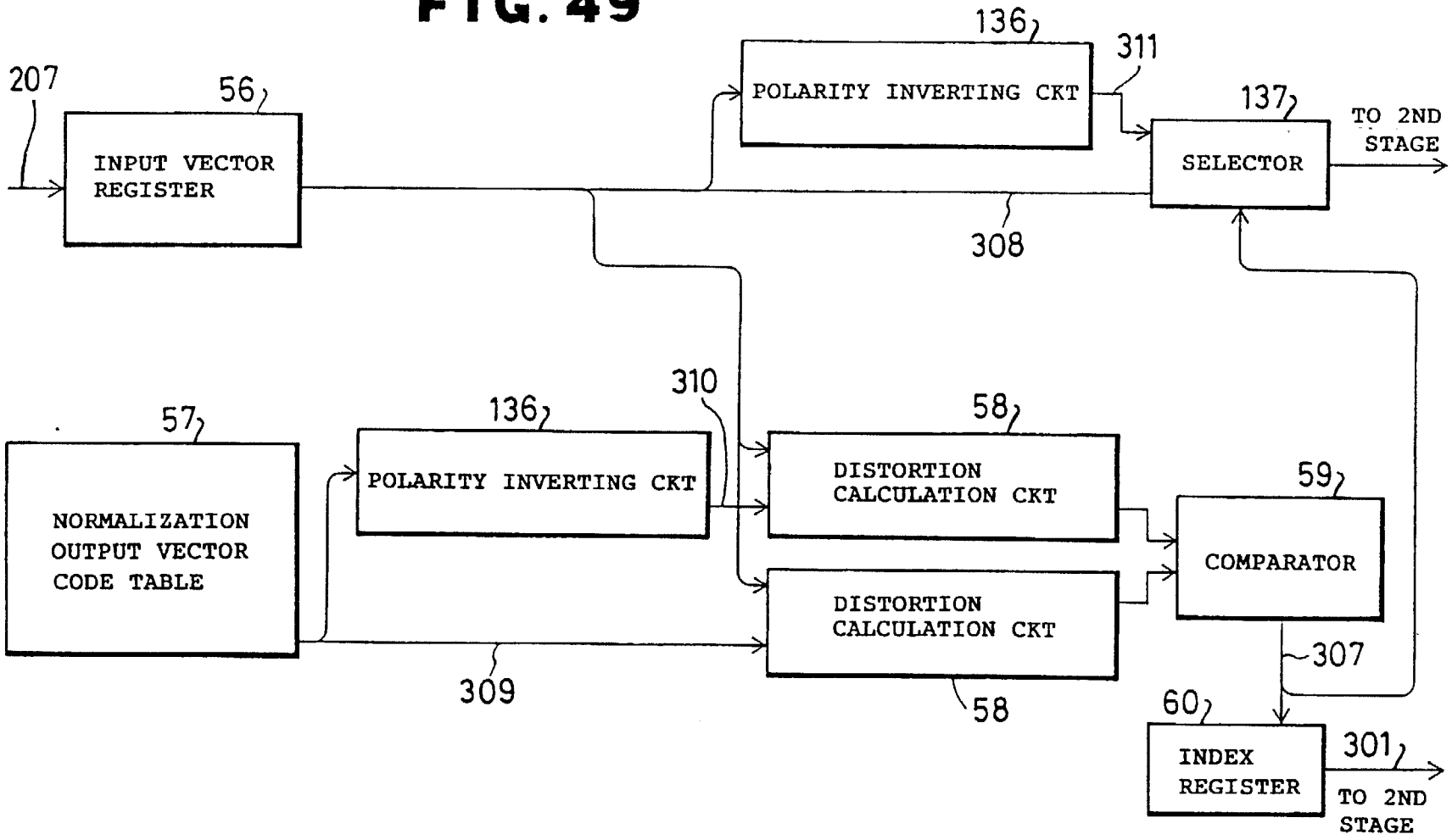
FIG. 49 is a block diagram illustrating constitution of the first stage of the encoder.

FIG. 49 is a block diagram illustrating a constitution example of the n-th stage of the encoder. In FIG. 49, numeral 56 designates a register which latches the input vector in each stage, numeral 57 designates a normalization output vector code table, numeral 136 designates a polarity inverting circuit which inverts the polarity of the normalization input vector or the normalization output vector, numeral 58 designates a distortion calculation circuit which calculates distortion between the input vector 207 and output vector of the normalization output vector code table 57 and the normalization output vector inverted the polarity thereof with the polarity inverting circuit 136, numeral 59 designates a comparator which decides the larger one of the two distortions as outputs of the distortion calculation circuits, numeral 60 designates an index register which adds "0" or "1" to the (n−1)th stage encoded output 303 in accordance with the decision result 307 and outputs the n-th stage encoded output 304, and numeral 137 designates a selector. Constitution of the encoder from the first stage to the n-th stage is similar. Differences are in contents of the output vector code table of each stage, and that no encoded output of the previous stage is inputted to the first stage, and that no input vector is transmitted from the input vector register of the n-th stage (the last stage) to the next stage.

Figure 52:
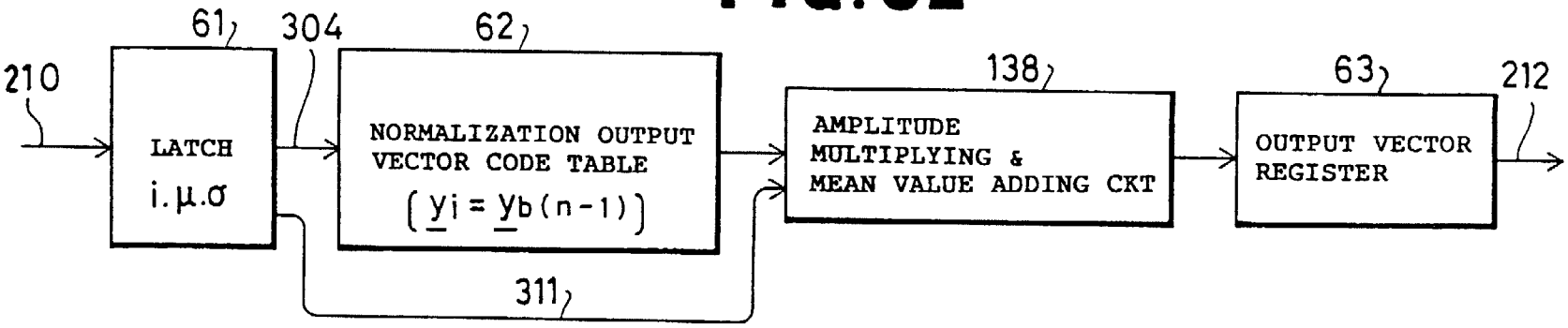
FIG. 52 is a block diagram of a decoder of a tree search vector quantizer as an embodiment of the invention.

FIG. 52 is a block diagram illustrating a constitution example of a vector quantization decoder. In FIG. 52, numeral 61 designates a register which latches an index signal 304 to be inputted to the decoder, numeral 62 designates a code table which stores real output vectors corresponding to node of the end of the tree (equivalent to content of the code table in the last stage of the encoder), numeral 63 designates a register which latches the output vector read from the code table 62 in accordance with the index signal 304, and numeral 138 designates an amplitude-multiplying and mean-value-adding-circuit which multiplies the amplitude component and adds the mean value to the normalization output vector.

Next, operation will be described. In normalization output vector set of tree structure shown in FIG. 50, the normalization output vector of each stage is produced so as to minimize the total sum of distortions based on distribution of a plurality of normalized input vectors subjected to mean value separation normalizing. Assuming that the mean value is $\mu$, the amplitude is $\sigma$, the input vector is x, and the normalization input vector is x*, the mean value separation normalizing is executed by following formulas.

$$\mu = \frac{1}{k} \sum_j x_j (j = 1, 2, \ldots, k)$$

$$\sigma = \left[ \frac{1}{k} \sum_j (x_j - \mu)^2 \right]^{1/2}$$

$$x_j^{\star} = (x_j - \mu)^{\sigma}$$

$$x^{\star} = (x_1^{\star}, x_2^{\star}, \ldots, x_k^{\star})$$

As approximate expressions of the amplitude $\sigma$, $$\sigma = \frac{1}{k} \sum_j |x_j - \mu|$$

$$\sigma = \max_j x_j - \min_j x_j$$

can be used.

Figure 50:
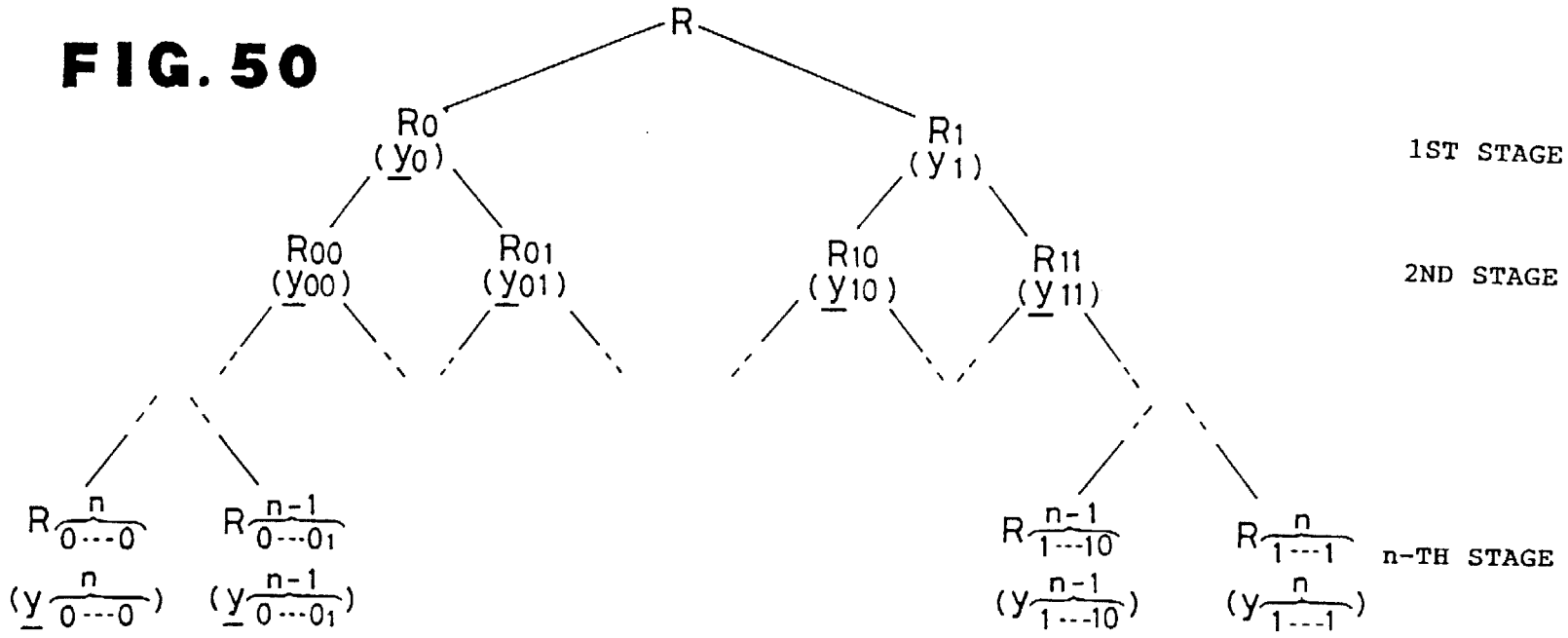
FIGS. 50 and 51 are explanation diagrams illustrating structure of output vector sets of the encoder.
Figure 51:
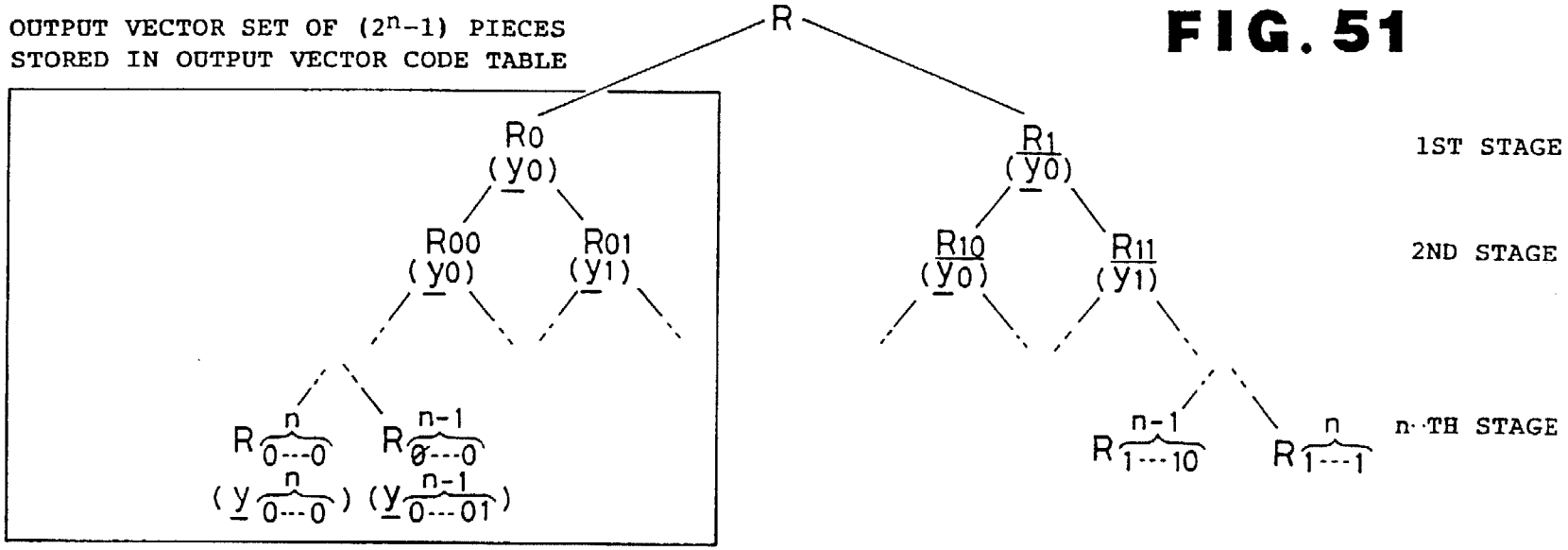
Figure 53:
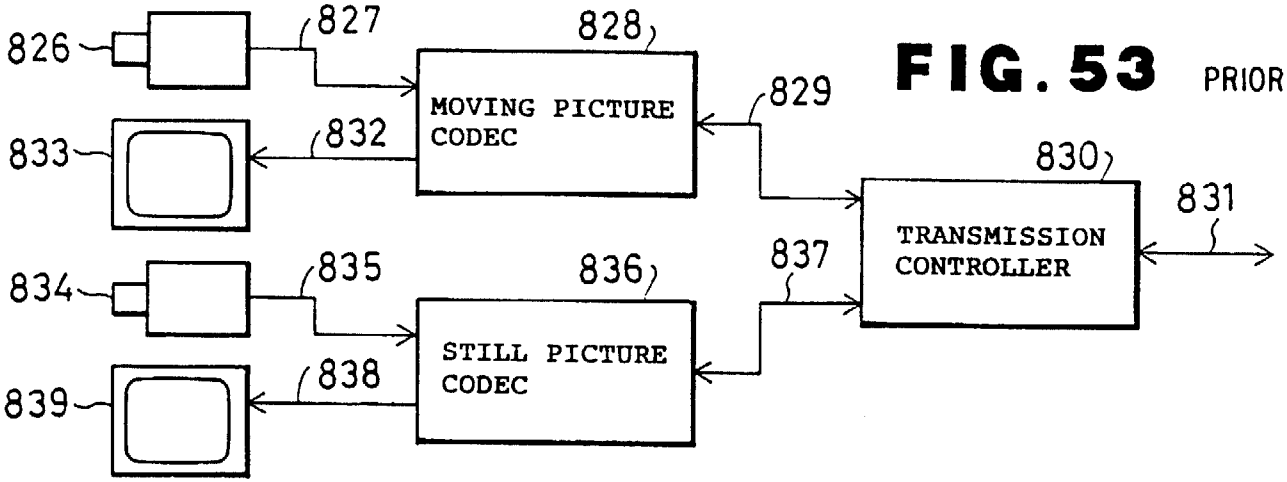
FIG. 53 PRIOR ART
FIG. 53 is a block diagram illustrating a constitution example of a picture encoding transmission apparatus to perform transmission of motion pictures and still pictures in the prior art.
Figure 54:
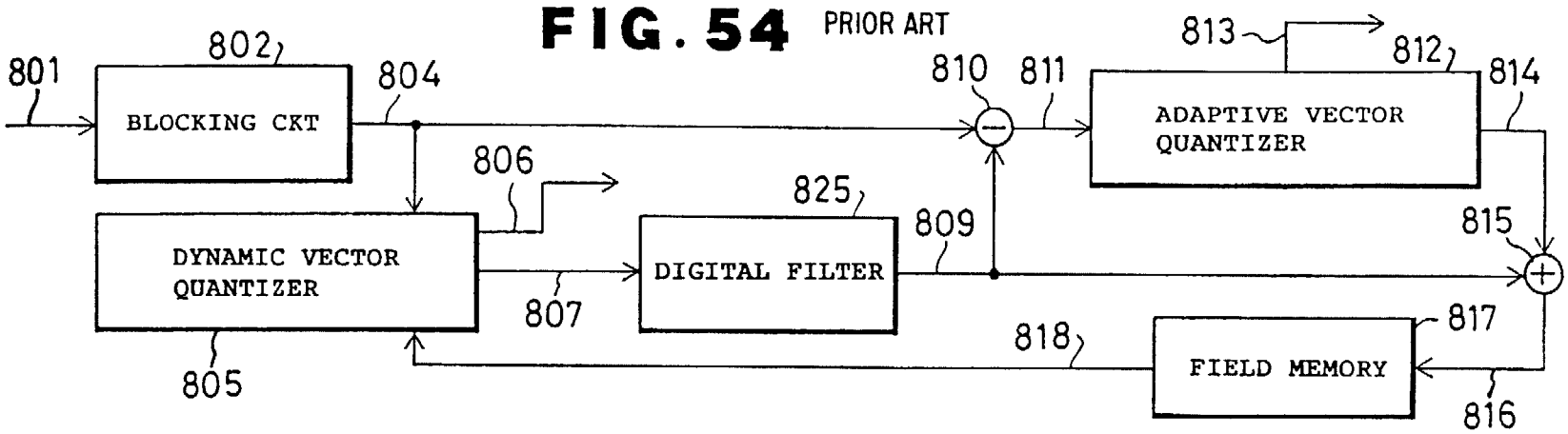
FIG. 54 PRIOR ART
FIG. 54 is a block diagram of an encoding section of the image encoding transmission apparatus.
Figure 55:
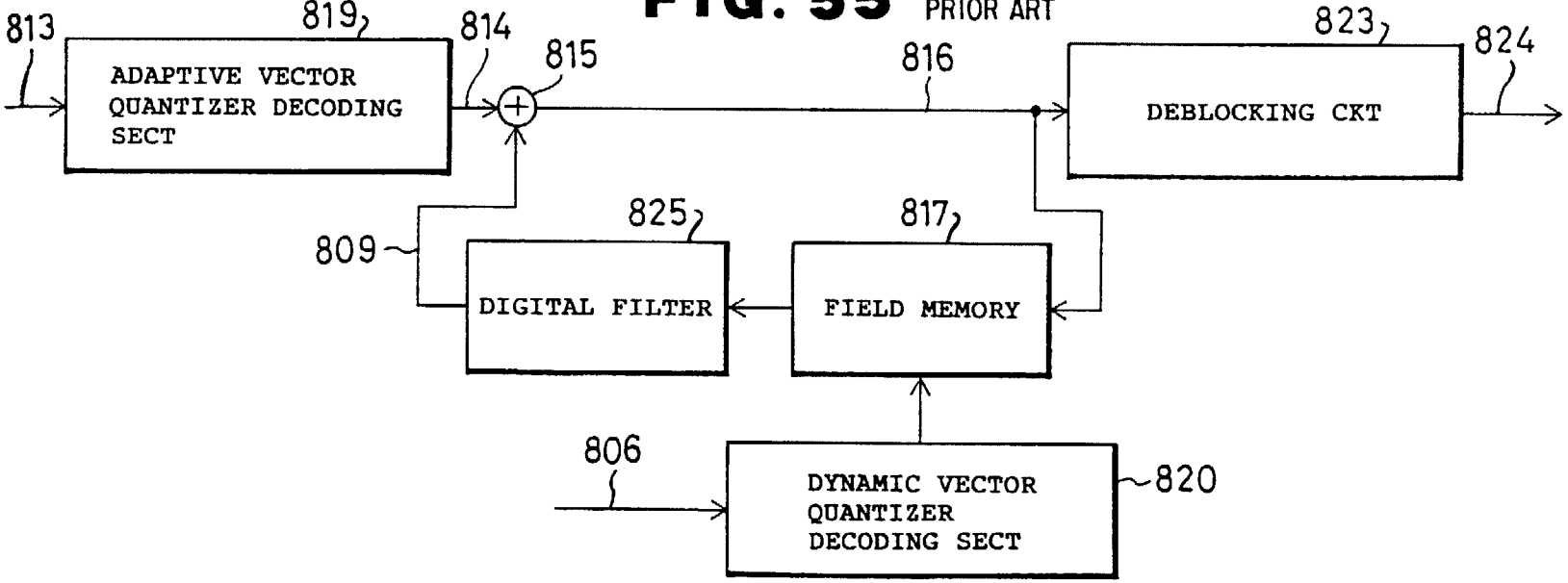
FIG. 55 PRIOR ART
FIG. 55 is a block diagram of a decoding section of the picture encoding transmission apparatus.

In the normalization out vector set, the normalization output vectors located in each stage are arranged by half number in symmetry between right and left sides of the tree with respect to the origin on the signal space, i.e., in the inverse relation. In FIG. 50, $y_o$ and $y_1$, $y_{oo}$ and $y_{1o}$, $y_{o1}$ and $y_{11}$ . . . are in the inverse relation with each other. In the normalization output vector set at the left half or the right half of the tree, as shown in FIG. 51, to the normalization output vectors of $(2^n-1)$ pieces having the normalization output vector of the first stage as a root, at the second stage or subsequent stage, "0" is assigned to branches separated to the left direction from each node and "1" is assigned to branches separated to the right direction from each node, and then the output vectors are stored in the normalization output vector code table. Binary numbers of each (n−1) binary digits are assigned to the normalization output vectors in the last stage, i.e.,, the n-th stage. As shown in FIG. 49, the normalization input vectors $x^*=[x_1^*, {}_x^*, \ldots, x_k^*]$ 308 are latched in the input vector register 56 in the first stage, and both the first stage normalization output vector $y^{(0)}$ 309 read from the normalization output vector code table and the first stage inverted normalized output vector $y^{(1)}$ 310 into which $y^{(0)}$ is inverted with the polarity inverting circuit 136, are inputted to the distortion operation circuit 58, thereby two distortions between x* and $y^{(0)}$ and between $x^{\star}$ and $y^{(0)}$ are calculated. The comparator 59 decides the larger one of the two distortions, and outputs the smaller one as the signal 307. For example, the comparator 59 outputs "0" if the distortion with the normalization output vector $y^{(0)}$ is smaller, or outputs "1" if the distortion with the inversion normalization output vector $y^{(1)}$ is smaller. The index register 60 latches the comparator output signal, sets this as information indicating the polarity of the normalization output vector at the position of the most upper bit of index of n digits, and outputs the index signal. The normalization input vector 308 is supplied together with the inversion normalization input vector 311 inverted with the polarity inverting circuit 136 to the selector 137. The selector 137 selects the normalization input vector 308 when the comparator output signal 307 of the first stage is "0", or selects the inversion normalization input vector 311 when the comparator output signal 307 is "1", and then transmits it to the encoder of the second stage. If the inversion normalization input vector 311 is selected, in the second stage or subsequent stage, the branch selection is performed by using the normalization output vector set at the right half of FIG. 51 equivalently.

Figure 19:
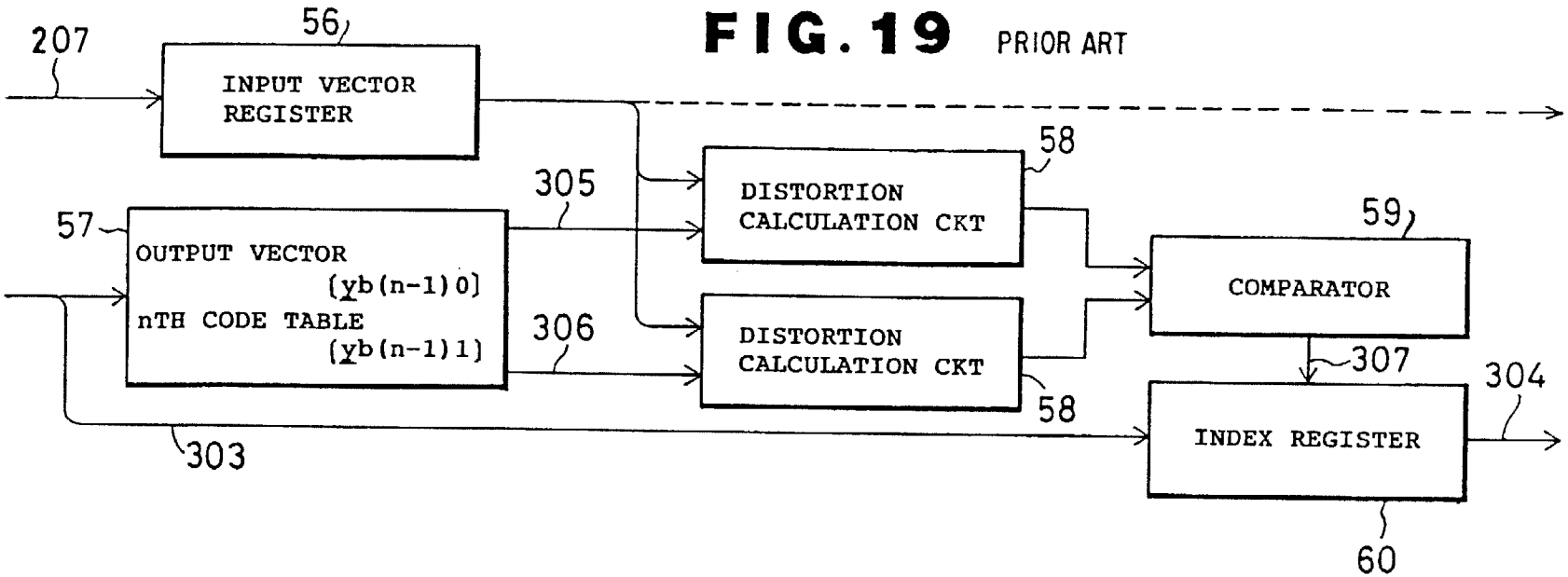
FIG. 19 PRIOR ART
FIG. 19 is a block diagram illustrating a constitution example of an n-th stage of the encoder.
Figure 20:
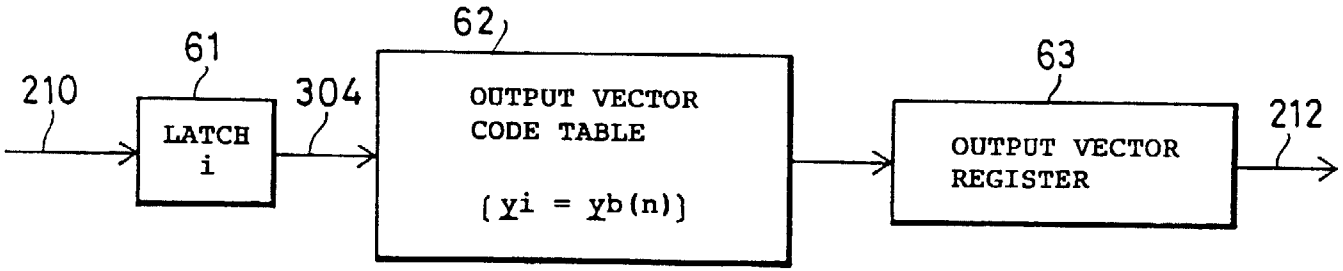
FIG. 20 PRIOR ART
FIG. 20 is a block diagram illustrating a constitution example of a decoder.

Operation of the encoder in the second stage of subsequent stage is similar to that shown in FIG. 19, and in each stage the real output vector which minimizes the distortion is searched through the distortion operation and the comparing operation. Finally, the binary number of (n−1) digits is added to the bit position of the second order or later from the most significant bit of the index signal, thereby the index signal 304 represented by the binary number of n digits is formed. The index signal 304 is latched together with the mean value and the amplitude outputted from the mean-value-separation-normalizing-circuit 5 into the latch 55, and outputted as the encoder output signal 210.

In the decoder, the encoder output signal 210 formed through the above-mentioned processes is latched in the latch 61, and separated into the index signal 304 and the mean value and the amplitude information 311. The normalized output vectors on the addresses that are represented in the binary numbers of (n−1) bits of the index signal 304 except for the most upper bit and stored, are read from the decoding normalization output vector code table 62. If the most significant bit of the index signal 304 is "0", the normalization output vector is outputted as it is. On the contrary, if the most significant bit of the index signal 304 is "1", the normalization output vector is outputted after the polarity inversion, and then multiplied by the amplitude and added by the mean value in the amplitude multiplying and mean value adding circuit 138, and latched in the register 63, thereby the output vector 212 is finally obtained.

Figure 56:
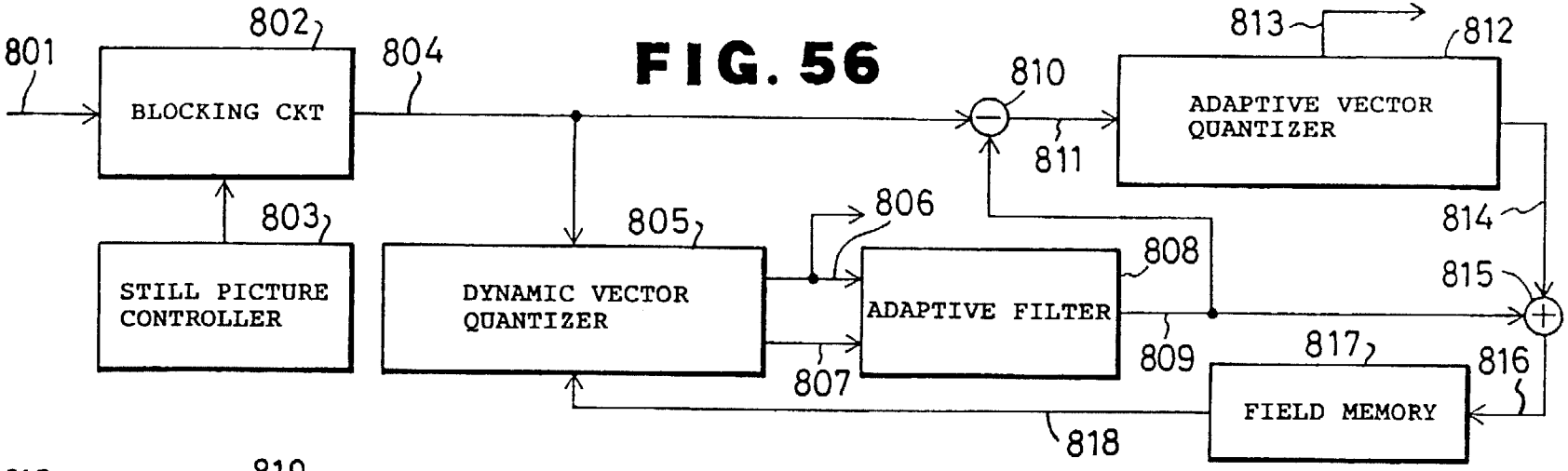
FIG. 56 is a block diagram of an encoding section of a picture encoding transmission apparatus as an embodiment of the invention.

FIG. 56 is a block diagram illustrating an example of an encoding section of a picture encoding transmission apparatus which transmits the moving picture and the still picture as another embodiment of the invention. In FIG. 56, numeral 801 designates input signal series where a signal from the camera is digitized, numeral 802 designates a blocking circuit where a signal scanned in the raster direction is outputted being blocked, numeral 803 designates a still picture controller which controls the blocking during the still picture transmission, numeral 804 designates an input vector as an encoding unit to be blocked, numeral 805 designates a dynamic vector quantizer, numeral 806 designates a DVQ index, numeral 807 designates a DVQ output vector, numeral 808 designates an adaptive filter with characteristics changed by the DVQ index, numeral 809 designates a DVQ output vector having passed through the adaptive filter 808, numeral 810 designates a subtractor, numeral 811 designates an interframe differential vector, numeral 812 designates an adaptive vector quantizer, numeral 813 designates AVQ encoded information, numeral 814 designates an AVQ output vector, numeral 815 designates an adder, numeral 816 designates a locally decoded vector, numeral 817 designates a field memory by the member of pixels of the moving picture, and numeral 818 designates a previous frame vector delayed.

Figure 57:
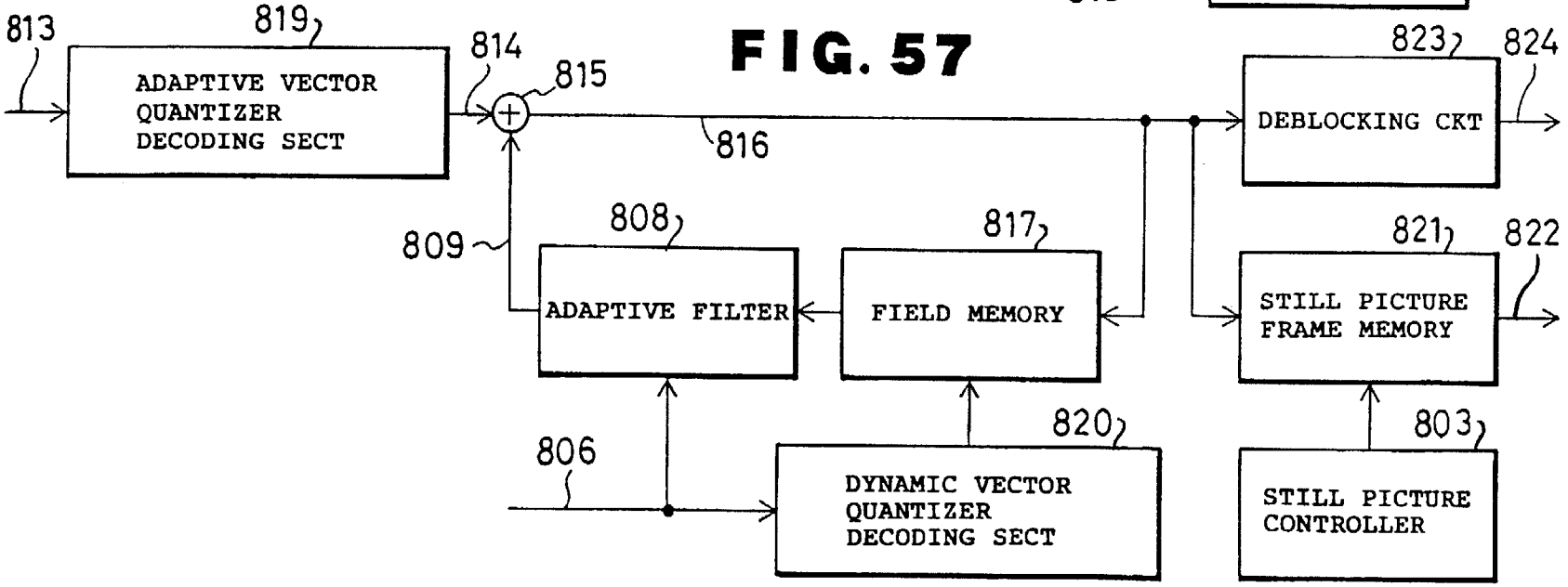
FIG. 57 is a block diagram of a decoding section of the picture encoding transmission apparatus.

FIG. 57 is a block diagram illustrating an example of a decoding section of an image encoding transmission apparatus according to the invention. In FIG. 57, numeral 806 designates a DVQ index, numeral 820 designates a dynamic vector quantizer decoding section, numeral 808 designates an adaptive filter with characteristics changed by the DVQ index, numeral 809 designates a DVQ output vector after passing through the adaptive filter 808, numeral 813 designates AVQ encoding information, numeral 819 designates an adaptive vector quantizer decoding section, numeral 814 designates an interframe differential vector locally decoded, numeral 815 designates an adder, numeral 816 designates a locally decoded vector, numeral 817 designates a field memory by the number of pixels of the moving picture, numeral 821 designates a frame memory with capacity by the number of the pixels of the still picture (four times greater than that of moving picture), numeral 822 designates a still picture output signal series, numeral 803 designates a still picture controller, numeral 823 designates a deblocking circuit which performs the scan conversion of the blocked vector in the raster format, and numeral 824 designates moving picture output signal series.

Next, operation will be described.

In FIG. 56, similar operation to the former example is performed in the case of encoding of the moving picture. In the embodiment, however, the adaptive filter 808 with changing smoothing characteristics adaptively by the DVQ index 806 is used as the filter within the interframe encoding/decoding loop. This operation is expressed by a following formula with respect to pixel arrangement shown in FIG. 58. Assuming that filter output on a pixel X is made X', $$X' = \alpha X + \frac{(1-\alpha)}{4}(A+B+C+D)$$

Where the control variable a is expressed by a following formula, it the horizontal direction component of the moving vector indicated by the DVQ index is made u and the vertical direction component thereof is made v.

$$\alpha = \epsilon - \alpha(|u|+|v|)$$

$\alpha$ is a positive constant determined by the statistical property of the picture.

Although the absolute value distance of the moving vector is used in the above formula, a following formula may be used.

$$\alpha = \epsilon^{-\alpha(u^2+v^2)^{1/2}}$$

The above-mentioned filter can be surely used also in the moving picture decoding section.

On the other hand, following operation is performed in the case of encoding of the still picture.

Figure 58:
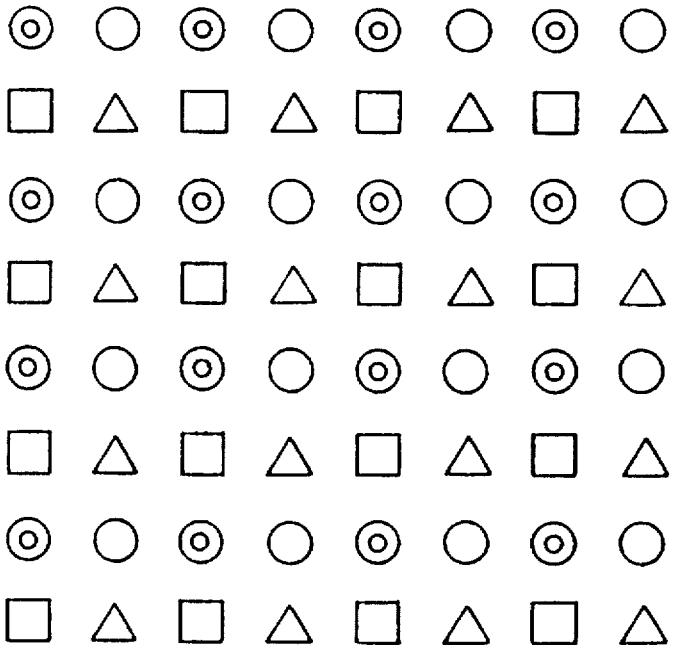
FIG. 58 is an explanation diagram illustrating arrangement of still picture encoded pixels of a picture encoding transmission apparatus.
Figure 59:
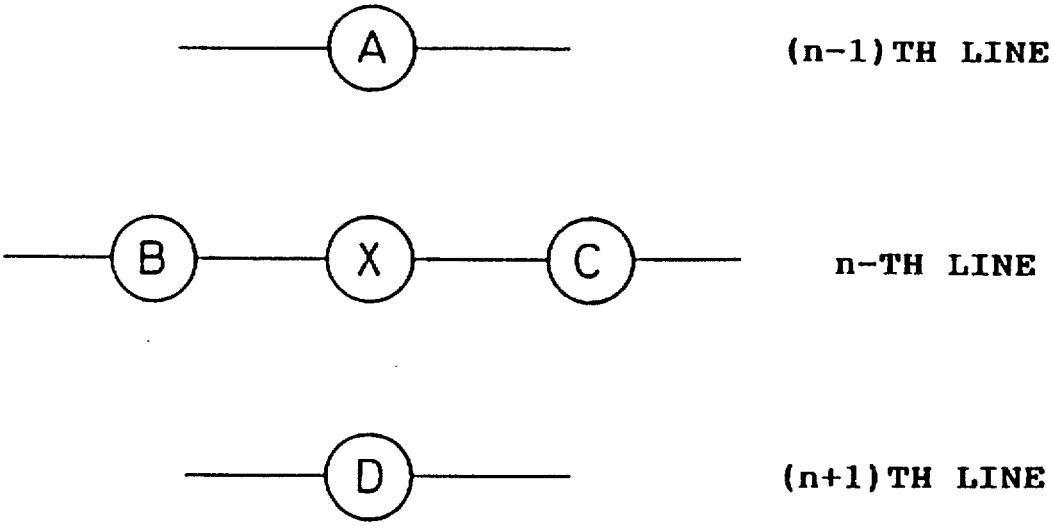
FIG. 59 is an operation explanation diagram of an adaptive filter used in a picture encoding transmission apparatus as an embodiment of the invention.

Since the number of encoding pixels of the still picture is two times in comparison to the moving picture in the horizontal and vertical directions respectively, pixels corresponding to positions of double circle, circle, triangle, rectangle in FIG. 58 respectively are encoded separately. In FIG. 58, assume that the encoded pixel of the moving picture is on the position of symbol of double circle. In the case of encoding the still picture, only pixels of double circle are first blocked, and interframe encoding is performed and the results are transmitted. After finishing the transmission, signals quantized and written in the field memory 817 are made the predictive value and the interframe encoding is performed. In the case of the still picture, since the input signal 801 is not changed during the interframe encoding, the interframe encoding encodes the adaptive vector quantization error repeatedly. The interframe encoding is performed for some cycles, and the decoded value of pixels of double circle converges. When the pixel value of double circle converges to some degree, the still picture controller 803 tells the blocking circuit so as to block the pixels of circle symbol in FIG. 58 together. The encoding of the pixels of circle symbol is performed by using the decoded value of the pixels of double circle encoded last as the predictive value. When the decoded value of the pixels of circle symbol also converges after some cycles, pixels of triangle symbol are to be encoded, and after that pixels of rectangle symbol are to be encoded subsequently. Thus sequence of four sorts of pixels is to encoded in order.

Similar operation to the former example is performed in the case of decoding the moving picture in the decoding section. However, in the case of decoding the still picture, the decoded signal is once stored in the still picture frame memory 821. When the encoding section of the still picture transmission side encodes and transmits pixels of double circle in FIG. 58, the still picture controller 803 of the decoding section at the receiving side controls so as to write the decoded signals in the pixel positions of double circle of the still picture frame memory 821. Even if only pixels of double circle are transmitted to the decoding section at the receiving side, interpolation processing is performed thereby the rough whole picture can be displayed at an early stage of the still picture transmission.

In the above-mentioned embodiment, although the adaptive filter is controlled by the DVQ index also during the still picture transmission, the following control is preferably performed during the still picture transmission. First, when pixels of double circle in FIG. 58 are subjected to intraframe encoding, the weighting factor of the adaptive filter is made small, and when the interframe encoding is performed, as the number of interframe encoding cycles increases, the factor $\alpha$ is made large. When the interframe encoding of pixels of double circle is finished, it is controlled so that the factor $\alpha$ becomes "1". Next, if interframe encoding of pixels of circle symbol in FIG. 58 is started, the factor $\alpha$ is made small again, and gradually made close to "1".

In the embodiment, it is assumed that the input signal of the still picture from the camera is not changed during the still picture transmission. However, if a still picture frame memory is prepared at the front of the encoding section, the still picture is once inputted in the memory, thereby the camera input may be changed. In this case, an increase of the hardware is made little by using the still picture frame memory of the decoding section in common.

Industrial Applicability

The encoding and decoding apparatus of a video signal according to the invention can be applied to a video teleconference apparatus, a video telephone apparatus.

What is claimed is:

1. An interframe encoding and decoding apparatus comprising:

an encoding section composed of a frame memory for storing one frame of a video signal series;

a raster/block scan converting circuit for dividing an input signal series into blocks of k samples each (k: a positive integer) to form input block data;

a subtractor for obtaining interframe differential block data by subtracting block data stored in said frame memory from said input block data, corresponding to the same position as that of the input block data in the period of at least one frame before;

a motion detecting circuit for comparing an absolute value sum of amplitudes of samples within the block of said interframe differential block data with a motion detection threshold value, and detecting motion in units of block and determining motion information of movement existing when said sum is greater than said threshold value and no movement when said sum is less than said threshold value;

a block encoding circuit for encoding the interframe differential block data of movement existing as valid blocks into encoded block data;

a transmission data buffer for converting the motion information and the encoded block data into a suitable code word and storing it for a predetermined and fixed time, and then transmitting it together with the motion detection threshold value to the transmission line at a predetermined and fixed speed and calculating the storage amount of the encoded data in the predetermined and fixed time;

an encoding control circuit for determining said motion detection threshold value and an input time lapse according to changes of said storage amount of encoded data;

a block decoding circuit for decoding said encoded block data to reproduce the interframe differential block data of movement existing, and discriminating blocks of no movement as invalid blocks and making sample values of an interframe differential decoded block data corresponding to an invalid block all zero;

a differential amplitude suppressing circuit for suppressing the amplitude value of the decoded interframe differential block data obtained in said block decoding circuit non-linearly based on said motion detection threshold value; and an adder for adding the suppressed decoded interframe differential block data to said block data in the frame memory and obtaining reproduction block data, and replacing block data in said frame memory with reproduction block data of the same position in a frame as that of the block data in the frame memory; and a decoding section composed of a reception data buffer memory for receiving the encoded data supplied through the transmission line and storing it for a predetermined and fixed time, and then decoding the motion information and the encoded block data from the code word and separating and outputting the motion detection threshold value;

a block decoding circuit for decoding and reproducing the interframe differential block data of movement existing from said encoded block data from said reception buffer memory, and discriminating the block of no movement as an invalid block and making sample values of the reproduced interframe differential block data corresponding to an invalid block all zero;

a differential amplitude suppressing circuit for suppressing the amplitude value of the decoded interframe differential block data obtained in said block decoding circuit non-linearly based on the motion detection threshold value;

a frame memory for storing one frame of a video signal series in blocks;

an adder for adding the suppressed interframe differential decode block data to the block data from said frame memory and obtaining reproduction block data, and writing the reproduction block data at the same position as that of the block data within said frame memory; and a block/raster scan converting circuit for converting the reproduction block data from said adder into a signal series in raster form.

2. An interframe encoding and decoding apparatus as set forth in claim 1, wherein the motion detecting circuit calculates a mean value and a standard deviation value of the sample values in the block of the interframe differential block data, and compares the mean value and the standard deviation value with the motion detection threshold value so as to perform the motion detection, and determines the motion information as movement existing or not.

3. An interframe encoding and decoding apparatus as set forth in claim 1, wherein said apparatus is provided with first and second front end frame memories for storing data by one picture frame respectively installed at an input stage of an interframe coding circuit encoding an interframe difference block data;

a time integrating circuit for performing a time integral of the continuously inputted video signal series in units of picture frame;

a switching circuit for changing over connections so as to write the picture frame data subjected to the time integral in one of the first and second front end frame memories and at the same time read picture frame data from the other of the first and second front end frame memories;

a controller for performing read and write control of the first and the second front end frame memories;

said transmission buffer including first and second buffers for storing encoded information obtained by the interframe coding circuit;

a switching circuit for changing over connections so as to write said encoded information in one of the first and second buffer while reading encoded information from the other of the first and second buffer;

a first, second and third back end frame memories, each for storing data at least by one picture frame of a decoded signal from an interframe decoding circuit for decoding and reproducing an interframe difference block data; and a switching circuit for changing over connections so as to write the decoded signal outputted from the interframe decoding circuit in one of the first, second or third back end frame memory while at the same time reading the decoded signal stored in another of the first, second or third back end frame memory in synchronism with the frame cycles of a picture out means.

4. An interframe encoding and decoding apparatus as set forth in claim 1, wherein a vector quantizer is combined with a subtractor which subtracts an output vector from an input vector to obtain a quantization error; a n-th stage vector quantizer made of n pairs of vector quantizers and subtractors with different dimensional orders are connected to each another to form a multi-stage vector quantizer of stacked type so that the quantization error signal is quantized by the vector quantizer of the next stage; the transmission buffer is made an index buffer which stores the output indices of the multi-stage vector quantizer of stacked type separately per quantizer of the multiple stages; an encoded output selector is provided for changing over outputs of the index buffer and selecting to read out the index of each stage so that reading is performed from the index of the first stage vector quantizer in order; a vector quantization decoder is constituted so that vector quantization decoders having the same dimensional order and quantization characteristics as that of the n-th stage vector quantizer of the encoding section; a change-over circuit is provided for changing over the vector quantization decoders in response to a stage number of the quantizers when the encoded data to be decoded is quantized in the encoding section; the adder adds the decoded video signals up to the present decoding stage and the output vector decoded in the vector quantizer so as to obtain the decoded video signal in the present decoding stage; a frame memory stores the output of the adder as the decoded video signal of the present decoding stage; and an adaptive space filter with the characteristics changeable according to the decoding stage numbers, eliminates the high frequency component of the output of the frame memory, and outputs it to the display.

5. An interframe vector encoding and decoding apparatus as set forth in claim 1, wherein said encoding control circuit is composed of:

an encoding control table having characteristics of a plurality of threshold values versus the amounts of encoded data (generated information) in response to the amount of motion of a plurality of pictures of the encoding control circuit;

a motion detecting section for detecting the amount of movement of pictures in accordance with the threshold value and the amount of generated information used in the encoding control referring to the encoding control table;

a generated information amount target value estimating section for estimating a generated information amount target value allowable in next period from the storage information amount of the transmission buffer up to one period before and outputting the generated information amount target value; a threshold value control table having characteristics of generated information amounts versus threshold values corresponding to reverse conversion of the characteristics of the plurality of threshold values versus the generated information amounts in response to the plurality of movement amount;

a threshold value determining section for determining a new threshold value referring to the threshold value control table by inputting the movement amount being outputted from the movement amount detecting section in one period before and the generated information amount target value; and a threshold value discriminating section for holding a high threshold value when the small movement mounts, that is, the low threshold values for the encoding control continue n times (n: positive integer) or more.

6. An interframe encoding and decoding apparatus as set forth in claim 1, wherein a tree-search vector quantizer is used as a vector quantizer, said tree-search vector quantizer composed of:

an encoder of a first stage including a normalization output vector code table memory for storing a set of normalization output vector of $(2^{n=1}-2)$ in number having binary tree structure of n stages (n: an integer being one or greater) which, based on distribution of a plurality of normalization input vectors formed by a mean value separation normalizing circuit for separating an input vector into a mean value, an amplitude and a normalization input vector, are arranged so that each stage exhibits minimum distortion, and vectors in each stage are halved to the right and left sides and corresponding vectors from the left or from the right in sequence are arranged in symmetry, i.e., inverse about the origin on the signal space, and the normalization output vector positioned to the left or to the right among two normalization output vectors in the first stage and the set of the normalization output vectors of $(2^n-1)$ in number arranged in binary tree form in stages up to the n-th stage using the normalization output vector in the first stage as a root are located so that an index representing history of branch selection up to the last stage is used as an address and a present normalization output vector can be read;

a polarity inverting circuit for generating an inverted normalization output vector by inverting the polarity of the normalization output vector when one normalization output vector in the first stage is rad from said normalization output vector code table memory;

a distortion operation circuit for calculating two distortions between the normalization input vector and one normalization output vector in the first stage and between the normalization input vector and the inverted normalization output vector, respectively;

a comparator for comparing the two distortions and selecting the smaller one and outputting a signal to discriminate the normalization output vector and the inverted normalization output vector;

a polarity inverting circuit for generating an inverted normalization input vector by inverting the polarity of the normalization input vector;

a selector for selecting an outputting the normalization input vector when the comparator output signal indicates the normalization output vector, and selecting and outputting the inverted normalization input vector when the comparator output signal indicates the inverted normalization output vector; and an index register for setting the comparator output signal as a code bit to the most significant bit of the index of n bits;

at least one encoder of a higher order stage composed of an index register for storing an index corresponding to an address to read the normalization output vector from said normalization output vector code table memory stepwise in accordance with branch selections up to the last stage, updating the index every time the comparator output signal is given in each stage, adding the index of (n−1) bits representing history of branch selections up to the n-th stage finally, i.e., the index of the normalization output vector minimizing the distortion for the normalization input vector, to the second bit position and thereafter counting from the most significant bit, and forming the index of n bits;

a plurality of distortion operation circuits, one of which for calculating distortion between the normalization input vector and one of two normalization output vectors read sequentially in accordance with the branch selections, and another of which for calculating distortion between the inverse normalization input vector being the selector output signal and another of two normalization output vectors; and a decoder composed of a latch for receiving the index on n bits, the means value and the amplitude value as an encoder output signal;

a decoding normalization output vector code table memory using means for performing the read control based on the most significant bit of the index, so as to output the normalization output vector if the most significant bit is "0", or to output the inverted normalization output vector by inverting the polarity of the normalization output vector if the most significant bit is "1", when normalization output vectors of $(2^n-1)$ in number in the n-th stage, i.e., the last stage of the normalization output vector code table memory of the encoder only are stored, and the encoder output signal is received, the index of n bits is decoded, and then the corresponding normalization vector is read from the decoding normalization output vector code table memory in accordance with the index of (n−1) binary digits except for the most significant bit; and an amplitude multiplying and mean value adding circuit for decoding the mean value and the amplitude value from the encoder output signal, multiplying the amplitude to the normalization output vector or the inverted normalization output vector being read, and further adding the mean value so as to obtain the output vector.

7. A picture encoding transmission apparatus comprising:

an encoding section including a blocking circuit for blocking video signal series inputted in raster direction scanning order into blocks of m×n pixels (m, n: integers) as encoding units to be made input vectors;

a field memory for storing one field of picture information corresponding to one or more previous frames;

a dynamic vector quantizer for blocking the signal series at the position of the encoding object and periphery in the field memory, constituting a set of output vectors to read out, determining one of the output vectors being most close to the input vector as a dynamic vector quantization (hereinafter referred to as "DVQ") output vector, and making an index (label) of the DVQ output vector as an encoded output;

a digital filter for applying the smoothing processing to the DVQ output vectors and preventing storage of the vector quantization noises;

a subtractor for calculating a differential signal between the input vector and the digital filter output;

an adaptive vector quantizer for subjecting the subtractor output to a mean value separation normalizing processing to perform motion detection, and then quantizing it; and an adder for adding the digital filter output to the adaptive vector quantization output vector to obtain a locally decoded vector;

a decoding section including a field memory for storing an encoded picture signal of one frame in the period of one or more frame before;

an adaptive vector quantizer decoding section for decoding adaptive vector quantization encoded information encoded by the adaptive vector quantization to reproduce a decoded interframe differential vector;

a dynamic vector quantizer decoding section for decoding the DVQ index encoded by the dynamic vector quantizer, reproducing a moving vector, and controlling the read out positions of the field memory;

a digital filter connected to the output of the field memory read out in response to the moving vector;

an adder for adding the decoded [the] interframe differential vector and the output of the filter; and a deblocking circuit for converting the locally decoded vector being the output of the adder into video signal series of raster scan;

a still picture controller at the encoding side for controlling the blocking circuit of the encoding section, so that in the case of a still picture having a resolving power of twice that of a moving picture in the horizontal and vertical directions respectively, blocking is performed in every other pixel and every other [lien] *line* both in the horizontal and vertical directions, that is, subsample blocking is performed in the same interval as the pixel interval of the moving picture, pixels to be blocked are shifted in four directions to encode all pixels in the still picture, the first subsampled video signal is transmitted in intraframe encoding using the above-mentioned video signal encoding and decoding basic unit, after this, an intra frame encoded video signal is used as a predictive signal to perform the interframe encoding transmission, the other subsample video signals are also transmitted in interframe encoding using the interframe encoded video signal as a predictive value, and the interframe encoding is operated repeatedly for frame periods when the locally decoded vector is written in the field memory on the same subsampled video signals so as to improve the picture quality;

a still picture frame memory for storing the locally decoded output vectors in the decoding section; and a still picture controller at decoding side for controlling the decoding so as to obtain the first subsampled video signal in the interframe decoding during the still picture decoding, to write in the corresponding positions of the still picture frame memory, after this, to use intraframe decoded video signal as a predictive signal to perform the interframe decoding, to subject the other subsampled video signals also to the interframe decoding suing the intraframe decoded video signal as a predictive value, to perform the interframe decoding repeatedly for frame periods, and to write in the corresponding positions of the still picture frame memory.

8. A picture encoding transmission apparatus as set forth in claim 7, wherein the digital filter to prevent the storage of the noises is provided with an adaptive filter in which a weighting factor α thereof is varied and a sum of a value of α times of an object pixel and a value of (1−α) times of a mean value of the peripheral four pixels is made a filter output of the object pixel in order to strengthen the degree of the smoothing processing on the DVQ output vectors in accordance with the amount of motion shown by the DVQ index.

*9. A picture encoding transmission apparatus, comprising:*

*an encoding section including*

*a blocking circuit for blocking video signal series inputted in raster direction scanning order into blocks of m×n pixels (m, n: integers) as encoding units to be made input vectors;*

*a field memory for storing at least one field of picture information corresponding to one or more previous frames;*

*a dynamic vector quantizer for blocking the signal series at the position of the encoding object and periphery in the field memory, constituting a set of output vectors to read out, determining one of the output vectors being most similar to each input vector as a dynamic vector quantization (DVQ) output vector, and making an index (label) of the DVQ output vector as an encoded output; and*

*a digital filter for applying a smoothing process to the DVQ output vectors, said digital filter being provided with an adaptive filter in which a weighting factor α thereof is varied in accordance with the amount of motion shown by the DVQ index, and a*

*sum of α times an object pixel value and a weighted sum of peripheral pixel values of pixels peripheral to said object pixel, the weights of which peripheral pixels add up to (1−α), is made a filter output of the object pixel in order to strengthen the degree of smoothing of the DVQ output vectors in accordance with said amount of motion.*

*10. A picture encoding transmission apparatus, comprising:*

*an encoding section including*

*a blocking circuit for blocking video signal series inputted in raster direction scanning order into blocks of m×n pixels (m, n: integers) as encoding units to be made input blocks;*

*a field memory for storing at least one field of picture information corresponding to one or more previous frames;*

*blocking means for blocking the signal series at the position of the encoding object and periphery in the field memory, constituting a set of reference blocks to read out, determining one of the reference blocks being most similar to each input block, determining the amount of displacement between the determined reference block and the input block and making an index (label) of said displacement as an output; and*

*a digital filter for applying a smoothing process to the determined reference block, said digital filter being provided with an adaptive filter in which a weighting factor α thereof is varied in accordance with the amount of displacement shown by the determined reference block, and a sum of α times an object pixel value and a weighted sum of peripheral pixel values of pixels peripheral to said object pixel, the weights of which peripheral pixels add up to (1−α), is made a filter output of the object pixel in order to strengthen the degree of smoothing of the determined reference block in accordance with said amount of displacement.*

*11. An apparatus for decoding a received encoded picture signal, comprising;*

*a decoding section including*

*a field memory for storing a received encoded picture signal of at least one field corresponding to one or more previous frame in blocks of m×n pixels (m, n: integers);*

*a dynamic vector quantizer decoder for decoding a dynamic vector quantization (DVQ) index associated with a block of said encoded picture signal, reproducing a DVQ vector corresponding to said DVQ index, and controlling the read out positions of pixel blocks said field memory in accordance with said reproduced DVQ vector; and*

*a digital filter connected to an output of said field memory, said digital filter being provided with an adaptive filter in which a weighting factor α thereof is varied in accordance with the amount of motion shown by the DVQ index, and a sum of α times an object pixel value and a weighted sum of peripheral pixel values of pixels peripheral to said object pixel, the weights of which peripheral pixels add up to (1−α), is made a filter output of the object pixel in order to strengthen the degree of smoothing of the output vectors in accordance with said amount of motion.*

*12. An apparatus for decoding a received encoded picture signal, comprising;*

*a decoding section including*

*a field memory for storing a received encoded picture signal of at least one field corresponding to one or more previous frames in blocks of m×n pixels (m, n: integers);*

*means for reading an index of displacement associated with a block of said encoded picture signal, and controlling the read out positions of pixel blocks of said field memory in accordance with the amount of displacement corresponding to said read index; and*

*a digital filter connected to an output of said field memory, said digital filter being provided with an adaptive filter in which a weighting factor α thereof is varied in accordance with the amount of displacement and a sum of α times an object pixel value and a weighted sum of peripheral pixel values of pixels peripheral to said object pixel, the weights of which peripheral pixels add up to (1−α), is made a filter output of the object pixel in order to strengthen the degree of smoothing of the outputted blocks from said field memory.*

* * * * *